US011265968B2

(12) United States Patent
Miao et al.

(10) Patent No.: US 11,265,968 B2
(45) Date of Patent: Mar. 1, 2022

(54) CONTROL RESOURCE BLOCK SET SEARCH SPACE DESIGN

(71) Applicant: Apple Inc., Cupertino, CA (US)

(72) Inventors: Honglei Miao, Munich (DE); Debdeep Chatterjee, San Jose, CA (US); Gang Xiong, Portland, OR (US); Hong He, Sunnyvale, CA (US); Yongjun Kwak, Portland, OR (US); Michael Faerber, Wolfratshausen (DE); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/473,558

(22) PCT Filed: Feb. 16, 2018

(86) PCT No.: PCT/US2018/000089
§ 371 (c)(1),
(2) Date: Jun. 25, 2019

(87) PCT Pub. No.: WO2018/151871
PCT Pub. Date: Aug. 23, 2018

(65) Prior Publication Data
US 2019/0350049 A1    Nov. 14, 2019

Related U.S. Application Data

(60) Provisional application No. 62/460,605, filed on Feb. 17, 2017, provisional application No. 62/502,087, filed on May 5, 2017.

(51) Int. Cl.
*H04W 88/10* (2009.01)
*H04W 76/27* (2018.01)
(Continued)

(52) U.S. Cl.
CPC ........... *H04W 88/10* (2013.01); *H04L 1/0026* (2013.01); *H04L 1/0038* (2013.01);
(Continued)

(58) Field of Classification Search
CPC ..... H04W 88/00; H04W 80/00; H04W 76/00; H04L 1/00; H04L 27/00; H04L 5/00
See application file for complete search history.

(56) References Cited

U.S. PATENT DOCUMENTS

2009/0285163 A1* 11/2009 Zhang ................... H04L 1/0045
                                                    370/329
2013/0003639 A1*  1/2013 Noh ..................... H04W 72/046
                                                    370/312
(Continued)

OTHER PUBLICATIONS

Intel Corporation, "Hierarchical Search Space Design", 3GPP TSG RAN WG1 #88, R1-1702222 (Year: 2017).*
(Continued)

*Primary Examiner* — Jung H Park
*Assistant Examiner* — Sumitra Ganguly
(74) *Attorney, Agent, or Firm* — Sterne, Kessler, Goldstein & Fox P.L.L.C.

(57) ABSTRACT

Apparatuses, methods and storage media associated with components and implementations of wireless communication networks, and/or portions thereof, are disclosed herein. In embodiments, an apparatus for a next generation NodeB (gNB) may include processing circuitry to determine a number of resource element groups (REGs) to be included in a resource element group bundle (REGB) for a new radio physical downlink control channel (NR-PDCCH), and generate a signal that indicates the number of the REGs. The gNB may further include encoding circuitry, coupled with the processing circuitry, to encode the signal for transmission to a user equipment (UE). Other embodiments may be disclosed throughout.

20 Claims, 37 Drawing Sheets

(51) Int. Cl.
   *H04L 1/00* (2006.01)
   *H04L 5/00* (2006.01)
   *H04L 27/26* (2006.01)
   *H04W 80/08* (2009.01)

(52) U.S. Cl.
   CPC ........ *H04L 5/0085* (2013.01); *H04L 27/2607* (2013.01); *H04W 76/27* (2018.02); *H04W 80/08* (2013.01); *H04L 5/0007* (2013.01)

(56) References Cited

U.S. PATENT DOCUMENTS

| | | | | |
|---|---|---|---|---|
| 2018/0198677 | A1* | 7/2018 | Blankenship | H04L 5/0053 |
| 2019/0037540 | A1* | 1/2019 | Seo | H04W 72/042 |
| 2019/0199477 | A1* | 6/2019 | Park | H04L 1/0067 |

OTHER PUBLICATIONS

LG Electronics, "Discussion on Search space design", 3GPP TSG RAN WG1 #88, R1-1702477 (Year: 2017).*

International Patent Office—International Search Report and Written Opinion dated Aug. 13, 2018 from International Application No. PCT/US2018/000089, 19 pages.

Mediatek, Inc., "Discussion on NR-PDCCH structure," 3GPP TSG RAN WG1 Meeting #88, R1-1702722, Agenda item: 8.1.3.1.3, 13*"-17*" Feb. 2017, Athens, Greece, 7 pages.

LG Electronics, "Discussion on search space design," 3GPP TSG RAN WG1 Meeting #88, RI-1702477, Agenda item: 8.1.3.1.4, 13*-1?*** Feb. 2017, Athens, Greece, 3 pages.

Intel Corporation, "Hierarchical Search Space Design," 3GPP TSG RAN WG1 #88, R1-1702222, Agenda item: 8.1.3.1.4, Feb. 13-17, 2017,I Athens, Greece, 4 pages.

International Preliminary Report on Patentability directed to related International Patent Application No. PCT/US2018/000089, dated Aug. 20, 2019; 11 pages.

Office Action directed to related European Patent Application No. 18712286.6, dated Sep. 17, 2021; 7 pages.

Huawei et al., "PRB bundling size for DL data precoding," R1-1703342, 3GPP TSG RAN WG1 Meeting #88, Feb. 12, 2017; 7 pages.

* cited by examiner

| HSS Approaches | HSS structures |
|---|---|
| Approach 1 | H1, H3, H7 and H9 |
| Approach 2 | H2 |
| Approach 3 | H4 |
| Approach 4 | H5 |
| Approach 5 | H6 |
| Approach 6 | H8 |
| Approach 7 | H10 |
| Approach 8 | H12 |

| | | | |
|---|---|---|---|
| 1 | 2 | 3 | 4 |
| 5 | 6 | 7 | 8 |
| 4 | 1 | 2 | 3 |
| 8 | 5 | 6 | 7 |
| 3 | 4 | 1 | 2 |
| 7 | 8 | 5 | 6 |
| 2 | 3 | 4 | 1 |
| 6 | 7 | 8 | 5 |

2750

| | | | |
|---|---|---|---|
| 1 | 1 | 2 | 2 |
| 3 | 3 | 4 | 4 |
| 2 | 1 | 1 | 2 |
| 4 | 3 | 3 | 4 |
| 2 | 2 | 1 | 1 |
| 4 | 4 | 3 | 3 |
| 1 | 2 | 2 | 1 |
| 3 | 4 | 4 | 3 |

| 1 | 1 | 5 | 5 |
| 2 | 2 | 6 | 6 |
| 3 | 3 | 7 | 7 |
| 4 | 4 | 8 | 8 |
| 5 | 5 | 1 | 1 |
| 6 | 6 | 2 | 2 |
| 7 | 7 | 3 | 3 |
| 8 | 8 | 4 | 4 |

3150

| 1 | 1 | 3 | 3 |
| 1 | 1 | 3 | 3 |
| 2 | 2 | 4 | 4 |
| 2 | 2 | 4 | 4 |
| 3 | 3 | 1 | 1 |
| 3 | 3 | 1 | 1 |
| 4 | 4 | 2 | 2 |
| 4 | 4 | 2 | 2 |

| 1 | 5 | 3 | 7 |
| 1 | 5 | 3 | 7 |
| 2 | 6 | 4 | 8 |
| 2 | 6 | 4 | 8 |
| 3 | 7 | 1 | 5 |
| 3 | 7 | 1 | 5 |
| 4 | 8 | 2 | 6 |
| 4 | 8 | 2 | 6 |

3250

| 1 | 3 | 2 | 4 |
| 1 | 3 | 2 | 4 |
| 1 | 3 | 2 | 4 |
| 1 | 3 | 2 | 4 |
| 2 | 4 | 1 | 3 |
| 2 | 4 | 1 | 3 |
| 2 | 4 | 1 | 3 |
| 2 | 4 | 1 | 3 |

FIGURE 32

CONTROL RESOURCE BLOCK SET SEARCH SPACE DESIGN

RELATED APPLICATIONS

The present application is a national phase entry under 35 U.S.C. § 371 of International Application No. PCT/US2018/000089, filed Feb. 16, 2018, entitled "CONTROL RESOURCE BLOCK SET SEARCH SPACE DESIGN," which claims priority to U.S. Provisional Patent Application No. 62/460,605, filed Feb. 17, 2017, entitled "CONTROL CHANNEL SEARCH SPACE DESIGN FOR FIFTH GENERATION (5F) NEW RADIO", and U.S. Provisional Patent Application No. 62/502,087, filed May 5, 2017, entitled "RESOURCE ELEMENT GROUP BUNDLING AND ENHANCED INTERLEAVING BASED REGB NUMBERING FOR DISTRIBUTED NEW RADIO PHYSICAL DOWNLINK CONTROL CHANNEL (NR-PDCCH)," the entire disclosures of which are hereby incorporated by reference.

TECHNICAL FIELD

The present disclosure relates to the field of electronic circuits. More particularly, the present disclosure relates to the components and implementations of wireless communication networks, and/or portions thereof.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In wireless communication networks, physical downlink control channel may perofrm downlink data scheduling and uplink data assignment. Each user equipment within a wireless communication network may be configured with one or more control channel search spaces, in which physical downlink control channel blind decoding candidates are defined. Inefficient configuration of the control channel search spaces may lead to increased blocking probability and/or high levels of computational complexity.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 21 illustrates a tabular representation of example correspondence between hierarchical NR-PDCCH search space approaches and hierarchical NR-PDCCH search space structures, according to various embodiments.

FIG. 26 illustrates graphical representations of example CORESET configurations, according to various embodiments.

FIG. 27 illustrates graphical representations of example CORESET configurations, according to various embodiments.

FIG. 29 illustrates graphical representations of example CORESET configurations, according to various embodiments.

FIG. 31 illustrates graphical representations of example CORESET configurations, according to various embodiments.

FIG. 32 illustrates graphical representations of example CORESET configurations, according to various embodiments.

DETAILED DESCRIPTION

Figure 1:
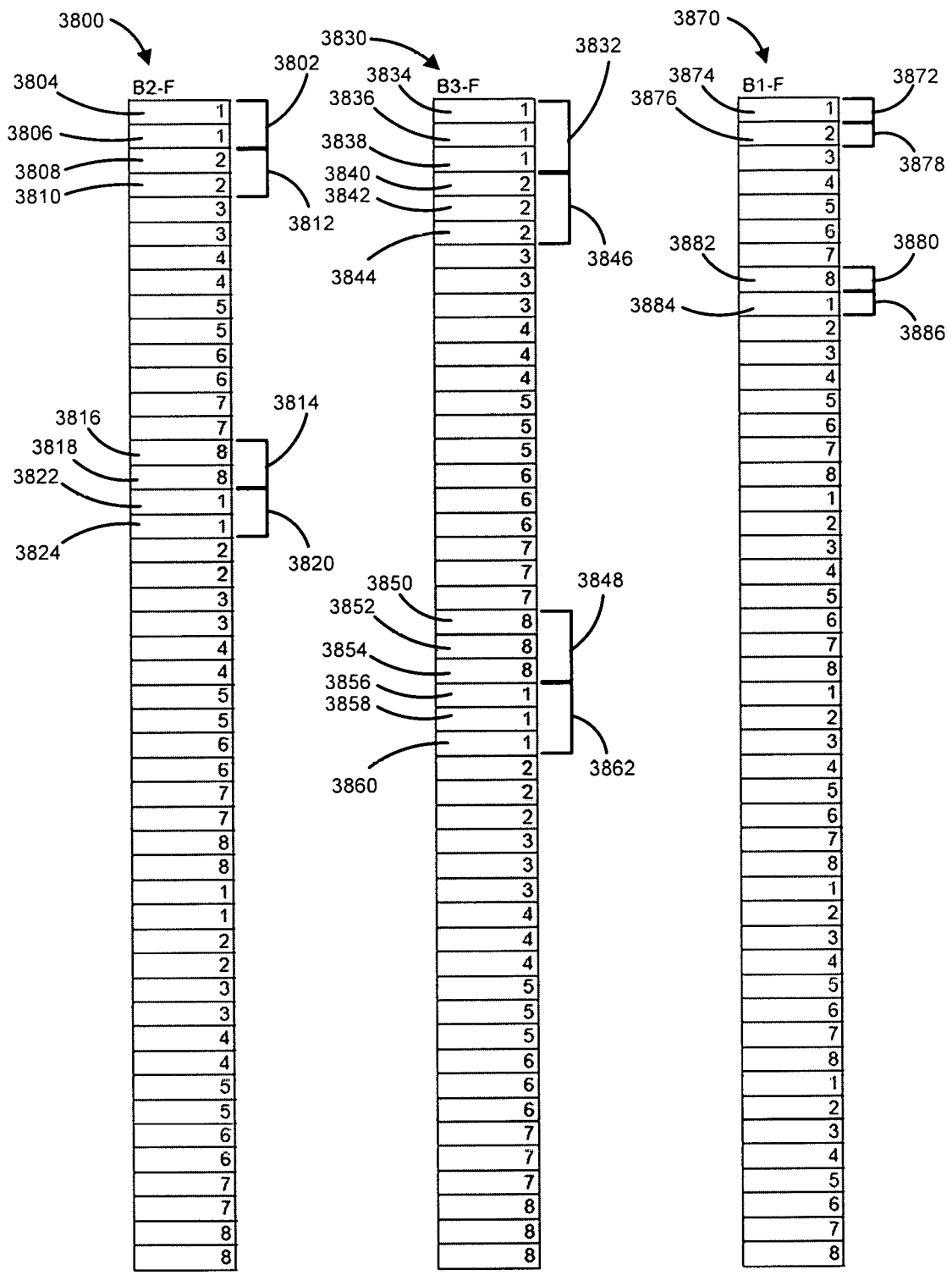
FIG. 1 illustrates graphical representations of example control channel resource sct (CORESET) configurations, according to various embodiments.

Apparatuses, methods and storage media associated with components and implementations of wireless communication networks, and/or portions thereof, are disclosed herein. In embodiments, an apparatus for a next generation NodeB (gNB) may include processing circuitry to determine a number of resource element groups (REGs) to be included in a resource element group bundle (REGB) for a new radio physical downlink control channel (NR-PDCCH), and generate a signal that indicates the number of the REGs. The gNB may further include encoding circuitry, coupled with the processing circuitry, to encode the signal for transmission to a user equipment (UE).

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, the terms "control channel element," "blind decoding candidate," and "new radio physical downlink control channel candidate" may be interchangeably used, wherein each of the terms may refer to a same construct.

The examples provided herein may refer to the configuration of a configured control channel resource set (CORESET). However, it is to be understood that the same approaches may be applied to search spaces and/or on a search space-by-search space basis, wherein a CORESET may include more than one search space.

The new radio physical downlink control channel (NR-PDCCH) may be utilized to schedule downlink and uplink data packets in a third generation partnership project (3GPP) fifth generation (5G) system. A resource element group (REG) that includes 12 consecutive resource elements in frequency domain of one orthogonal frequency division multiplexing (OFDM) symbol may be the basic building block of NR-PDCCH. A single antenna port (AP) based transmission for an REG may be supported. For example, all resource elements (REs) of the REG may experience the same effective channel by applying the same precoding transmission, if any. Moreover, to improve channel estimation performance, a concept called "REG bundling," in which several adjacent REGs in a bundle may apply the same precoding operation so that channel estimates over an REG bundle (REGB) can be averaged out, may be implemented. In addition, interleaving based REGB numbering may support distributed NR-PDCCH transmission.

Certain interleaver designs based on a straightforward REGB numbering scheme (such as frequency-first numbering) may not lead to a desired distributed NR-PDCCH transmission. A more deliberate interleaver design for REGB numbering may be utilized to achieve the desired distributed NR-PDCCH transmission.

In some embodiments, a configurable REGB design may cope with different potential scenarios. Moreover, an enhanced two-dimensional (2D)/2-level interleaving based REGB numbering design may maximize the possible time-frequency diversity of distributed NR-PDCCH and avoid the undesired localized transmission caused by conventional interleaving based REGB numbering design.

A configurable REGB may enable user equipment (UE)-specific channel-aware REGB configuration. Specifically, the REGB construction, in terms of number of REGs in an REGB and bundling direction (for example, time-first order or frequency-first order), can be configured as part of search space configuration by high layer signaling. Supported REGB construction options may be defined in the specification. For example, an REGB with two or three REGs in consecutive OFDM symbols or resource blocks corresponding to bundling in time and frequency, respectively, can be supported. Then the search space (SS) configuration can indicate which particular REGB construction is to be employed by the NR-PDCCH. To realize better distributed NR-PDCCH transmission, enhanced two-dimensional interleaving based REGB numbering in the configured control channel resource set (CORESET) (which may also be referred to as "control resource resource block set") may avoid undesired localized REGB allocation and achieve better time-frequency diversity.

Configurable REGB design may enable NR-PDCCH transmission to be optimized according to the UE-specific channel condition. Moreover, enhanced 2D-interleaver based REGB numbering in CORESET to support distributed NR-PDCCH transmission may be employed. The enhanced 2D-interleaver based REGB numbering may achieve better distributed NR-PDCCH transmission than conventional one-dimensional (1D) interleaver based REGB numbering scheme.

In the configuration of UE-specific SS of NR-PDCCH, the network may configure the way of REGB construction in terms of the number of REGs in the REGB, the bundling direction, or some combination thereof. The number of REGs in the REGB may range from 1 to N_REG_per_REGB, wherein N_REG_per_REGB may be predefined, such as being defined in the specification. The bundling direction may include time-first order or frequency-first order when multiple symbols are configured for the CORESET of the SS.

The number of REGs in the REGB and/or the bundling direction can be part of the radio resource control (RRC) signaling message for SS or CORESET (re)configuration. In some embodiments, the REGB can be defined on a CORESET or SS level so that all NR-PDCCHs in an SS share the same way of REGB construction. In other embodiments, REGB configuration can be configured on aggregation level so that NR-PDCCH of different aggregation levels (ALs) may have different ways of REGB construction. For example, for high AL NR-PDCCH, the size of an REGB can be larger than that of smaller AL NR-PDCCH so that in a low signal-to-noise ratio (SNR) situation, better channel estimation performance can be obtained from a larger REGB size.

REGBs with different sizes and bundling directions can be configurable according to a UE-specific channel condition including channel selectivity in time, frequency at the UE receiver, and/or SNR at the UE receiver. For example, for a slow fading channel with high frequency selectivity, REGB in time may be beneficial; on the other hand, REGB in frequency may be better for a frequency-flat and fast fading channel.

FIG. 1 illustrates graphical representations of example control channel resource set (CORESET) configurations, according to various embodiments. In particular, FIG. 1 illustrates a graphical representation of a two-REG configured REGB CORESET configuration 3800, a three-REG configured REGB CORESET configuration 3830, and a one-REG configured REGB CORESET configuration 3870. The CORESET configuration 3800, the CORESET configuration 3830, and the CORESET configuration 3870 may each be implemented via a 2D/Enhanced 2D/2-level interleaver-based REGB number for distributed NR-PDCCH. The illustrated embodiments of the CORESET 3800, the CORESET 3830, and the CORESET 3870 may be configurations for user equipment of aggregation level 1 (AL1). User equipment of higher aggregation levels may aggregate the REGBs, as is described further throughout this disclosure.

The CORESET configuration 3800 may be configured with REGBs having two REGs per REGB. In particular, an REGB may be represented in FIG. 1 by consecutive REGs (represented by squares in the graphical representation) that have been assigned the same number. For example, a first REGB 3802 may include first REG 3804 and second REG 3806, which are both numbered '1' in the illustrated embodiment.

The REGs within the CORESET may be cyclically numbered from '1' to a number of control channel elements (CCEs) in the CORESET configuration 3800, wherein the numbering may define the CCE index for each REG. The CCEs may also be referred to as blind decoding (BD) candidates and/or NR-PDCCH candidates. The REGs may be numbered in a frequency-first order (which may also be referred to as a "frequency increase order") or in a time-first order. The CORESET configuration 3800 is illustrated with eight CCEs and with the REGs numbered in frequency-first order. In particular, the numbering may begin at the first REG 3804 and continue to the next REG in the frequency domain, which is the second REG 3806.

The numbering may begin at '1' and may remain at '1' until the number of REGs to be included in an REGB are assigned that number, at which point the number may be incremented. Once the numbering reaches the number of CCEs in the CORESET 3800 and the number of REGs to be included in the REGB are labeled with the number equal to the number of CCEs, the numbering may cycle back to '1' for numbering the next REG in the CORESET.

In the illustrated embodiment, the numbering may start at the first REG 3804 and proceed to the second REG 3806 in the frequency-first order, numbering the first REG 3804 and the second REG 3806 with '1'. The numbering may then increment and proceed to a third REG 3808 and a fourth REG 3810, numbering the third REG 3808 and the fourth REG 3810 with '2', thereby generating a second REGB 3812. The numbering may continue to generation of an eighth REGB 3814 that includes a fifth REG 3816 and a sixth REG 3818, which are both numbered '8'. The number of CCEs in the CORESET 3800 is eight in the illustrated embodiment, which may cause the numbering to cycle back to '1' after numbering of the eighth REGB 3814. Accordingly, a seventh REG 3822 and an eighth REG 3824, which are included in a ninth REGB 3820, may be numbered with '1'. The numbering may continue as described until all the REGs in the CORESET of the CORESET configuration 3800 have been numbered.

The CORESET configuration 3830 may be configured with REGBs having three REGs per REGB. In particular, an REGB may be represented in FIG. 1 by consecutive REGs (represented by squares in the graphical representation) that have been assigned the same number. For example, a first REGB 3832 may include first REG 3834, second REG 3836, and third REG 3838, which are all numbered '1' in the illustrated embodiment.

The REGs within the CORESET may be cyclically numbered from '1' to a number of CCEs in the CORESET configuration 3830, wherein the numbering may define the CCE index for each REG. The REGs may be numbered in a frequency-first order or in a time-first order. The CORESET configuration 3830 is illustrated with eight CCEs and with the REGs numbered in frequency-first order. In particular, the numbering may begin at the first REG 3834 and continue to the next REG in the frequency domain, which is the second REG 3836.

The numbering may begin at '1' and may remain at '1' until the number of REGs to be included in an REGB are assigned that number, at which point the number may be incremented. Once the numbering reaches the number of CCEs in the CORESET 3830 and the number of REGs to be included in the REGB are numbered with the number equal to the number of CCEs, the numbering may cycle back to '1' for numbering the next REG in the CORESET.

In the illustrated embodiment, the numbering may start at the first REG 3834, proceed to the second REG 3836, then to the third REG 3838 in the frequency-first order, numbering the first REG 3834, the second REG 3836, and the third REG 3838 with '1'. The numbering may then increment and proceed to a fourth REG 3840, a fifth REG 3842, and a sixth REG 3844, numbering the fourth REG 3840, the fifth REG 3842, and the sixth REG 3844 with '2', thereby generating a second REGB 3846. The numbering may continue to generation of an eighth REGB 3848 that includes a seventh REG 3850, an eighth REG 3852, and a ninth REG 3854, which are all numbered '8'. The number of CCEs in the CORESET configuration 3830 is eight in the illustrated embodiment, which may cause the numbering to cycle back to '1' after numbering of the eighth REGB 3848. Accordingly, a tenth REG 3856, an eleventh REG 3858, and a twelfth REG 3860, which are included in a ninth REGB 3862, may be numbered with '1'.

The CORESET configuration 3870 may be configured with REGBs having one REG per REGB. In particular, an REGB may be represented in FIG. 1 by consecutive REGs (represented by squares in the graphical representation) that have been assigned the same number. For example, a first REGB 3872 may include first REG 3874, which is numbered '1' in the illustrated embodiment. Embodiments having one REG per REGB may also be referred to as "REG based" embodiments or "unbundled embodiments" since each REGB includes only a signal REG.

The REGs within the CORESET may be cyclically numbered from '1' to a number of CCEs in the CORESET configuration 3870, wherein the numbering may define the CCE index for each REG. The REGs may be numbered in a frequency-first order or in a time-first order. The CORESET 3870 is illustrated with eight CCEs and with the REGs numbered in frequency-first order. In particular, the numbering may begin at the first REG 3874 and continue to the next REG in the frequency domain, which is a second REG 3876.

The numbering may begin at '1' and may remain at '1' until the number of RECis to be included in an REGB are assigned that number, at which point the number may be incremented. Once the numbering reaches the number of CCEs in the CORESET configuration 3870 and the number of REGs to be included in the REGB are numbered with the number equal to the number of CCEs, the numbering may cycle back to '1' for numbering the next REG in the CORESET.

In the illustrated embodiment, the numbering may start at the first REG 3874, numbering the first REG 3874 with '1'. The numbering may then increment and proceed to the second REG 3876, numbering the second REG 3876 with '2', thereby generating a second REGB 3878. The numbering may continue to generation of an eighth REGB 3880 that includes a third REG 3882, which is numbered '8'. The number of CCEs in the CORESET configuration 3870 is eight in the illustrated embodiment, which may cause the numbering to cycle back to '1' after numbering of the eighth REGB 3880. Accordingly, a fourth REG 3884, which is included in a ninth REGB 3886, may be numbered with '1'.

The CORESET configuration 3800, the CORESET configuration 3830, and the CORESET configuration 3870 all include a single OFDM symbol. In these embodiments, non-shifted REGB numbering can ensure a good REGB distribution over the CORESET. In particular, the CORESET configuration 3800, the CORESET configuration 3830, and the CORESET configuration 3870 may have same numbered REGs distributed at multiple, non-contiguous frequencies, which may lead to a distributed NR-PDCCH. However, non-shifted REGB numbering may not ensure distributed transmission in CORESET configurations having multiple OFDM symbols.

Figure 2:
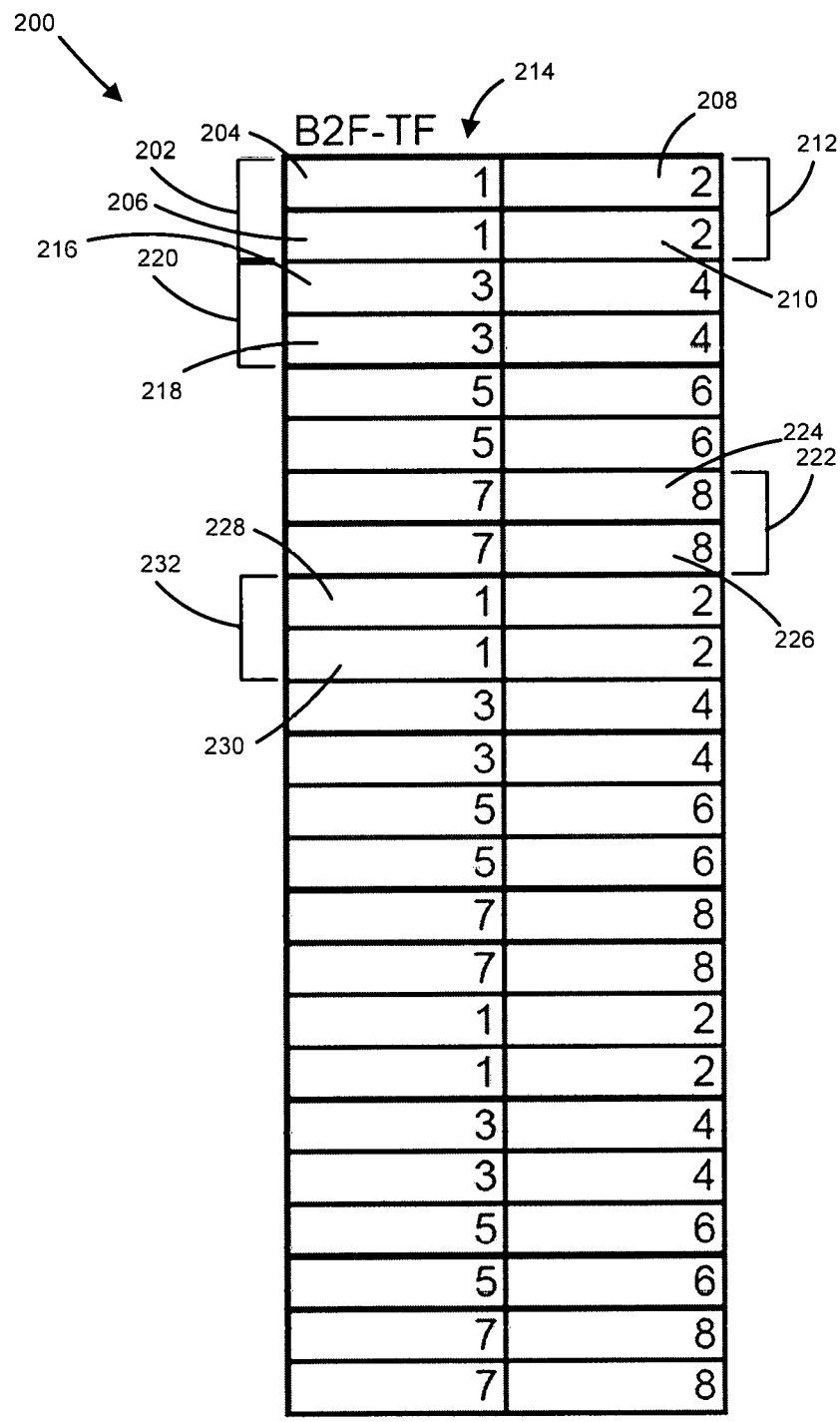
FIG. 2 illustrates a graphical representation of another example CORESET configuration, according to various embodiments.

FIG. 2 illustrates a graphical representation of another CORESET configuration 200, according to various embodiments. The CORESET configuration 200 may include two OFDM symbols (as illustrated by the two columns, wherein each column represents an OFDM symbol). The CORESET configuration 200 may be configured with REGBs having two REGs per REGB. In particular, an REGB may be represented in FIG. 2 by consecutive REGs (represented by squares in the graphical representation) that have been assigned the same number. For example, a first REGB 202 may include first REG 204 and second REG 206, which are both numbered '1' in the illustrated embodiment. The illustrated embodiment of the CORESET configuration 200 may be for user equipment of AL1. User equipment of higher aggregation levels may aggregate the REGBs, as is described further throughout this disclosure.

The REGs within the CORESET may be cyclically numbered from '1' to a number of CCEs in the CORESET configuration 200, wherein the numbering may define the CCE index for each REG. The REGs may be numbered in a frequency-first order or in a time-first order. The CORESET configuration 200 is illustrated with eight CCEs and with REGs numbered in frequency-first order. In particular, the numbering may begin at the first REG 204 and continue to the next REG in the frequency domain, which is the second REG 206.

The bundling direction of the REGBs within the CORESET configuration 200 may be in a frequency-first order or a time-first order. The bundling direction may be the same direction as the REG numbering or a different direction than the REG numbering. The bundling direction may refer to a direction in which a subsequent REGB is numbered after completion of numbering of a current REGB. For example, after the first REG 204 and the second REG 206, of the first REGB 202, have been numbered '1' in the frequency-first order, numbering of the REGs may progress in time-first order (which is the bundling direction of the CORESET configuration 200) and number a third REG 208, followed by a fourth REG 210 with '2' in the frequency-first order to generate a second REGB 212.

The numbering may begin at '1' and may remain at '1' until the number of REGs to be included in an REGB are assigned that number, at which point the number may be incremented. Once the numbering reaches the number of CCEs in the CORESET configuration 200 and the number of REGs to be included in the REGB are numbered with the number equal to the number of CCEs, the numbering may cycle back to '1' for numbering the next REG in the CORESET.

In the illustrated embodiment, the numbering may start at the first REG 204 and proceed to the second REG 206 in the frequency-first order, numbering the first REG 204 and the second REG 206 with '1'. The numbering may then increment and proceed, in the time-first order, to a third REG 208 and then, in a frequency-first order to a fourth REG 210, numbering the third REG 208 and the fourth REG 210 with '2', thereby generating a second REGB 212. After numbering the third REG 208 and the fourth REG 210 with '2', the numbering may increment and may attempt to proceed in the time-first order. However, as the CORESET does not include any more REGs in the time-first order from the second REGB 212, the numbering may wrap around to the next available REGs in the first OFDM symbol 214, which may be a fifth REG 216. The numbering may then continue in the frequency-first order, numbering the fifth REG 216 and the sixth REG 218 with '3' and generating a third REGB 220. The numbering may continue to generation of an eighth REGB 222 that includes a seventh REG 224 and an eighth REG 226, which are both numbered '8'. The number of CCEs in the CORESET configuration 200 is eight in the illustrated embodiment, which may cause the numbering to cycle back to '1' after numbering of the eighth REGB 222. Accordingly, a ninth KEG 228 and a tenth REG 230, which are included in a ninth REGB 232, may be numbered with '1'. The numbering may continue as described until all the REGs in the CORESET have been numbered.

As may be noticed from CORESET 200, any NR-PDCCH candidate of AL1 is only transmitted within one of the OFDM symbols. For example, REGs numbered '1' comprise an NR-PDCCH candidate within the CORESET configuration 200. All the REGs of CORESET numbered '1' are located within the first OFDM symbol 214. Accordingly, the NR-PDCCH candidates of AL1 may not benefit from the possible time diversity available by utilizing different OFDM symbols.

Figure 3:
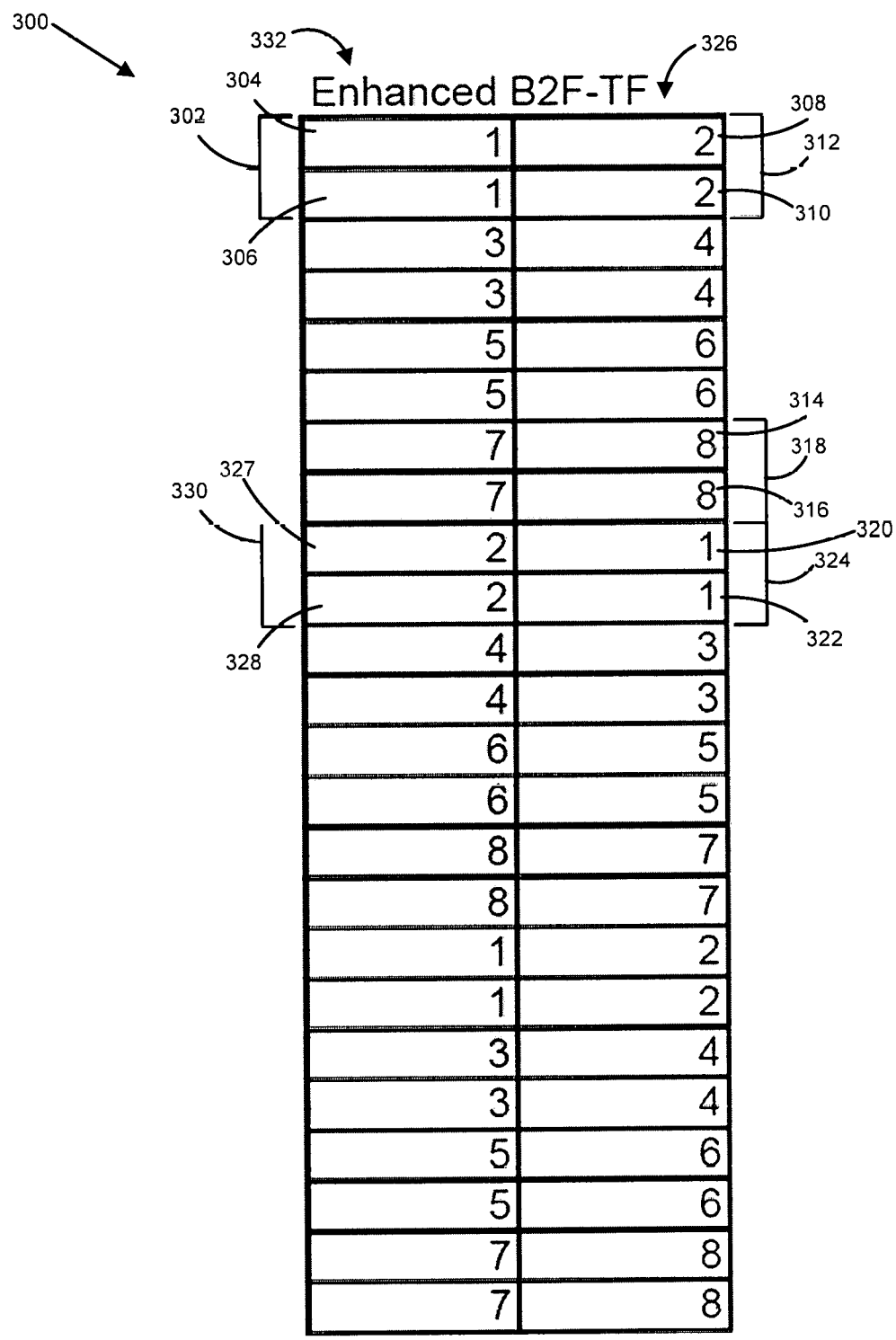
FIG. 3 illustrates a graphical representation of another example CORESET configuration, according to various embodiments.

FIG. 3 illustrates a graphical representation of another example CORESET configuration 300, according to various embodiments. The CORESET may include two OFDM symbols (as illustrated by the two columns, wherein each column represents an OFDM symbol). The CORESET configuration 300 may be configured with REGBs having two REGs per REGB. In particular, an REGB may be represented in FIG. 3 by consecutive REGs (represented by squares in the graphical representation) that have been assigned the same number. For example, a first REGB 302 may include first REG 304 and second REG 306, which are both numbered '1' in the illustrated embodiment. The illustrated embodiment of the CORESET configuration 300 may be for user equipment of AL1. User equipment of higher aggregation levels may aggregate the REGBs, as is described further throughout this disclosure.

The REGs within the CORESET may be cyclically numbered from '1' to a number of CCEs in the CORESET configuration 300, wherein the numbering may define the CCE index for each REG. The REGs may be numbered in a frequency-first order or in a time-first order. The CORESET 300 is illustrated with eight CCEs and with REGs numbered in frequency-first order. In particular, the numbering may begin at the first REG 304 and continue to the next REG in the frequency domain, which is the second REG 306.

The bundling direction of the REGBs within the CORESET configuration 300 may be in a frequency-first order or a time-first order. The bundling direction may be the same direction as the REG numbering or a different direction than the REG numbering. The bundling direction may refer to a direction in which a subsequent REGB is numbered after completion of numbering of a current REGB. For example, after the first REG 304 and the second REG 306, of the first REGB 302, have been numbered '1' in the frequency-first order, numbering of the REGs may progress in time-first order (which is the bundling direction of the CORESET configuration 300) and number a third REG 308, followed by a fourth REG 310 with '2' in the frequency-first order to generate a second REGB 312.

The numbering may begin at '1' and may remain at '1' until the number of REGs to be included in an REGB are assigned that number, at which point the number may be incremented. Once the numbering reaches the number of CCEs in the CORESET configuration 300 and the number of REGs to be included in the REGB are numbered with the number equal to the number of CCEs, the numbering may cycle back to '1' for numbering the next REG in the CORESET.

In the illustrated embodiment, the configuration of the CORESET configuration 300 may include a time-first order cyclic shift applied when the numbering cycles back to '1'. In the illustrated embodiment, after numbering of a fifth REG 314 and a sixth REG 316, both included in an eighth REGB 318, with '8', a cyclic shift may be applied in the time-first order, which may cause the numbering order to be cyclically shifted in the time-first order. Accordingly, the numbering may proceed to a seventh REG 320 and an eighth REG 322, both included in a ninth REGB 324, located within a second OFDM symbol 326. After generating the ninth REGB 324, the numbering may proceed in the time-first order to a ninth REG 327 and a tenth REG 328, both included in a tenth REGB 330, within a first OFDM symbol 332. The CORESET configuration 300 may continue to apply a time-first order cyclic shift each time the numbering cycles back to '1' throughout the CORESET 300. In other embodiments, the cyclic shift may be applied in a frequency-first order.

As may be noticed from CORESET 300, any NR-PDCCII candidate of AL1 may be transmitted within more than one OFDM symbol. In particular, each NR-PDCCH candidate of AL1 may be transmitted within two OFDM symbols. For example, REGs numbered '1' comprise an NR-PDCCH candidate within the CORESET 300. The first REG 304 and the second REG 306 numbered '1' are located within a first OFDM symbol 332, whereas the seventh REG 320 and the eighth REG 322 numbered '1' are located within the second OFDM symbol 326. Accordingly, the CORESET 300 may employ an enhanced 2D/2-level of REGB numbering, which may be performed to enhance the time diversity of each NR-PDCCH candidate of AL1.

Figure 4:
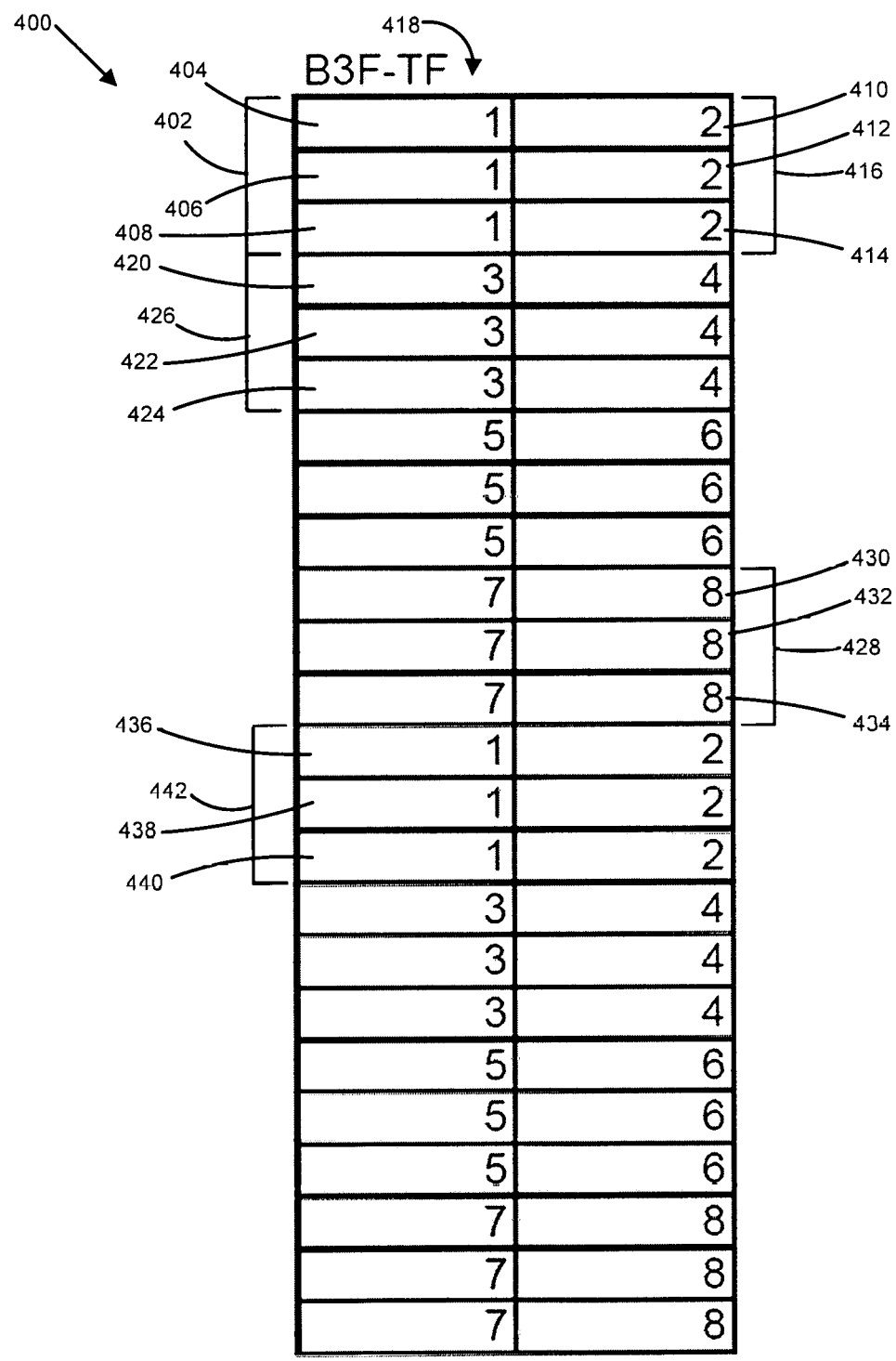
FIG. 4 illustrates a graphical representation of another example CORESET configuration, according to various embodiments.

FIG. 4 illustrates a graphical representation of another example CORESET configuration 400, according to various embodiments. The CORESET may include two OFDM symbols (as illustrated by the two columns, wherein each column represents an OFDM symbol). The CORESET configuration 400 may be configured with REGBs having three REGs per REGB. In particular, an REGB may be represented in FIG. 4 by consecutive REGs (represented by squares in the graphical representation) that have been assigned the same number. For example, a first REGB 402 may include first REG 404, second REG 406, and third REG 408, which are all numbered '1' in the illustrated embodiment. The illustrated embodiment of the CORESET configuration 400 may be utilized for user equipment of AL1. User equipment of higher aggregation levels may aggregate the REGBs, as is described further throughout this disclosure.

The REGs within the CORESET may be cyclically numbered from '1' to a number of CCEs in the CORESET configuration 400, wherein the numbering may define the CCE index for each REG. The REGs may be numbered in a frequency-first order or in a time-first order. The CORESET configuration 400 is illustrated with eight CCEs and with REGs numbered in frequency-first order. In particular, the numbering may begin at the first REG 404 and continue to the next REG in the frequency domain, which is the second REG 406.

The bundling direction of the REGBs within the CORESET configuration 400 may be in a frequency-first order or a time-first order. The bundling direction may be the same direction as the REG numbering or a different direction than the REG numbering. The bundling direction may refer to a direction in which a subsequent REGB is numbered after completion of numbering of a current REGB. For example, after the first REG 404, the second REG 406, and the third REG 408, of the first REGB 402, have been numbered '1' in the frequency-first order, numbering of the REGs may progress in time-first order (which is the bundling direction of the CORESET configuration 400) and number a fourth REG 410, followed by a fifth REG 412 and a sixth REG 414 with '2' in the frequency-first order to generate a second REGB 416.

The numbering may begin at '1' and may remain at '1' until the number of REGs to be included in an REGB are assigned that number, at which point the number may be incremented. Once the numbering reaches the number of CCEs in the CORESET configuration 400 and the number of REGs to be included in the REGB are numbered with the number equal to the number of CCEs, the numbering may cycle back to '1' for numbering the next REG in the CORESET.

In the illustrated embodiment, the numbering may start at the first REG 404 and and proceed to the second REG 406 and the third REG 408 in the frequency-first order, numbering the first REG 404, the second REG 406, and the third REG 408 with '1'. The numbering may then increment and proceed, in the time-first order, to a fourth REG 410 and then, in a frequency-first order to a fifth REG 412 and a sixth REG 414, numbering the fourth REG 410, the fifth REG 412, and the sixth REG 414 with '2', thereby generating a second REGB 416. After numbering the fourth REG 410, the fifth REG 412, and the sixth REG 414 with '2', the numbering may increment and may attempt to proceed in the time-first order. However, as the CORESET does not include any more REGs in the time-first order from the second REGB 416, the numbering may wrap around to the next available REGs in the first OFDM symbol 418, which may be a seventh REG 420. The numbering may then continue in the frequency-first order, numbering the seventh REG 420, an eighth REG 422, and a ninth REG 424 with '3' and generating a third REGB 426. The numbering may continue to generation of an eighth REGB 428 that includes a tenth REG 430, an eleventh REG 432, and a twelfth REG 434, which are all numbered '8'. The number of CCEs in the CORESET configuration 400 is eight in the illustrated embodiment, which may cause the numbering to cycle back to '1' after numbering of the eighth REGB 428. Accordingly, a thirteenth REG 436, a fourteenth REG 438, and a fifteenth REG 440, which are included in a ninth REGB 442, may be numbered with '1'. The numbering may continue as described until all the REGs in the CORESET have been numbered.

As may be noticed from CORESET configuration 400, any NR-PDCCH candidate of AL1 is only transmitted within one of the OFDM symbols. For example, REGs numbered '1' comprise an NR-PDCCH candidate within the CORESET 400. All the REGs of CORESET 400 numbered '1' are located within the first OFDM symbol 418. Accordingly, the NR-PDCCH candidates of AL1 may not benefit from the possible time diversity available by utilizing different OFDM symbols.

Figure 5:
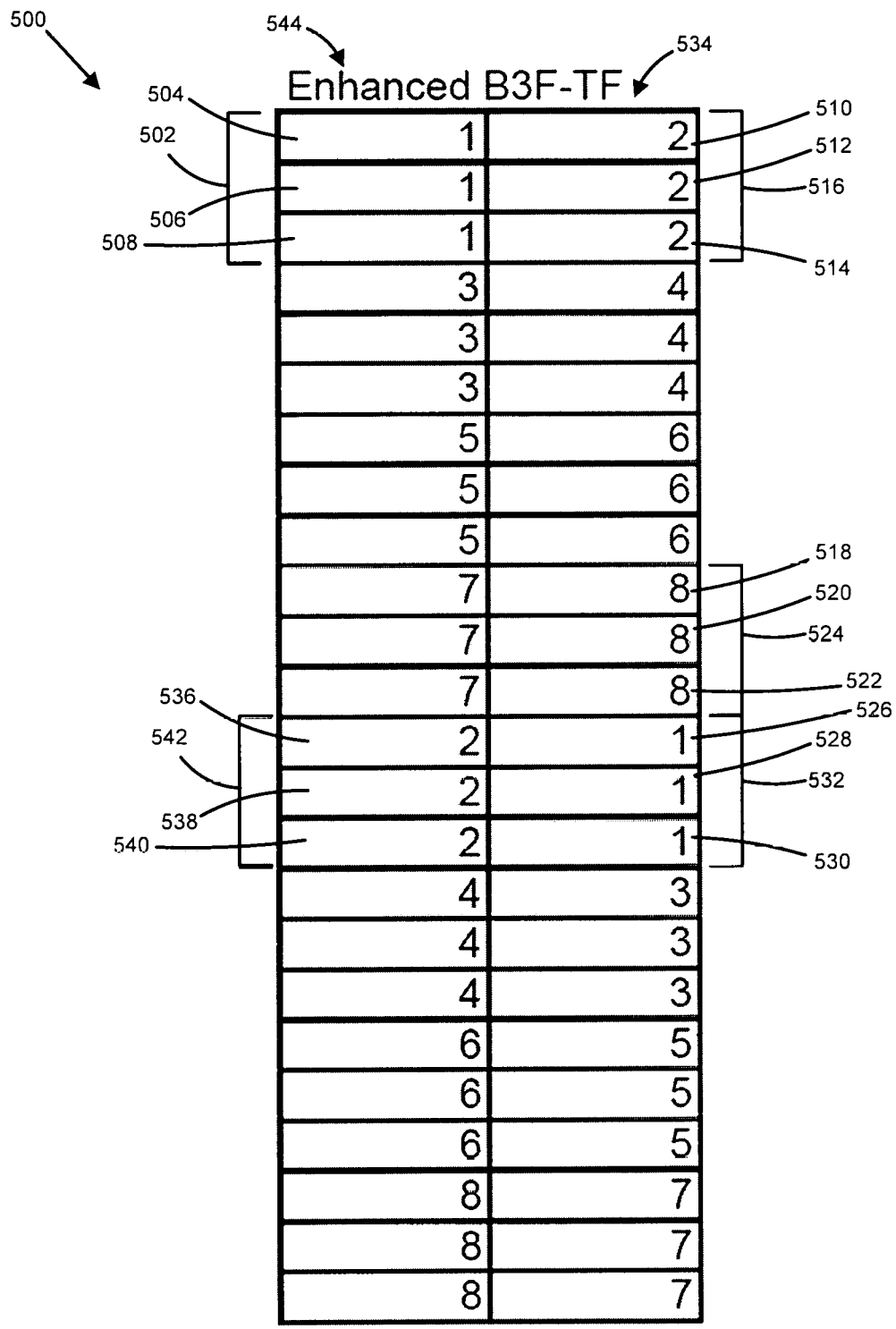
FIG. 5 illustrates a graphical representation of another example CORESET configuration, according to various embodiments.

FIG. 5 illustrates a graphical representation of another example CORESET configuration 500, according to various embodiments. The CORESET may include two OFDM symbols (as illustrated by the two columns, wherein each column represents an OFDM symbol). The CORESET configuration 500 may be configured with REGBs having three REGs per REGB. In particular, an REGB may be represented in FIG. 5 by consecutive REGs (represented by squares in the graphical representation) that have been assigned the same number. For example, a first REGB 502 may include first REG 504, second REG 506, and third REG 508, which are all numbered '1' in the illustrated embodiment. The illustrated embodiment of the CORESET configuration 500 may be for user equipment of AL1. User equipment of higher aggregation levels may aggregate the REGBs, as is described further throughout this disclosure.

The REGs within the CORESET may be cyclically numbered from '1' to a number of CCEs in the CORESET configuration 500, wherein the numbering may define the CCE index for each REG. The REGs may be numbered in a frequency-first order or in a time-first order. The CORESET configuration 500 is illustrated with eight CCEs and with REGs numbered in frequency-first order. In particular, the numbering may begin at the first REG 504 and continue to the next REG in the frequency domain, which is the second REG 506.

The bundling direction of the REGBs within the CORESET configuration 500 may be in a frequency-first order or a time-first order. The bundling direction may be the same direction as the REG numbering or a different direction than the REG numbering. The bundling direction may refer to a direction in which a subsequent REGB is numbered after completion of numbering of a current REGB. For example, after the first REG 504, the second REG 506, and the third REG 508, of the first REGB 502, have been numbered '1' in the frequency-first order, numbering of the REGs may progress in time-first order (which is the bundling direction of the CORESET 500) and number a fourth REG 510, followed by a fifth REG 512 and sixth REG 514 with '2' in the frequency-first order to generate a second REGB 516.

The numbering may begin at '1' and may remain at '1' until the number of REGs to be included in an REGB are assigned that number, at which point the number may be incremented. Once the numbering reaches the number of CCEs in the CORESET 500 and the number of REGs to be included in the REGB are numbered with the number equal to the number of CCEs, the numbering may cycle back to '1' for numbering the next REG in the CORESET.

In the illustrated embodiment, the CORESET configuration 500 may include a time-first order cyclic shift applied when the numbering cycles back to '1'. In the illustrated embodiment, after numbering of a seventh REG 518, an eighth REG 520, and a ninth REG 522, all included in an eighth REGB 524, with '8', a cyclic shift may be applied in the time-first order, which may cause the numbering order to be cyclically shifted in the time-first order. Accordingly, the numbering may proceed to a tenth REG 526, an eleventh REG 528, and a twelfth REG 530, all included in a ninth REGB 532 located within a second OFDM symbol 534. After generating the ninth REGB 532, the numbering may proceed in the time-first order to a thirteenth REG 536, a fourteenth REG 538, and a fifteenth REG 540, all included in a tenth REGB 542, within a first OFDM symbol 544. The configuration of the CORESET 500 may continue to apply a time-first order cyclic shift each time the numbering cycles back to '1' throughout the CORESET 500. In other embodiments, the cyclic shift may be applied in a frequency-first order.

As may be noticed from CORESET configuration 500, any NR-PDCCH candidate of AL1 may be transmitted within more than one OFDM symbol. In particular, each NR-PDCCH candidate of AL1 may be transmitted within two OFDM symbols. For example, REGs numbered '1' comprise an NR-PDCCH candidate within the CORESET configuration 500. The first REG 504, the second REG 506, and the third REG 508 numbered '1' are located within the first OFDM symbol 544, whereas the tenth REG 526, the eleventh REG 528, the twelfth REG 530 numbered '1' are located within the second OFDM symbol 534. Accordingly, the CORESET configuration 500 may employ an enhanced 2D/2-level of REGB numbering, which may be performed to enhance the time diversity of each NR-PDCCH candidate of AL1.

Figure 6:
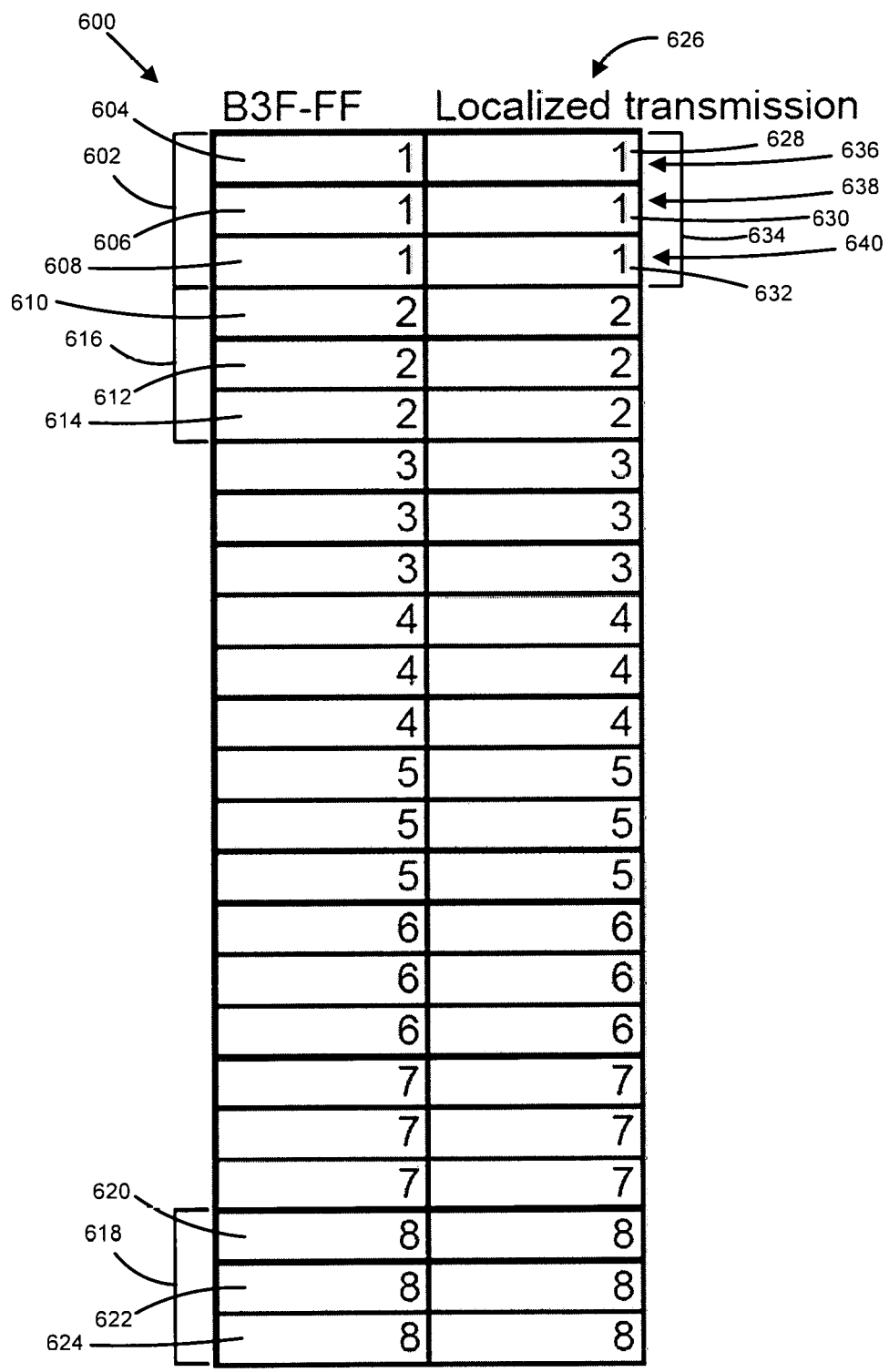
FIG. 6 illustrates a graphical representation of another example CORESET configuration, according to various embodiments.

FIG. 6 illustrates a graphical representation of another example CORESET configuration 600, according to various embodiments. The CORESET may include two OFDM symbols (as illustrated by the two columns, wherein each column represents an OFDM symbol). The CORESET configuration 600 may be configured with REGBs having three REGs per REGB. In particular, an REGB may be represented in FIG. 6 by consecutive REGs (represented by squares in the graphical representation) that have been assigned the same number. For example, a first REGB 602 may include first REG 604, second REG 606, and third REG 608, which are all numbered '1' in the illustrated embodiment. The illustrated embodiment of the CORESET configuration 600 may be for user equipment of AL1. User equipment of higher aggregation levels may aggregate the REGBs, as is described further throughout this disclosure.

The REGs within the CORESET may be cyclically numbered from '1' to a number of CCEs in the CORESET configuration 600, wherein the numbering may define the CCE index for each REG. The REGs may be numbered in a frequency-first order or in a time-first order. The CORESET configuration 600 is illustrated with eight CCEs and with REGs numbered in frequency-first order. In particular, the numbering may begin at the first REG 604 and continue to the next REG in the frequency domain, which is the second REG 606.

The bundling direction of the REGBs within the CORESET configuration 600 may be in a frequency-first order or a time-first order. The bundling direction may be the same direction as the REG numbering or a different direction than the REG numbering. The bundling direction may refer to a direction in which a subsequent REGB is numbered after completion of numbering of a current REGB. For example, after the first REG 604, the second REG 606, and the third REG 608, of the first REGB 602, have been numbered '1' in the frequency-first order, numbering of the REGs may progress in frequency-first order (which is the bundling direction of the CORESET configuration 600 ) and number a fourth REG 610, followed by a fifth REG 612 and a sixth REG 614 with '2' in the frequency-first order to generate a second REGB 616.

The numbering may begin at '1' and may remain at '1' until the number of REGs to be included in an REGB are assigned that number, at which point the number may be incremented. Once the numbering reaches the number of CCEs in the CORESET configuration 600 and the number of REGs to be included in the REGB are labeled with the number equal to the number of CCEs, the numbering may cycle back to '1' for numbering the next REG in the CORESET.

In the illustrated embodiment, the numbering may start at the first REG 604 and proceed to the second REG 606 and the third REG 608 in the frequency-first order, numbering the first REG 604, the second REG 606, and the third REG 608 with '1'. The numbering may then increment and proceed, in the frequency-first order, to a fourth REG 610 and then, in a frequency-first order to a fifth REG 612 and a sixth REG 614, numbering the fourth REG 610, the fifth REG 612, and the sixth REG 614 with '2', thereby generating a second REGB 616. After numbering the fourth REG 610, the fifth REG 612, and the sixth REG 614 with '2', the numbering may increment and may proceed in the frequency-first order.

The numbering may continue to generation of an eighth REGB 618 that includes a seventh REG 620, an eighth REG 622, and a ninth REG 624, which are all numbered '8'. The number of CCEs in the CORESET configuration 600 is eight in the illustrated embodiment, which may cause the numbering to cycle back to '1' after numbering of the eighth REGB 618. Further, after numbering the seventh REG 620, the eighth REG 622, and the ninth KEG 624 with '8', the numbering may attempt to proceed in the frequency-first order. However, as the CORESET 600 does not include any more REGs in the frequency-first order from the eighth REGB 618, the numbering may wrap around to the next available REGs in the next OFDM symbol (in this case, second OFDM symbol 626), which may be a tenth REG 628. The numbering may then continue in the frequency-first order, numbering the tenth REG 628, an eleventh REG 630, and a twelfth REG 632 with '1' and generating a ninth REGB 634. The numbering may continue as described until all the REGs in the CORESET have been numbered.

As may be noticed from CORESET configuration 600, any NR-PDCCH candidate of AL1 is only transmitted within three frequencies. For example, REGs numbered '1' comprise an NR-PDCCH candidate within the CORESET configuration 600. All the REGs of CORESET configuration 600 numbered '1' are located within a first frequency position 636, a second frequency position 638, or a third frequency position 640. This resultant arrangement of NR-PDCCH candidates of AL1 may be an unwanted localized transmission arrangement, whereas a distributed transmission arrangement may be preferred.

Figure 7:
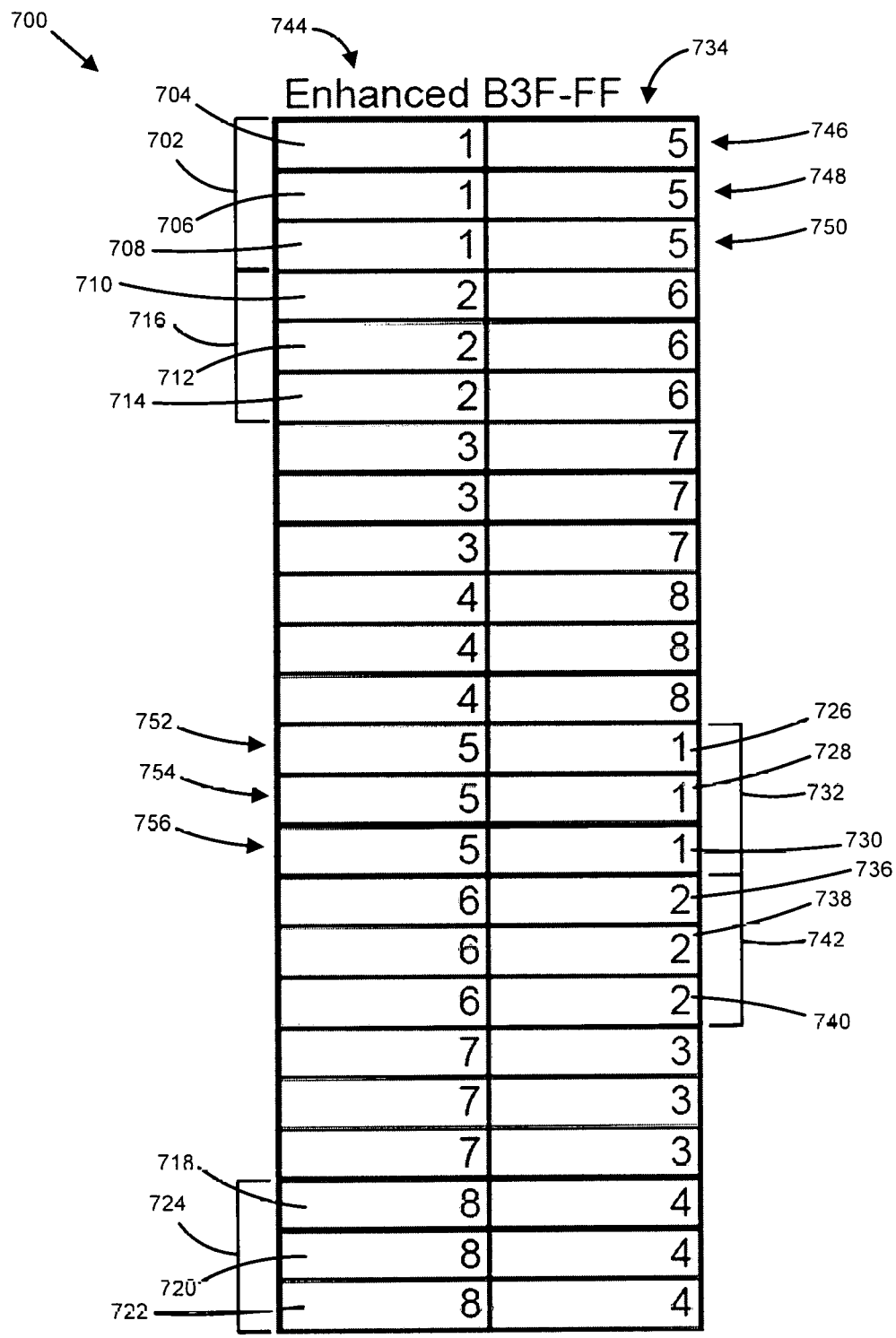
FIG. 7 illustrates a graphical representation of another example CORESET configuration, according to various embodiments.

FIG. 7 illustrates a graphical representation of another example CORESET configuration 700, according to various embodiments. The CORESET may include two OFDM symbols (as illustrated by the two columns, wherein each column represents an OFDM symbol). The CORESET configuration 700 may be configured with REGBs having three REGs per REGB. In particular, an REGB may be represented in FIG. 7 by consecutive REGs (represented by squares in the graphical representation) that have been assigned the same number. For example, a first REGB 702 may include first REG 704, second REG 706, and third REG 708, which are all numbered '1' in the illustrated embodiment. The illustrated embodiment of the CORESET configuration 700 may be for user equipment of AL1. User equipment of higher aggregation levels may aggregate the REGBs, as is described further throughout this disclosure.

The REGs within the CORESET may be cyclically numbered from '1' to a number of CCEs in the CORESET configuration 700, wherein the numbering may define the CCE index for each REG. The REGs may be numbered in a frequency-first order or in a time-first order. The CORESET configuration 700 is illustrated with eight CCEs and with REGs numbered in frequency-first order. In particular, the numbering may begin at the first REG 704 and continue to the next REG in the frequency domain, which is the second REG 706.

The bundling direction of the REGBs within the CORESET configuration 700 may be in a frequency-first order or a time-first order. The bundling direction may be the same direction as the REG numbering or a different direction than the REG numbering. The bundling direction may refer to a direction in which a subsequent REGB is numbered after completion of numbering of a current REGB. For example, after the first REG 704, the second REG 706, and the third REG 708, of the first REGB 702, have been numbered '1' in the frequency-first order, numbering of the REGs may progress in frequency-first order (which is the bundling direction of the CORESET configuration 700) and number a fourth REG 710, followed by a fifth REG 712 and sixth REG 714 with '2' in the frequency-first order to generate a second REGB 716.

The numbering may begin at '1' and may remain at '1' until the number of REGs to be included in an REGB are assigned that number, at which point the number may be incremented. Once the numbering reaches the number of CCEs in the CORESET configuration 700 and the number of REGs to be included in the REGB are labeled with the number equal to the number of CCEs, the numbering may cycle back to '1' for numbering the next REG in the CORESET.

In the illustrated embodiment, the CORESET configuration 700 may include a frequency-first order cyclic shift applied when the numbering cycles back to '1'. In particular, the frequency-first order cyclic shift may shift by half of the number of REGs in the frequency domain in the illustrated embodiment, although the shift amount may be different in other embodiments. In the illustrated embodiment, after numbering of a seventh REG 718, an eighth REG 720, and a ninth REG 722, all included in an eighth REGB 724, with '8', a cyclic shift may be applied in the time-first order, which may cause the numbering order to be cyclically shifted in the time-first order. Accordingly, the numbering may proceed to a tenth REG 726, an eleventh REG 728, and a twelfth REG 730, all included in a ninth REGB 732 located within a second OFDM symbol 734. After generating the ninth REGB 732, the numbering may proceed in the frequency-first order to a thirteenth REG 736, a fourteenth REG 738, and a fifteenth REG 740, all included in a tenth REGB 742, within the second OFDM symbol 734. The CORESET configuration 700 may continue to apply a frequency-first order cyclic shift each time the numbering cycles back to '1' throughout the CORESET. In other embodiments, the cyclic shift may be applied in a time-first order.

As may be noticed from CORESET configuration 700, each NR-PDCCH candidate of AL1 may be transmitted at different frequency locations within a first OFDM symbol 744. In particular, each NR-PDCCH candidate of AL1 may be transmitted within two OFDM symbols. For example, REGs numbered '1' comprise an NR-PDCCH candidate within the CORESET configuration 700. The first REG 704, the second REG 706, and the third REG 708 numbered '1' are located within a first frequency position 746, a second frequency position 748, and a third frequency position 750, respectively. Whereas the tenth REG 726, the eleventh REG 728, the twelfth REG 730 numbered '1' are located within the a fourth frequency position 752, a fifth frequency position 754, and a sixth frequency position 756, respectively. Accordingly, the CORESET configuration 700 may employ enhanced 2D/2-level interleaver based REGB numbering, which may address the unwanted localized transmission arrangement presented in FIG. 6. In particular, applying the cyclically shifted REGB numbering, illustrated in FIG. 7, in the second OFDM symbol 734, or the second REGB counting cycle, may convert the localized NR-PDCCH candidate transmission of AL1 illustrated in FIG. 6 to the distributed NR-PDCCH candidate transmission of AL1 in both time and frequency domains in the CORESET.

Based on FIGS. 2-7, it may be observed that enhanced 2D/2-level of interleaver based REGB numbering may improve the time and frequency diversity of distributed NR-PDCCH.

Figure 8:
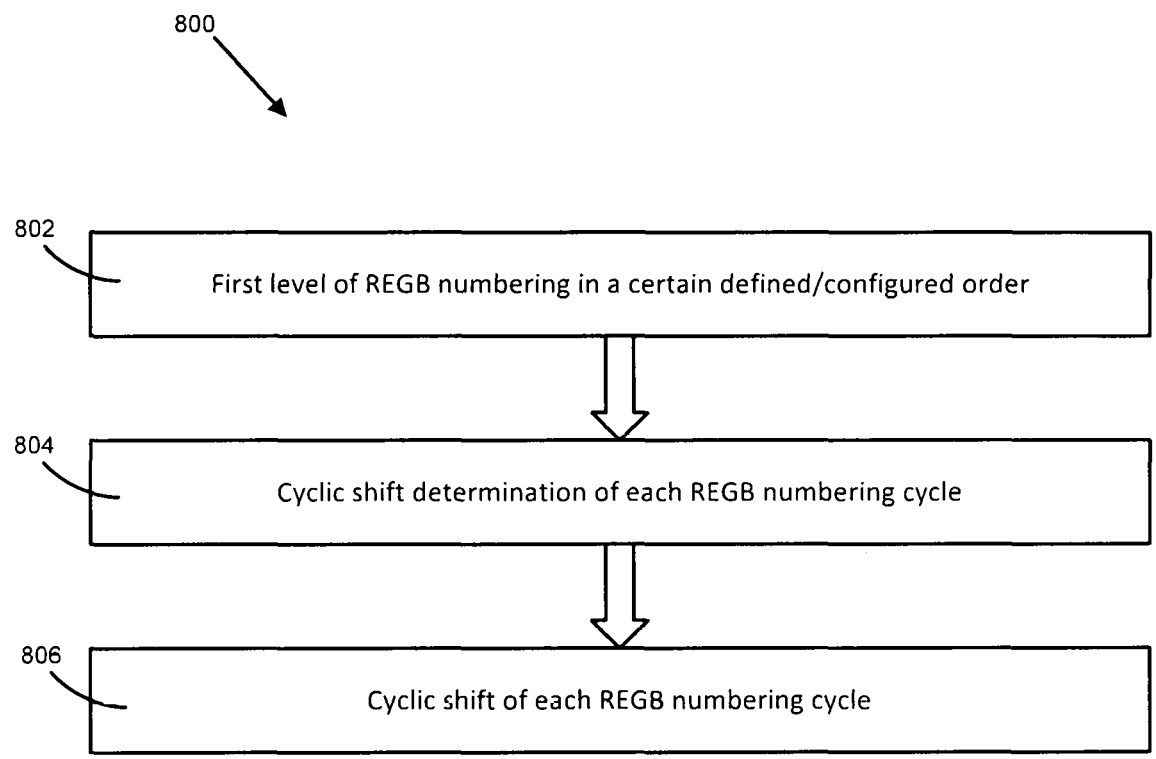
FIG. 8 illustrates an example procedure of resource element group bundle numbering, according to various embodiments.

FIG. 8 illustrates an example procedure 800 of resource element group bundle numbering, according to various embodiments. In particular, the procedure 800 may be utilized for enhanced 2D/2-level interleaver based REGB numbering. The procedure 800 may be performed by a next generation NodeB (gNB), with signaling between the gNB and a UE to coordinate NR-PDCCH transmissions between the gNB and the UE. In other embodiments, the procedure 800 may be performed by a UE, with signaling between the UE and a gNB to coordinate NR-PDCCH transmissions between the gNB and the UE. In some embodiments, the signaling may be high layer signaling and/or RRC signaling.

In stage 802, REGs may be numbered within REGBs according to a certain defined/configured order, as described throughout this disclosure. In particular, numbering of the REGs may begin at an initial REG within the CORESET, may proceed with REG numbering in a time-first order or a frequency-first order, and may proceed with bundling direction in a time-first order or a frequency-first order. The direction of the REG numbering and/or the bundling direction may be defined in the specification, signaled in a configuration message from a next generation NodeB to a UE, or some combination thereof. Stage 802 may include REG numbering of a first level of REGBs, wherein the first level may include numbering from the initial REG to a last REG at which the REG numbering cycles back to '1' the first time. It is to be understood that the second level of REGB may include numbering from the REG following the first level to the second time the REG number cycles back to '1', and so on.

In stage 804, a cyclic shift of each REGB numbering cycle may be determined. AN REGB numbering cycle may refer to a level of the REG numbering. For example, a first REGB numbering cycle may refer to the numbering of the first level of REGBs.

The cyclic shift of each REGB numbering cycle may be determined to maximize the time diversity and/or the frequency diversity for each CCE. For example, the cyclic shift may be determined such that a total number of REGBs of a particular NR-PDCCH may be evenly distributed in both time domain and frequency. In cases where a number of OFDM symbols in a CORESET is greater than a number of REGBs of an NR-PDCCH, a subset of OFDM symbols of the CORESET may be chosen for REGBs of the NR-PDCCH. In some embodiments, a cyclic shift of the REGB number cycles may not be required for all of the REGB numbering cycles to achieve maximum time-frequency diversity of the NR-PDCCH. Further, in some embodiments (including some of the embodiments where the cyclic shift of the REGB number cycles may not be required for all REGB numbering cycles), a first level of REGB numbering may be enough. The cyclic shift of each REGB numbering cycle may be determined prior to numbering any of the REGs, at the conclusion of the numbering of each of the numbering cycles, or some combination thereof.

In stage 806, the cyclic shift may be performed for each REGB numbering cycle. In particular, upon completion of an REGB numbering cycle, the cyclic shift corresponding to the next REGB numbering cycle may be performed. The numbering for the next REGB numbering cycle may be performed after the cyclic shift has been performed. In particular, numbering in a certain defined/configured order may be performed for the next REGB numbering cycle. Stage 802, stage 804, and stage 806 may be repeated for each REGB numbering cycle of a CORESET.

Further, in long term evolution (LTE), physical downlink control channel (PDCCH) may perform downlink data scheduling and uplink data assignment. Each UE may be configured with one or more control channel SS, where a number of PDCCH blind decoding (BD) candidates within the SS may be defined. To support link adaptation, several ALs of CCE targeting at different link quality or coverage may be employed for the control channel. For example, LTE PDCCH may support AL1, 2, 4 and 8, and a PDCCH at AL×INCLUDES×CCEs, accordingly. A control channel SS may include multiple BD candidates at every supported AL. For instance, in LTE, a UE-specific SS may include 6 AL1 BD candidates, 6 aggregation level 2 (AL2) BD candidates, 2 aggregation level 4 (AL4) candidates and 2 aggregation level 8 (AL8) candidates. The number of BD candidates may be chosen to achieve good trade-off between desired control channel blocking probability and UE BD computation complexity. The UE in the cell may monitor the configured SSes in every transmit time interval (TTI) by performing blind decoding attempts. Once a transmitted PDCCH is correctly decoded by a UE, the UE may further demodulate the scheduled downlink data channel or transmit the assigned uplink data. These fundamental functions of PDCCH may be adopted in 5G new radio (NR) as well. However, due to the minimization of "always-on" signal, i.e., absence of cell-specific reference signal (CRS) in NR, unlike LTE PDCCH which makes use of CRS for channel estimation and coherence demodulation, the NR-PDCCH may employ UE-specific demodulation reference signal (DMRS). Moreover, each NR UE may be configured with one or more control resource sets that include a number of resource blocks (RB), on which the NR-PDCCTI SS may be defined.

Embodiments herein may relate to various approaches to design the NR-PDCCH SS to optimize different performance criteria/targets. The described approaches may aim to provide good trade-off among provisioned NR-PDCCH link budget coverage, UE blind decoding complexity and resulted blocking probability of multiple UEs served by same gNB.

Embodiments herein may relate to one or more of three categories of SS design, namely localized NR-PDCCH SS (LSS), distributed NR-PDCCH SS (DSS), and hierarchical NR-PDCCH SS (HSS). In LSS, each localized NR-PDCCH BD candidate within a configured CORESET may be transmitted in a frequency localized manner. Further, each localized NR-PDCCH BD candidate may include consecutive REGs, which may be numbered in a time-first order. A gNB may schedule the localized NR-PDCCH to benefit from potential frequency selective scheduling gain, better beam-forming gain, possible enhanced channel estimation with less DMRS overhead, or some combination thereof.

In DSS, each distributed NR-PDCCH BD candidate within a configured CORESET may be transmitted in a distributed manner in both the time domain and the frequency domain. Further, each distributed NR-PDCCH BD candidate may include REGS which are evenly distributed in both time and frequency domain to maximize the achievable time-frequency diversity. A gNB may configure the distributed NR-PDCCH to benefit from the maximum available time-frequency diversity, provided that the gNB is not able to perform more advanced scheduling due to a lack of accurate channel state information (CSI) knowledge.

In HSS, the NR-PDCCH within a CORESET at the lowest aggregation level (which may be AL1) may be formed by a localized NR-PDCCH or a distributed NR-PDCCH. The NR-PDCCH of higher ALs may include several NR-PDCCHs of lower ALs. such that the demodulated REs for NR-PDCCH BD candidates of lower ALs can be reused for BD candidate of higher ALs.

The HSS may include one or more hierarchical SS structures. The hierarchical SS structures may define characteristics of the SS and/or CORESET to which the hierarchical SS structures are to be applied. The characteristics may include whether the AL1 BD candidates are to be bundled, a bundling direction (either time-first order or frequency-first order), whether the AL1 BD candidates are to be REG based localized NR-PDCCH or REG based distributed NR-PDCCH, a numbering direction of the AL1 BD candidates, an aggregation direction (either in the time domain or in the frequency domain) of the BD candidates in higher ALs, or some combination thereof.

In some embodiments, the HSS may include 12 hierarchical structures. A first hierarchical SS structure (H1) may include AL1 BD candidates that are REG based localized NR-PDCCH. The AL1 BD candidates of HI may be numbered in a time-first order. Further, the BD candidates of higher ALs of HI may aggregate the BD candidates of lower ALs in the time domain.

A second hierarchical SS structure (H2) may include AL1 BD candidates that are REG based distributed NR-PDCCH. The AL1 BD candidates of H2 may be numbered in a time-first order. Further, the BD candidates of higher ALs of H2 may aggregate the BD candidates of lower ALs in the time domain.

A third hierarchical SS structure (H3) may include REGBs that have a bundling direction of time-first order. The REGBs may include two or more consecutive REGs in the time domain. In some embodiments, the number of REGs in the REGBs may be defined by RRC signaling, as described above. The AL1 BD candidates of H3 may include REGBs based localized NR-PDCCH. The AL1 BD candidates of H3 may be numbered in a time-first order. Further, the BD candidates of higher ALs of H3 may aggregate the BD candidates of lower ALs in the time domain.

A fourth hierarchical SS structure (H4) may include REGBs that have a bundling direction of time-first order. The REGBs may include two or more consecutive REGs in the time domain. In some embodiments, the number of REGs in the REGBs may be defined by RRC signaling, as described above. The AL1 BD candidates of H4 may include REGBs based distributed NR-PDCCH. The AL1 BD candidates of H4 may be numbered in a time-first order. Further, the BD candidates of higher ALs of H4 may aggregate the BD candidates of lower ALs in the time domain.

A fifth hierarchical SS structure (H5) may include REGBs that have a bundling direction of frequency-first order. The REGBs may include two or more consecutive REGs in the frequency domain. In some embodiments, the number of REGs in the REGBs may be defined by RRC signaling, as described above. The AL1 BD candidates of H5 may include REGBs based localized NR-PDCCH. The AL1 BD candidates of H5 may be numbered in a time-first order. Further, the BD candidates of higher ALs of H5 may aggregate the BD candidates of lower ALs in the time domain.

A sixth hierarchical SS structure (H6) may include REGBs that have a bundling direction of frequency-first order. The REGBs may include two or more consecutive REGs in the frequency domain. In some embodiments, the number of REGs in the REGBs may be defined by RRC signaling, as described above. The AL1 BD candidates of H6 may include REGBs based distributed NR-PDCCH. The AL1 BD candidates of H6 may be numbered in a time-first order. Further, the BD candidates of higher ALs of H6 may aggregate the BD candidates of lower ALs in the time domain.

A seventh hierarchical SS structure (H7) may include AL1 BD candidates that are REG based localized NR-PDCCH. The AL1 BD candidates of H7 may be numbered in a frequency-first order. Further, the BD candidates of higher ALs of H7 may aggregate the BD candidates of lower ALs in the frequency domain.

An eighth hierarchical SS structure (H8) may include AL1 BD candidates that are REG based distributed NR-PDCCH. The AL1 BD candidates of H8 may be numbered in a frequency-first order. Further, the BD candidates of higher ALs of H8 may aggregate the BD candidates of lower ALs in the frequency domain.

A ninth hierarchical SS structure (H9) may include REGBs that have a bundling direction of time-first order. The REGBs may include two or more consecutive REGs in the time domain. In some embodiments, the number of REGs in the REGBs may be defined by RRC signaling, as described above. The AL1 BD candidates of H9 may include REGBs based localized NR-PDCCH. The AL1 BD candidates of H9 may be numbered in a frequency-first order. Further, the BD candidates of higher ALs of H9 may aggregate the BD candidates of lower ALs in the frequency domain.

A tenth hierarchical SS structure (H10) may include REGBs that have a bundling direction of time-first order. The REGBs may include two or more consecutive REGs in the time domain. In some embodiments, the number of REGs in the REGBs may be defined by RRC signaling, as described above. The AL1 BD candidates of H10 may include REGBs based distributed NR-PDCCH. The AL1 BD candidates of H10 may be numbered in a frequency-first order. Further, the BD candidates of higher ALs of H10 may aggregate the BD candidates of lower ALs in the frequency domain.

An eleventh hierarchical SS structure (H11) may include REGBs that have a bundling direction of frequency-first order. The REGBs may include two or more consecutive REGs in the frequency domain. In some embodiments, the number of REGs in the REGBs may be defined by RRC signaling, as described above. The AL1 BD candidates of H11 may include REGBs based localized NR-PDCCH. The AL1 BD candidates of H11 may be numbered in a frequency-first order. Further, the BD candidates of higher ALs of H11 may aggregate the BD candidates of lower ALs in the frequency domain.

A twelfth hierarchical SS structure (H12) may include REGBs that have a bundling direction of frequency-first order. The REGBs may include two or more consecutive REGs in the frequency domain. In some embodiments, the number of REGs in the REGBs may be defined by RRC signaling, as described above. The AL1 BD candidates of H12 may include REGBs based distributed NR-PDCCH. The AL1 BD candidates of H12 may be numbered in a frequency-first order. Further, the BD candidates of higher ALs of H12 may aggregate the BD candidates of lower ALs in the frequency domain.

Figure 9:
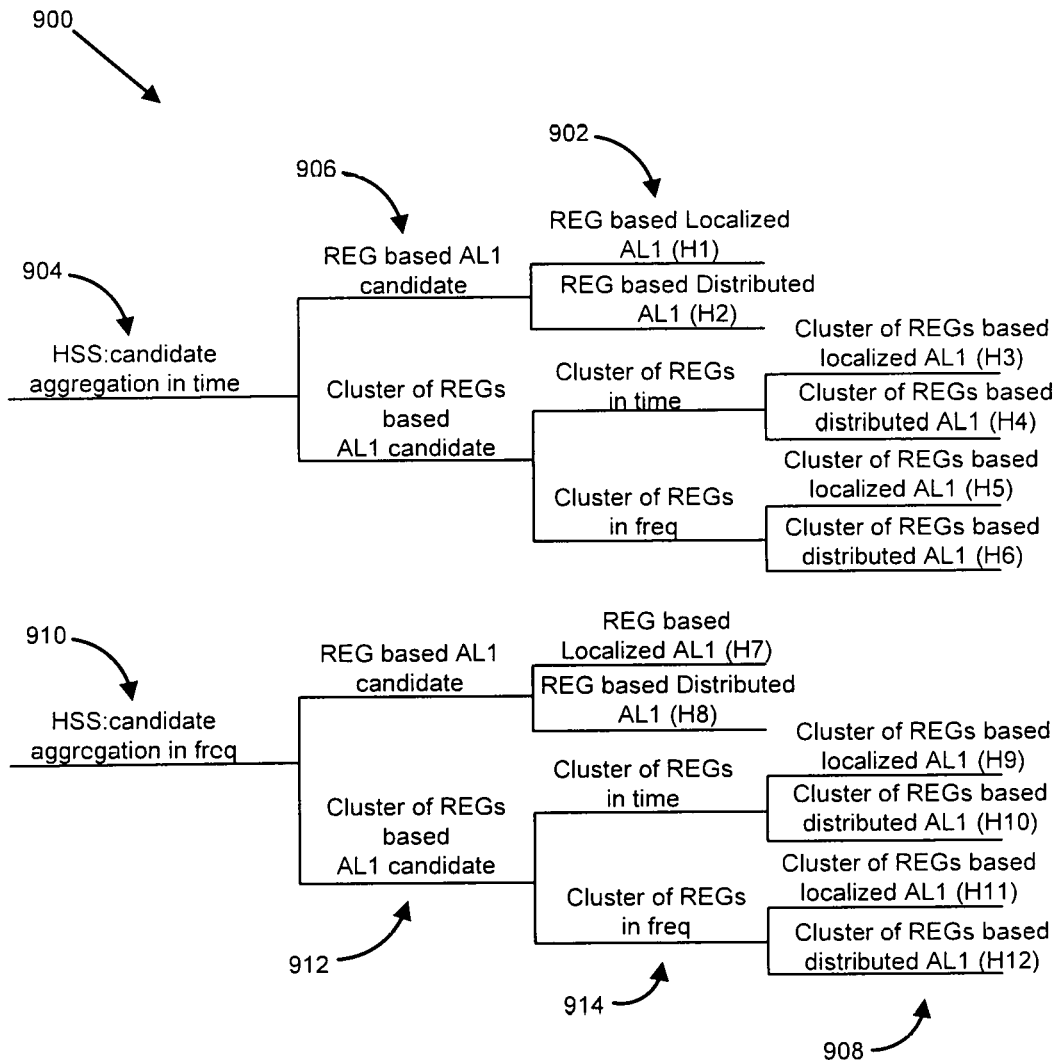
FIG. 9 illustrates a tree diagram for example hierarchical search space structures, according to various embodiments.

FIG. 9 illustrates a tree diagram 900 for the example hierarchical SS structures H1-H12, according to various embodiments. In particular, the segmentation tree 900 may include branches that include characteristics corresponding to the hierarchical SS structures, wherein the hierarchical SS structures are indicated as leaves at the right side of the tree diagram 900.

As an example, H1 may be represented at a first leaf 902 on a first root 904 of the tree diagram 900. The route from the first root 904 to the first leaf 902 may traverse a first branch 906. The first root 904 may include the characteristic of the BD candidates of the higher ALs aggregating the BD candidates of the lower ALs in the time domain, The first branch 906 may include the characteristic of the AL1 BD candidates being single REGs. The first leaf 902 may include the characteristic of the AL1 BD candidates being REG based localized NR-PDCCH. H1 may include all the characteristics of the first root 904, the first branch 906, and the first leaf 902.

As another example, H12 may be represented at a second leaf 908 on a second root 910 of the tree diagram 900. The route from the second root 910 to the second leaf 908 may traverse a second branch 912 and a third branch 914. The second root 910 may include the characteristic of the BD candidates of the higher ALs aggregating the BD candidates of the lower ALs in the frequency domain. The second branch 912 may include the characteristic of the AL1 BD candidates being REGBs. The third branch 914 may include the characteristic of the REGs within each REGB having a bundling direction of frequency-first order. The second leaf 908 may include the characteristic of the AL1 BD candidates being REG based distributed NR-PDCCH. H12 may include all the characteristics of the second root 910, the second branch 912, the third branch 914, and the second leaf 908.

The LSS may achieve the best frequency selective scheduling gain and beamforming gain if required CSI feedback is available at gNB, so that the best control channel spectrum efficiency may be potentially achieved. The DSS may achieve the maximum time-frequency diversity for the control channel when no CSI feedback is available at gNB.

The HSS, via the hierarchical SS structures H1-H12, may provide different advantages according to different design targets, channel conditions and CSI knowledge. For example, the hierarchical SS structures based on aggregation of AL1 candidates in time domain (which include H1-H6) may be suitable to UEs with less time-varying channels, so that front-loaded DMRS can be shared by different REGs in the same RB. On the other hand, the hierarchical SS structures based on aggregation of AL1 candidates in frequency domain (which include H7-H12) may be more feasible to UEs with less frequency-selective channels, so that REGs in consecutive RBs may apply same precoding and better channel estimation performance may be achieved. Similar reasoning may also be valid to a different way of creating a cluster of REGs, i.e., in time domain (which include H3, H4, H9 and H10) and frequency domain (which include H5, H6, H11 and H12).

The following description may refer to multiple symbols. $N_{RB}$ may be a number of physical resource blocks (PRBs)

configured for a particular NR-PDCCH set. The value of $N_{RB}$ may allow at least one BD candidate with supported maximum AL.

$K \in \{1, 2, 4, \ldots\}$ may be a number of OFDM symbols configured for a particular NR-PDCCH set.

$L \in \{1, 2, 4, 8, 16\}$ may be a number of aggregation levels in terms of number of CCEs per NR-PDCCH transmission.

$Q \in \{4, 6\}$ may be a number of REGs per CCE, which can be dependent on DMRS overhead.

$n_{RB}{}^L$ may be a number of PRBs spanned by a candidate of aggregation level L.

$n_{BD}{}^L$ may be a number of blind decoding candidates of aggregation level L.

$\tilde{n}_{BD}{}^L$ may be a high layer configured maximum number of BD candidates of aggregation level L, e.g., legacy LTE, e.g., 6, 6, 2, 2 for AL1, 2, 4, 8, respectively. In some embodiments, 8, 4, 2, and 1 may be used to enable nested structure of BD candidates in the current TTI/slot/mini-slot.

In some embodiment, L may be 1, 2, 4, and 8, and may correspond to $n_{BD}{}^L$ of 8, 4, 2, and 1, respectively.

In some embodiments where Q=4, K may be 1, 2, or 4. In embodiments where K is 1, $N_{RB, \, min}$ may be 32. In embodiments where K is 2, $N_{RB, \, min}$ may be 16. In embodiments where K is 4, $N_{RB, \, min}$ may be 8.

In some embodiments where Q=6, K may be 1, 2, or 3. In embodiments where K is 1, $N_{RB, \, min}$ may be 48. In embodiments where K is 2, $N_{RB, \, min}$ may be 24. In embodiments where K is 3, $N_{RB, \, min}$ may be 16.

Figure 10:
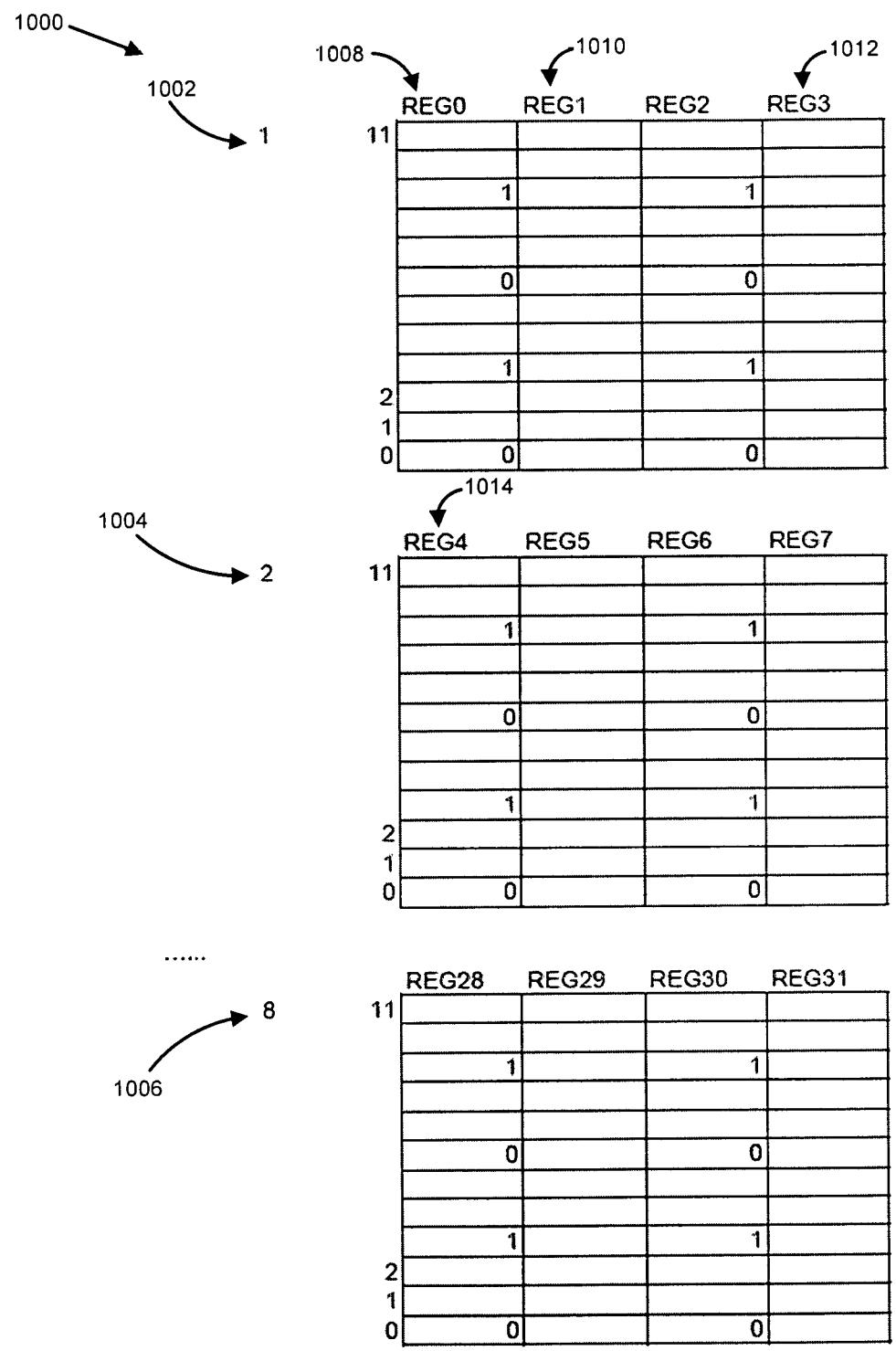
FIG. 10 illustrates a graphical representation of another example CORESET configuration, according to various embodiments.

FIG. 10 illustrates a graphical representation of another example CORESET configuration 1000, according to various embodiments. In particular, each box of the graphical representation represents a subcarrier of the CORESET, wherein numbering of the subcarriers is shown directly to the left of the boxes. Further, the subcarriers may be organized into REGs and PRBs. Each column of subcarriers may correspond to an REG, wherein the number of the REG is shown above the column. Each group of subcarriers shown together may correspond to a PRB, wherein the number of the PRB is shown to the far left of the group.

The CORESET may include eight PRBs. For simplicity, a first PRB 1002, a second PRB 1004, and an eighth PRB 1006 are shown, and it is to be understood that the third PRB through the seventh PRB have the same arrangement as the first PRB 1002, the second PRB 1004, and the eighth PRB 1006. The CORESET may further include four OFDM symbols. The four OFDM symbols are represented by the four columns of subcarriers in each of the PRBs. The subcarriers of the CORESET may be scheduled for transmission via two DMRS antenna ports (APs). In the illustrated embodiment, subcarriers are labeled with '0' and '1' to indicate the DMRS AP for which the subcarrier is scheduled.

The REGs in the CORESET may be numbered in a time-first order. In particular, the numbering may begin at REG0 1008 of the first PRB 1002. From REG0 1008, the numbering may proceed in the time-first order to the next REG in time in the CORESET, which is REG1 1010. The numbering may proceed in time-first order to REG3 1012, which is the last REG in the time domain in the first PRB 1002 having the same frequency as REG0 1008. The numbering may then proceed to the first REG in the time domain within the next PRB in the frequency domain, which is REG4 1014. The numbering of REGs may proceed in the same fashion until all of the REGs in the CORESET have been numbered.

The configuration of LSS may be defined by a formula. In particular, the $i^{th}$ BD candidates of aggregation level, L, may include REGs with the indexes formulated by $$r^{L,i} = \{r_m^{L,i}: m = 0, 1, \ldots, QL-1, i = 0, 1, \ldots n_{BD}^L\},$$

where $r_m^{L,i} = \mathrm{mod}(r_0^{L,i} + m, N_{RB}K)$, $n_{RB}^L = \left\lceil \frac{QL}{K} \right\rceil$, $n_{BD}^L = \min\left\{ \left\lfloor \frac{N_{RB}}{n_{RB}^L} \right\rfloor, \tilde{n}_{BD}^L \right\}$, $$r_0^{L,i} = \mathrm{mod}\left(f(n_{TTI}, n_{UE}) + i \left\lfloor \frac{N_{RB}}{n_{BD}^L} \right\rfloor, N_{RB} - n_{RB}^L\right)K,$$

and $i = 0, 1, \ldots, n_{BD}^L - 1$. $f(n_{TTI}, n_{UE})$ may be a pseudorandom value generation with function with a range of $(0, 1, \ldots, N_{RB} - n_{RB}^L - 1)$. $n_{TTI}$ may denote the index of TTI in a frame. $n_{UE}$ may denote a UE identity allocated by a network.

Figure 11:
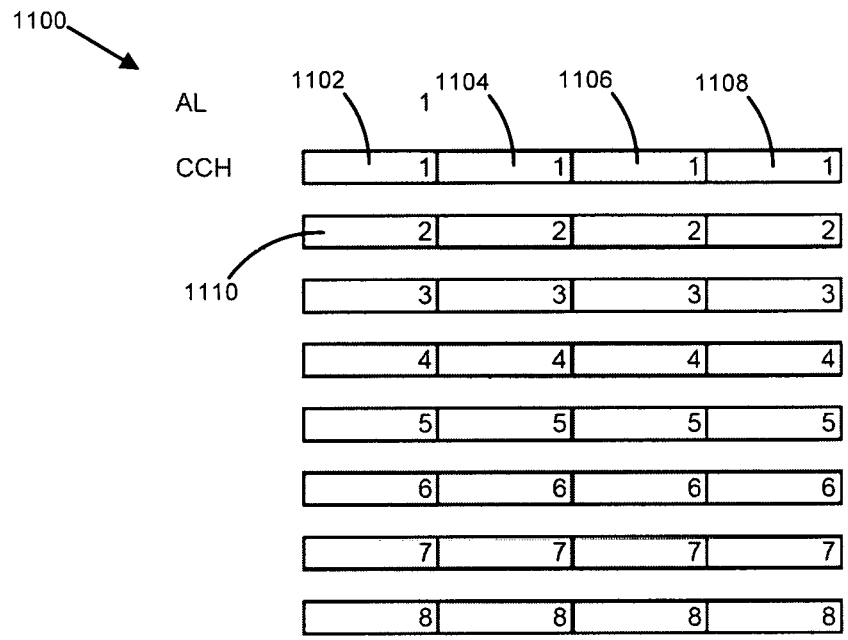
FIG. 11 illustrates graphical representations of example CORESET configurations, according to various embodiments.
Figure 11:
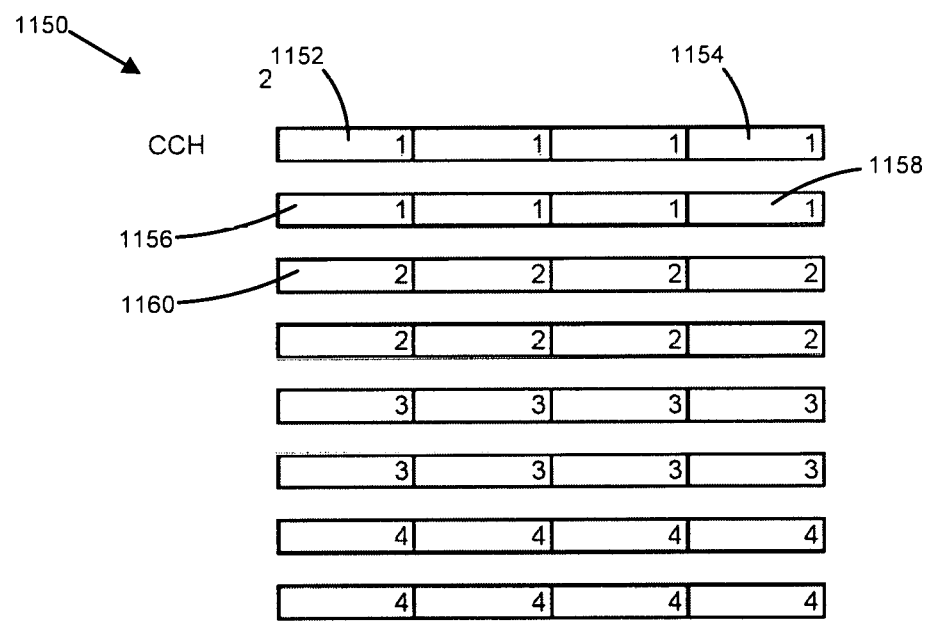

FIG. 11 illustrates graphical representations of example CORESET configurations, according to various embodiments. In particular, a first CORESET configuration 1100 may be utilized for UEs of AL1 within a network. A second CORESET configuration 1150 may be related to CORESET configuration 1100 and may be utilized for UEs of AL2 within the network. Each box shown within the graphical representations represents an REG.

The CORESET of the CORESET configuration 1100 may include one or more PRBs. In the illustrated embodiment, the CORESET of the CORESET configuration 1100 includes eight PRBs, wherein each of the PRBs are represented by a row within the graphical representation. The CORESET of the CORESET configuration 1100 may further include one or more OFDM symbols. In the illustrated embodiment, the CORESET of the CORESET configuration 1100 includes four OFDM symbols, wherein each of the OFDM symbols are represented by a column within the graphical representation. The CORESET of the CORESET configuration 1100 may include a number of REGs based on the number of PRBs and the number of OFDM symbols in the CORESET. In particular, there may be an REG for each combination of the PRBs and the OFDMs symbols. The illustrated embodiment includes 32 REGs based on the eight PRBs and the four OFDM symbols.

The CORESET configuration 1100 may support one or more BD candidates. The BD candidates may also be referred to as CCEs or NR-PDCCH candidates. In the illustrated embodiment, the CORESET configuration 1100 includes eight BD candidates. Each of the BD candidates may include an equal number of REGs. In the illustrated embodiment, each of the BD candidates may include four REGs, based on the 32 REGs within the CORESET and the eight BD candidates supported.

The graphical representation may include a number within each of the boxes. The number may indicate a BD candidate of which the REG corresponding to the box is included within. The numbering may be from '1' to '8' to indicate each of the BD candidates. The numbering of the REGs, as represented by the boxes, illustrated may be generated in accordance with the description that follows.

The CORESET configuration 1100 may include localized BD candidates, localized in either a frequency localized manner or a time localized manner. In the illustrated embodiment, the CORESET configuration 1 100 includes localized BD candidates, localized in a frequency localized manner. In particular, all the REGs within a BD candidate may be located within a same frequency within the frequency domain.

Each of the localized BD candidates may include consecutive REGS, which are numbered in a time-first order or a frequency-first order. In the illustrated embodiment, the CORESET configuration 1100 includes localized BD candidates numbered in the time-first order.

The numbering of the REGs in CORESET configuration 1100 may begin at a first REG in the time domain and the frequency domain of the CORESET. In particular, in the illustrated embodiment, the numbering may begin at a first REG 1102. The first REG 1102 may be numbered '1', which corresponds to a first RD candidate.

After numbering the first REG 1102, the numbering may implement the localization of the BD candidates. In the illustrated embodiment, the remaining REGs within the first BD candidate may be numbered in a frequency localized manner. In particular, the next three REGs with the same frequency as the first REG 1102 may be numbered '1', which corresponds to the first BD candidate. Accordingly, a second REG 1104, a third REG 1106, and a fourth REG 1108, which are the next three REGs with the same frequency as the first REG 1102, are numbered '1', which corresponds to the first BD candidate.

After implementation of the localization of the BD candidates for the first BD candidate, the numbering may proceed to the next REG in the time-first order after the fourth REG 1108. As the fourth REG 1108 is the last REG of the frequency, the numbering may proceed to the first REG, in time, within the next frequency, which is the fifth REG 1110. The numbering may have been incremented after completion of the numbering in the frequency localized manner, resulting in the fifth REG 1110 being numbered '2'. The numbering may proceed in the disclosed fashion until all the REGs within the CORESET of the CORESET configuration 1100 are numbered.

The second CORESET configuration 1150 may be related to CORESET configuration 1100 and may be utilized for UEs of AL2 within the network. The CORESET configuration 1150 may support half as many BD candidates as the CORESET configuration 1100 based on being for the UEs of AL2. Accordingly, the CORESET configuration 1150 may support four BD candidates in the illustrated embodiment. Each of the BD candidates may include an equal number of REGs. In the illustrated embodiment, each of the BD candidates may include eight REGs, based on the 32 REGs within the CORESET and the four BD candidates supported.

The numbering of the REGs in CORESET configuration 1150 may begin at a first REG in the time domain and the frequency domain of the CORESET configuration 1150. In particular, in the illustrated embodiment, the numbering may begin at a first REG 1152. The first REG 1152 may be numbered '1', which corresponds to a first BD candidate.

After numbering the first REG 1152, the numbering may implement the localization of the BD candidates. In the illustrated embodiment, the remaining REGs within the first BD candidate may be numbered in a frequency localized manner. In particular, the next seven REGs in the time-first order may be numbered '1', which corresponds to the first BD candidate. Accordingly, the first REG 1152 through the fourth REG 1154 may be numbered '1'. As the fourth REG 1154 is the last REG of the frequency, the numbering in the frequency localized manner may proceed to the first REG, in time, of the next frequency, which is fifth REG 1156. The numbering in the frequency localized manner may then number the fifth REG 1156 through an eighth REG 1158 with the number '1'. Accordingly, eight REGs may be assigned to a first BD candidate within the CORESET configuration 1150 after completion of the numbering in the frequency localized manner.

After implementation of the localization of the BD candidates for the first BD candidate, the numbering may proceed to the next REG in the time-first order after the eighth REG 1158. As the eighth REG 1158 is the last REG of the frequency, the numbering may proceed to the first REG, in time, within the next frequency, which is a ninth REG 1160. The numbering may have been incremented after completion of the numbering in the frequency localized manner, resulting in the ninth REG 1160 being numbered '2'. The numbering may proceed in the disclosed fashion until all the REGs within the CORESET of the CORESET configuration 1150 are numbered.

Figure 12:
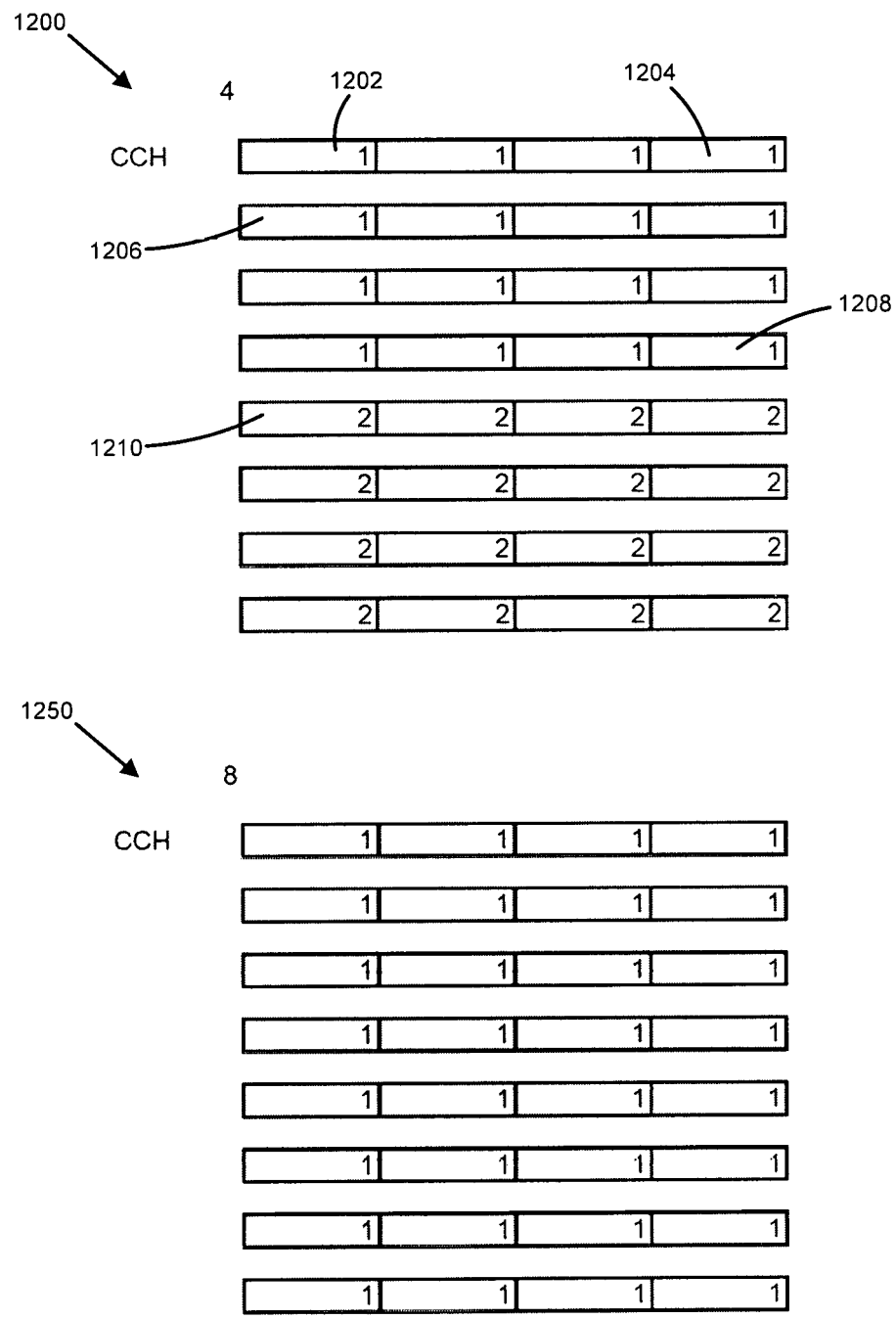
FIG. 12 illustrates graphical representations of example CORESET configurations, according to various embodiments.

FIG. 12 illustrates graphical representations of example CORESET configurations, according to various embodiments. In particular, a third CORESET configuration 1200 may be related to the CORESET configuration 1100 (FIG. 11) and may be utilized for UEs of AL4 within a network. A fourth CORESET configuration 1250 may be related to CORESET configuration 1100 and may be utilized for UEs of AL8 within the network.

The third CORESET configuration 1200 may be related to CORESET configuration 1100 and may be utilized for UEs of AL4 within the network. The CORESET configuration 1200 may support a quarter as many BD candidates as the CORESET configuration 1100 based on being for the UEs of AL4. Accordingly, the CORESET configuration 1200 may support two BD candidates in the illustrated embodiment. Each of the BD candidates may include an equal number of REGs. In the illustrated embodiment, each of the BD candidates may include 16 REGs, based on the 32 REGs within the CORESET and the two BD candidates supported.

The numbering of the REGs in CORESET configuration 1200 may begin at a first REG in the time domain and the frequency domain of the CORESET configuration 1200. In particular, in the illustrated embodiment, the numbering may begin at a first REG 1202. The first REG 1202 may be numbered '1', which corresponds to a first BD candidate.

After numbering the first REG 1202, the numbering may implement the localization of the BD candidates. In the illustrated embodiment, the remaining REGs within the first BD candidate may be numbered in a frequency localized manner. In particular, the next 15 REGs in the time-first order may be numbered '1', which corresponds to the first BD candidate. Accordingly, the first REG 1202 through the fourth REG 1204 may be numbered '1'. As the fourth REG 1204 is the last REG of the frequency, the numbering in the frequency localized manner may proceed to the first REG, in time, of the next frequency, which is fifth REG 1206. The numbering in the frequency localized manner may proceed to number the REGs in the time-first order until 16 REGs have been numbered with '1'. In particular, the numbering may number the first REG 1202 through a sixteenth REG 1208 with the number '1'.

After implementation of the localization of the BD candidates for the first BD candidate, the numbering may proceed to the next REG in the time-first order after the sixteenth REG 1208. As the sixteenth REG 1208 is the last REG of the frequency, the numbering may proceed to the first REG, in time, within the next frequency, which is a seventeenth REG 1210. The numbering may have been incremented after completion of the numbering in the frequency localized manner, resulting in the seventeenth REG 1210 being numbered '2'. The numbering may proceed in the disclosed fashion until all the REGs within the CORESET of the CORESET configuration 1200 are numbered.

The fourth CORESET configuration 1250 may be related to CORESET configuration 1100 and may be utilized for UEs of AL8 within the network. The CORESET configuration 1250 may support an eighth as many BD candidates as the CORESET configuration 1100 based on being for the UEs of AL8. Accordingly, the CORESET configuration 1250 may support one BD candidate in the illustrated embodiment. As the CORESET configuration 1250 includes only one BD candidate, all the REGs within the CORESET may be assigned to the first BD candidate and numbered with '1', which corresponds to the first candidate.

Figure 13:
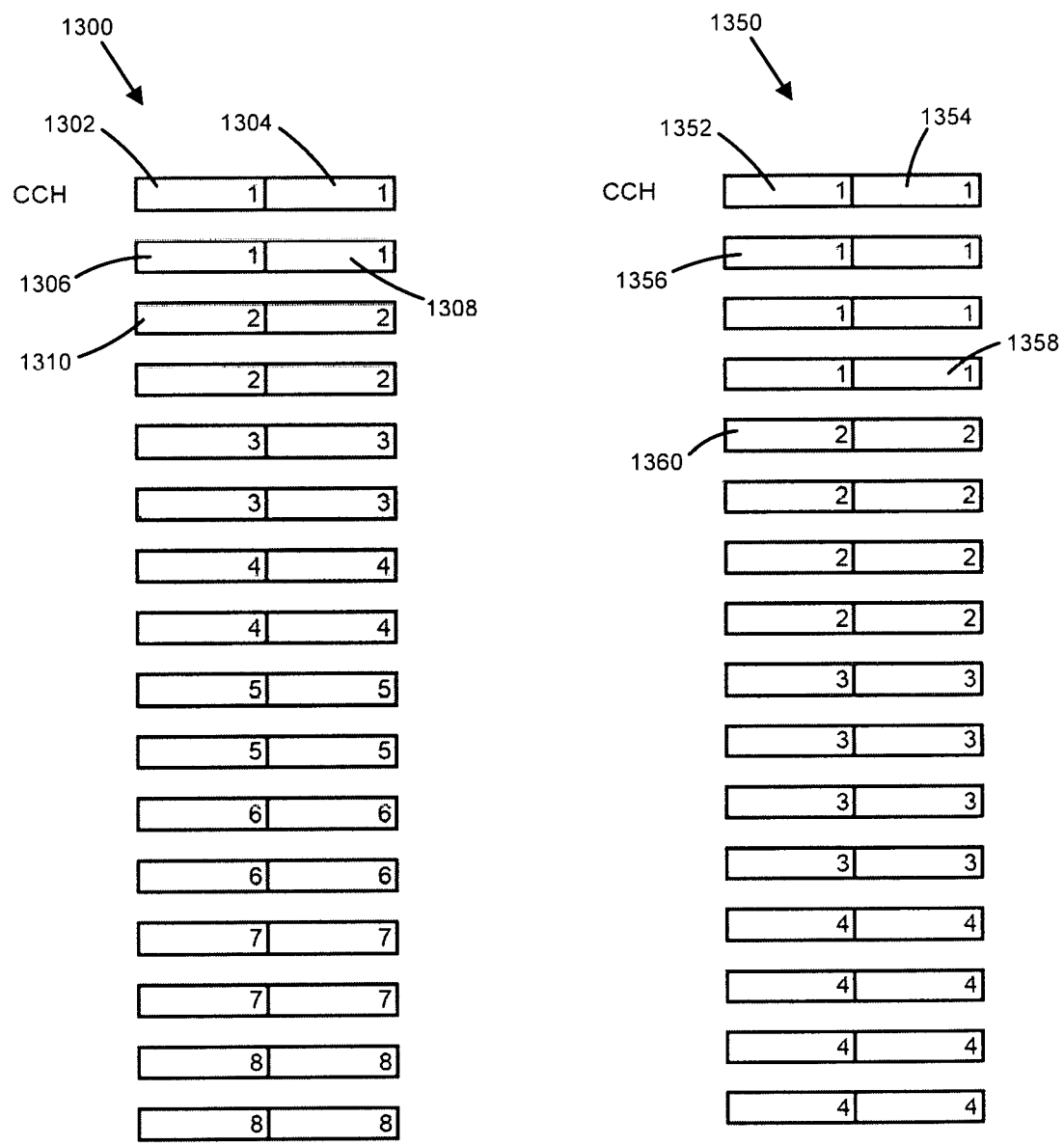
FIG. 13 illustrates graphical representations of example CORESET configurations, according to various embodiments.

FIG. 13 illustrates graphical representations of example CORESET configurations, according to various embodiments. In particular, a first CORESET configuration 1300 may be utilized for UEs of AL1 within a network. A second CORESET configuration 1350 may be related to CORESET configuration 1300 and may be utilized for UEs of AL2 within the network. Each box shown within the graphical representations represents an REG.

The CORESET of the CORESET configuration 1300 may include one or more PRBs. In the illustrated embodiment, the CORESET of the CORESET configuration 1300 includes 16 PRBs, wherein each of the PRBs are represented by a row within the graphical representation. The CORESET of the CORESET configuration 1300 may further include one or more OFDM symbols. In the illustrated embodiment, the CORESET of the CORESET configuration 1300 includes two OFDM symbols, wherein each of the OFDM symbols are represented by a column within the graphical representation. The CORESET of the CORESET configuration 1300 may include a number of REGs based on the number of PRBs and the number of OFDM symbols in the CORESET. In particular, there may be an REG for each combination of the PRBs and the OFDMs symbols. The illustrated embodiment includes 32 REGs based on the 16 PRBs and the two OFDM symbols.

The CORESET configuration 1300 may support one or more BD candidates. In the illustrated embodiment, the CORESET configuration 1300 includes eight BD candidates. Each of the BD candidates may include an equal number of REGs. In the illustrated embodiment, each of the BD candidates may include four REGs, based on the 32 REGs within the CORESET and the eight BD candidates supported.

The graphical representation may include a number within each of the boxes. The number may indicate a BD candidate of which the REG corresponding to the box is included within. The numbering may be from '1' to '8' to indicate each of the BD candidates. The numbering of the REGs, as represented by the boxes, illustrated may be generated in accordance with the description that follows.

The CORESET configuration 1300 may include localized BD candidates, localized in either a frequency localized manner or a time localized manner. In the illustrated embodiment, the CORESET configuration 1300 includes localized BD candidates, localized in a frequency localized manner. In particular, all the REGs within a BD candidate may be located within a same frequency within the frequency domain, or within adjacent frequencies where less REGs exist at a frequency than threre are REGs within the BD candidate.

Each of the localized BD candidates may include consecutive REGS, which are numbered in a time-first order or a frequency-first order. In the illustrated embodiment, the CORESET configuration 1300 includes localized BD candidates numbered in the time-first order.

The numbering of the REGs in CORESET configuration 1300 may begin at a first REG in the time domain and the frequency domain of the CORESET configuration 1300. In particular, in the illustrated embodiment, the numbering may begin at a first REG 1302. The first REG 1302 may be numbered '1', which corresponds to a first BD candidate.

After numbering the first REG 1302, the numbering may implement the localization of the BD candidates. In the illustrated embodiment, the remaining REGs within the first BD candidate may be numbered in a frequency localized manner. In particular, the next three REGs in time-first order may be numbered '1', which corresponds to the first BD candidate. Accordingly, a second REG 1304, which is the next REG in the time-first order from the first REG 1302, is numbered '1'. As the second REG 1304 is the last REG of the frequency, the numbering may proceed to the first REG, in time, within the next frequency, which is a third REG 1306. The REGs may continue to be numbered in the time-first order until four REGs have been assigned to the first BD candidate, resulting in a fourth REG 1308 being numbered '1'.

After implementation of the localization of the BD candidates for the first BD candidate, the numbering may proceed to the next REG in the time-first order after the fourth REG 1308. As the fourth REG 1308 is the last REG of the frequency, the numbering may proceed to the first REG, in time, within the next frequency, which is a fifth REG 1310. The numbering may have been incremented after completion of the numbering in the frequency localized manner, resulting in the fifth REG 1310 being numbered '2'. The numbering may proceed in the disclosed fashion until all the REGs within the CORESET of the CORESET configuration 1300 are numbered.

The second CORESET configuration 1350 may be related to CORESET configuration 1300 and may be utilized for UEs of AL2 within the network. The CORESET configuration 1350 may support half as many BD candidates as the CORESET configuration 1300 based on being for the UEs of AL2. Accordingly, the CORESET configuration 1350 may support four BD candidates in the illustrated embodiment. Each of the BD candidates may include an equal number of REGs. In the illustrated embodiment, each of the BD candidates may include eight REGs, based on the 32 REGs within the CORESET and the four BD candidates supported.

The numbering of the REGs in CORESET configuration 1350 may begin at a first REG in the time domain and the frequency domain of the CORESET configuration 1350. In particular, in the illustrated embodiment, the numbering may begin at a first REG 1352. The first REG 1352 may be numbered '1', which corresponds to a first BD candidate.

After numbering the first REG 1352, the numbering may implement the localization of the BD candidates. In the illustrated embodiment, the remaining REGs within the first BD candidate may be numbered in a frequency localized manner. In particular, the next seven REGs in the time-first order may be numbered '1', which corresponds to the first BD candidate. Accordingly, the first REG 1352 through the second REG 1354 may be numbered '1'. As the second REG 1354 is the last REG of the frequency, the numbering in the frequency localized manner may proceed to the first REG, in time, of the next frequency, which is third REG 1356. The numbering in the frequency localized manner may then number the third REG 1356 through an eighth REG 1358 with the number '1'. Accordingly, eight REGs may be assigned to a first BD candidate within the CORESET configuration 1350 after completion of the numbering in the frequency localized manner.

After implementation of the localization of the BD candidates for the first BD candidate, the numbering may proceed to the next REG in the time-first order after the eighth REG 1358. As the eighth REG 1358 is the last REG of the frequency, the numbering may proceed to the first REG, in time, within the next frequency, which is a ninth REG 1360. The numbering may have been incremented after completion of the numbering in the frequency localized manner, resulting in the ninth REG 1360 being numbered '2'. The numbering may proceed in the disclosed fashion until all the REGs within the CORESET of the CORESET configuration 1350 are numbered.

Figure 14:
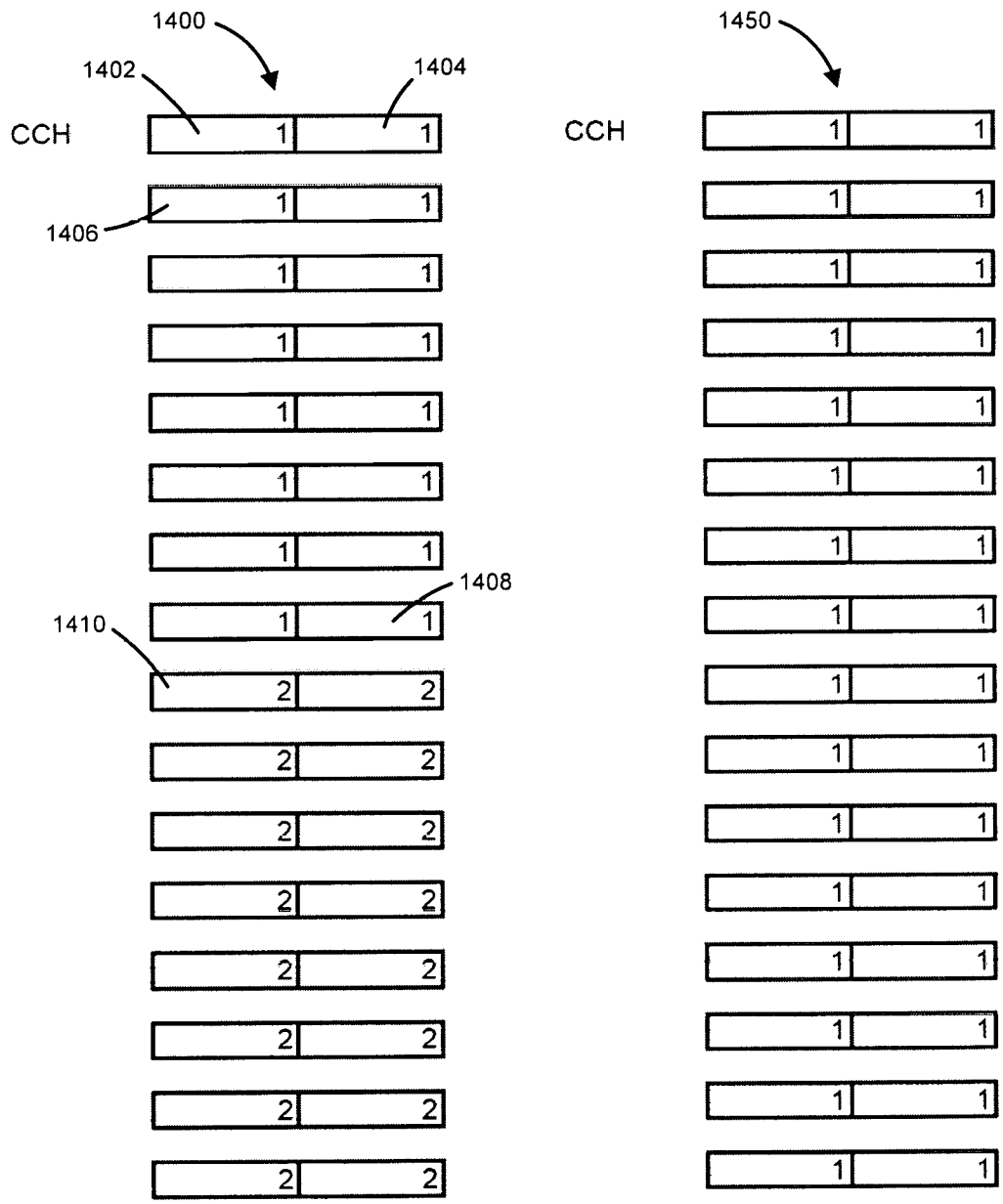
FIG. 14 illustrates graphical representations of example CORESET configurations, according to various embodiments.

FIG. 14 illustrates graphical representations of example CORESET configurations, according to various embodiments. In particular, a third CORESET configuration 1400 may be related to the CORESET configuration 1300 (FIG. 13) and may be utilized for UEs of AL4 within a network. A fourth CORESET configuration 1450 may be related to CORESET configuration 1300 and may be utilized for UEs of AL8 within the network.

The third CORESET configuration 1400 may be related to CORESET configuration 1300 and may be utilized for UEs of AL4 within the network. The CORESET configuration 1400 may support a quarter as many BD candidates as the CORESET configuration 1300 based on being for the UEs of AL4. Accordingly, the CORESET configuration 1400 may support two BD candidates in the illustrated embodiment. Each of the BD candidates may include an equal number of REGs. In the illustrated embodiment, each of the BD candidates may include 16 REGs, based on the 32 REGs within the CORESET and the two BD candidates supported.

The numbering of the REGs in CORESET configuration 1400 may begin at a first REG in the time domain and the frequency domain of the CORESET configuration 1400. In particular, in the illustrated embodiment, the numbering may begin at a first REG 1402. The first REG 1402 may be numbered '1', which corresponds to a first BD candidate.

After numbering the first REG 1402, the numbering may implement the localization of the BD candidates. In the illustrated embodiment, the remaining REGs within the first BD candidate may be numbered in a frequency localized manner. In particular, the next 15 REGs in the time-first order may be numbered '1', which corresponds to the first BD candidate. Accordingly, the first REG 1402 and a second REG 1404 may be numbered '1'. As the second REG 1404 is the last REG of the frequency, the numbering in the frequency localized manner may proceed to the first REG, in time, of the next frequency, which is third REG 1406. The numbering in the frequency localized manner may proceed to number the REGs in the time-first order until 16 REGs have been numbered with '1'. In particular, the numbering may number the first REG 1402 through a sixteenth REG 1408 with the number '1'.

After implementation of the localization of the BD candidates for the first BD candidate, the numbering may proceed to the next REG in the time-first order after the sixteenth REG 1408. As the sixteenth REG 1408 is the last REG of the frequency, the numbering may proceed to the first REG, in time, within the next frequency, which is a seventeenth REG 1410. The numbering may have been incremented after completion of the numbering in the frequency localized manner, resulting in the seventeenth REG 1410 being numbered '2'. The numbering may proceed in the disclosed fashion until all the REGs within the CORESET of the CORESET configuration 1400 are numbered.

The fourth CORESET configuration 1450 may be related to CORESET configuration 1300 and may be utilized for UEs of AL8 within the network. The CORESET configuration 1450 may support an eighth as many BD candidates as the CORESET configuration 1300 based on being for the UEs of AL8. Accordingly, the CORESET configuration 1450 may support one BD candidate in the illustrated embodiment. As the CORESET configuration 1450 includes only one BD candidate, all the REGs within the CORESET may be assigned to the first BD candidate and numbered with '1', which corresponds to the first BD candidate.

Figure 15:
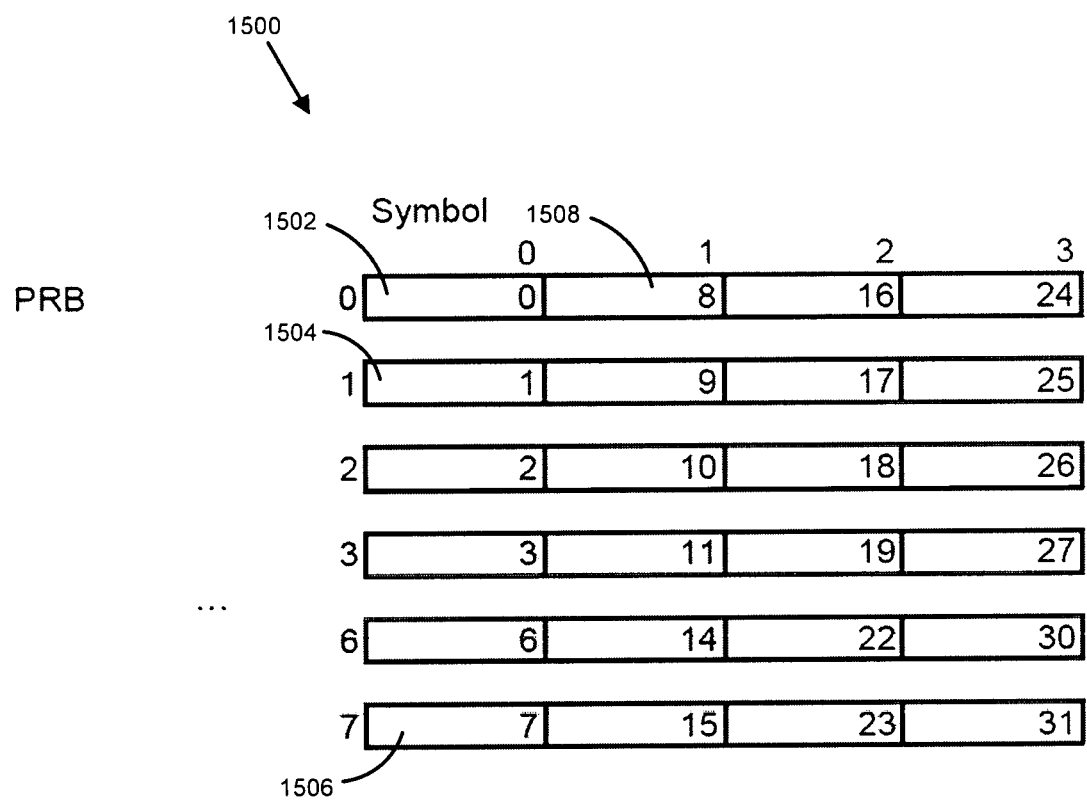
FIG. 15 illustrates a graphical representation of another example CORESET configuration, according to various embodiments.

FIG. 15 illustrates a graphical representation of another example CORESET configuration 1500, according to various embodiments. The CORESET configuration 1500 may illustrate a frequency-first order numbering approach. Each box shown within the graphical representations represents an REG.

The CORESET of the CORESET configuration 1500 may include one or more PRBs. In the illustrated embodiment, the CORESET of the CORESET configuration 1500 includes 8 PRBs, wherein each of the PRBs are represented by a row within the graphical representation. Two of the rows are omitted from the figure for simplicity; however, the numbering approach described below is to be understood to continue with the two omitted rows. The CORESET of the CORESET configuration 1500 may further include one or more OFDM symbols. In the illustrated embodiment, the CORESET of the CORESET configuration 1500 includes four OFDM symbols, wherein each of the OFDM symbols are represented by a column within the graphical representation. The CORESET of the CORESET configuration 1500 may include a number of REGs based on the number of PRBs and the number of OFDM symbols in the CORESET. In particular, there may be an REG for each combination of the PRBs and the OFDMs symbols. The illustrated embodiment includes 32 REGs based on the eight PRBs and the four OFDM symbols.

The CORESET configuration 1500 may illustrate a frequency-first order numbering approach. The numbering of the CORESET configuration 1500 may begin at a first REG in the time domain and the frequency domain, which is a first REG 1502. In the illustrated embodiment, the count of the numbering may increment after each REG is numbered. The numbering may proceed from the first REG 1502 to the next REG in frequency, which is the second REG 1504. The numbering may proceed in the frequency-first order to the numbering of an eighth REG 1506. As the eighth REG is the last REG of the time, the numbering may proceed to a first REG, in frequency, of the next time, which is a ninth REG 1508. The numbering may proceed in the disclosed fashion until all the REGs within the CORESET of the CORESET configuration 1500 are numbered.

Figure 16:
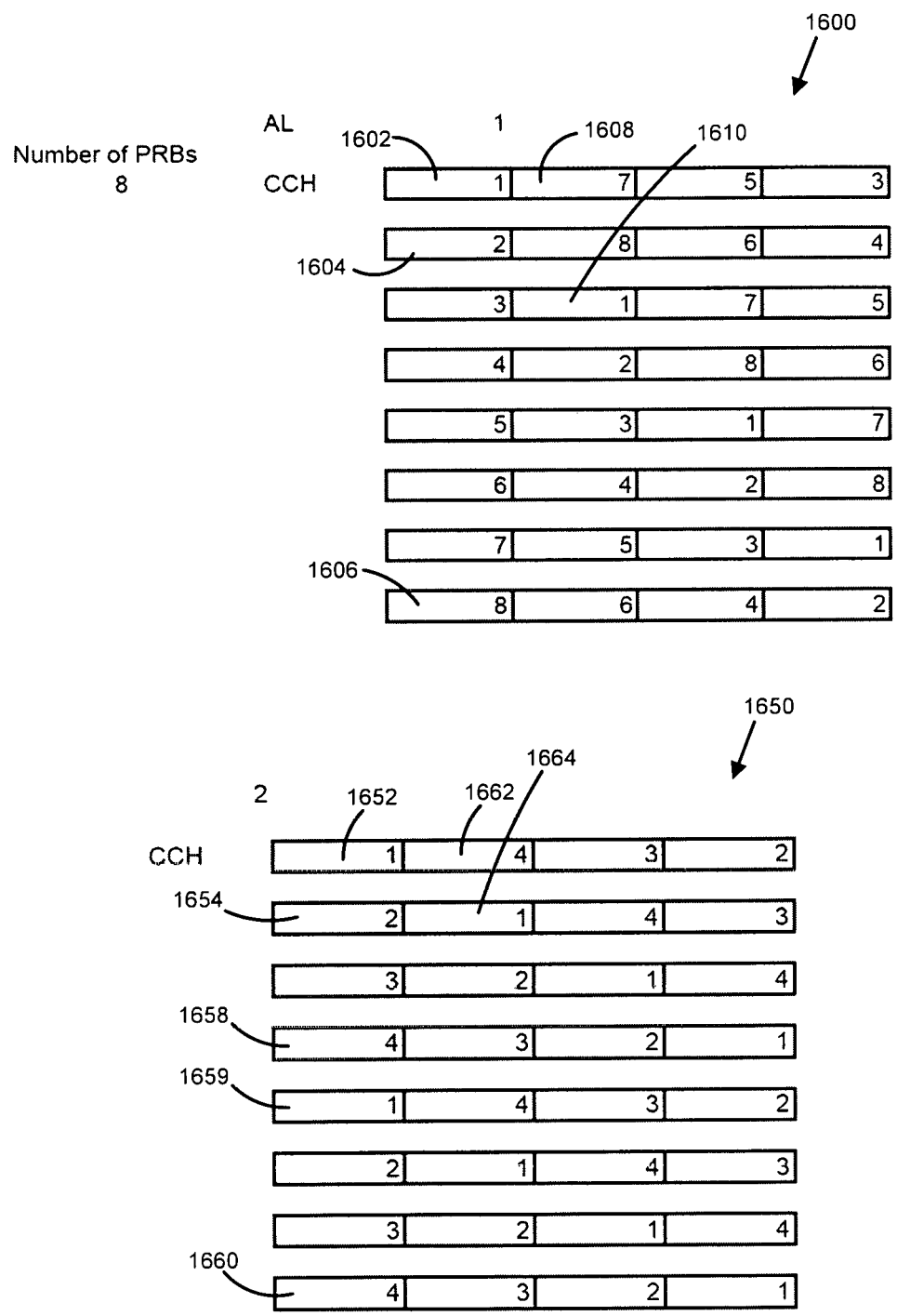
FIG. 16 illustrates graphical representations of example CORESET configurations, according to various embodiments.

FIG. 16 illustrates graphical representations of example CORESET configurations, according to various embodiments. In particular, a first CORESET configuration 1600 may be utilized for UEs of AL1 within a network. A second CORESET configuration 1650 may be related to CORESET configuration 1600 and may be utilized for UEs of AL2 within the network. Each box shown within the graphical representations represents an REG.

The CORESET of the CORESET configuration 1600 may include one or more PRBs. In the illustrated embodiment, the CORESET of the CORESET configuration 1600 includes eight PRBs, wherein each of the PRBs are represented by a row within the graphical representation. The CORESET of the CORESET configuration 1600 may further include one or more OFDM symbols. In the illustrated embodiment, the CORESET of the CORESET configuration 1600 includes four OFDM symbols, wherein each of the OFDM symbols are represented by a column within the graphical representation. The CORESET of the CORESET configuration 1600 may include a number of REGs based on the number of PRBs and the number of OFDM symbols in the CORESET. In particular, there may be an REG for each combination of the PRBs and the OFDMs symbols. The illustrated embodiment includes 32 REGs based on the eight PRBs and the four OFDM symbols.

The CORESET configuration 1600 may support one or more BD candidates. In the illustrated embodiment, the CORESET configuration 1600 includes eight BD candidates. Each of the BD candidates may include an equal number of REGs. In the illustrated embodiment, each of the BD candidates may include four REGs, based on the 32 REGs within the CORESET and the eight BD candidates supported.

The graphical representation may include a number within each of the boxes. The number may indicate a BD candidate of which the REG corresponding to the box is included within. The numbering may be from '1' to '8' to indicate each of the BD candidates. The numbering of the REGs, as represented by the boxes, illustrated may be generated in accordance with the description that follows.

The CORESET configuration 1600 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

In order to facilitate the distribution, a cyclic shift may be applied to the count of the numbering after completion of the numbering of the REGs within a time. The cyclic shift may be determined to provide equal distribution in the time domain and/or the frequency domain between the REGs assigned to a BD candidate. The cyclic shift may be determined based on the number of BD candidates supported by the CORESET configuration 1600, the number of REGs to be assigned to each of the BD candidates, the number of PRBs within the CORESET, the number of REGs within the CORESET, or some combination thereof. For example, the cyclic shift may be determined to be two shifts based on the BD candidates including four REGs and the CORESET including eight PRBs, the two shifts providing the greatest distribution of the REGs within the BD candidates.

The numbering of the REGs in CORESET configuration 1600 may begin at a first REG in the time domain and the frequency domain of the CORESET configuration 1600. In particular, in the illustrated embodiment, the numbering may begin at a first REG 1602. The first REG 1602 may be numbered '1', which corresponds to a first BD candidate. The count of the numbering may be incremented after each REG is numbered. Further, the count may cycle back to '1' after an REG has been assigned the maximum number, which is '8' in the illustrated embodiment.

After numbering the first REG 1602, the numbering may proceed in the frequency-first order to the next REG in the frequency domain, which is the second REG 1604. The second REG 1604 may be numbered '2'. The numbering may proceed in the frequency-first order until an eighth REG 1606 is numbered with '8'. The numbering may cycle back to '1' after numbering the eighth REG 1606 with '8'.

As the eighth REG 1606 is the last REG of the time, the numbering may proceed to the next group of REGs in the time domain. Further, the cyclic shift may be applied to the numbering as the numbering proceeds to the next group of REGs in the time domain. In particular, the numbering may proceed to the REG adjacent in time to the REG at which the numbering began in the current group of REGs in the time domain, which is a ninth REG 1608. Rather than numbering the ninth REG 1608, the cyclic shift may be applied, shifting the numbering by two REGs in the frequency domain to an eleventh REG 1610. The numbering may proceed in the frequency-first order until all the REGs in the time within the same group of REGs in the time domain with the eleventh REG 1610 are numbered. The numbering may again perform a cyclic shift after completion of the numbering of the REGs within the time. The numbering may proceed in the disclosed fashion until all the REGs within the CORESET of the CORESET configuration 1600 have been numbered.

The second CORESET configuration 1650 may be related to CORESET configuration 1600 and may be utilized for UEs of AL2 within the network. The CORESET configuration 1650 may support half as many BD candidates as the CORESET configuration 1600 based on being for the UEs of AL2. Accordingly, the CORESET configuration 1650 may support four BD candidates in the illustrated embodiment. Each of the BD candidates may include an equal number of REGs. In the illustrated embodiment, each of the BD candidates may include eight REGs, based on the 32 REGs within the CORESET and the four RD candidates supported.

The CORESET configuration 1650 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

In order to facilitate the distribution, a cyclic shift may be applied to the count of the numbering after completion of the numbering of the REGs within a time. The cyclic shift may be determined to provide equal distribution in the time domain and/or the frequency domain between the REGs assigned to a BD candidate. The cyclic shift may be determined based on the number of BD candidates supported by the CORESET configuration 1650, the number of REGs to be assigned to each of the BD candidates, the number of PRBs within the CORESET, the number of REGs within the CORESET, or some combination thereof. For example, the cyclic shift may be determined to be one shift based on the BD candidates including eight REGs and the CORESET including eight PRBs, the one shift providing the greatest distribution of the REGs within the BD candidates.

The numbering of the REGs in CORESET configuration 1650 may begin at a first REG in the time domain and the frequency domain of the CORESET configuration 1650. In particular, in the illustrated embodiment, the numbering may begin at a first REG 1652. The first REG 1652 may be numbered '1', which corresponds to a first BD candidate.

After numbering the First REG 1652, the numbering may proceed in the frequency-first order to the next REG in the frequency domain, which is the second REG 1654. The second REG 1654 may be numbered '2'. The numbering may proceed in the frequency-first order until a fourth REG 1658 is numbered with '4'. The numbering may cycle back to '1' after numbering the fourth REG 1658 with '4'. The numbering may proceed to the next REG in the frequency, which is a fifth REG 1659. The fifth-REG 1659 may be numbered '1' based on the numbering being cycled back to '1' after the fourth REG 1658. The numbering may proceed to an eighth REG 1660, which is numbered with '4'.

As the eighth REG 1660 is the last REG of the time, the numbering may proceed to the next group of REGs in the time domain. Further, the cyclic shift may be applied to the numbering as the numbering proceeds to the next group of REGs in the time domain. In particular, the numbering may proceed to the REG adjacent in time to the REG at which the numbering began in the current group of REGs in the time domain, which is a ninth REG 1662. Rather than numbering the ninth REG 1662, the cyclic shift may be applied, shifting the numbering by one REG in the frequency domain to a tenth REG 1664. The numbering may proceed in the frequency-first order until all the REGs in the time within the same group of REGs in the time domain with the tenth REG 1664 are numbered. The numbering may again perform a cyclic shift after completion of the numbering of the REGs within the time. The numbering may proceed in the disclosed fashion until all the REGs within the CORESET of the CORESET configuration 1650 have been numbered.

Figure 17:
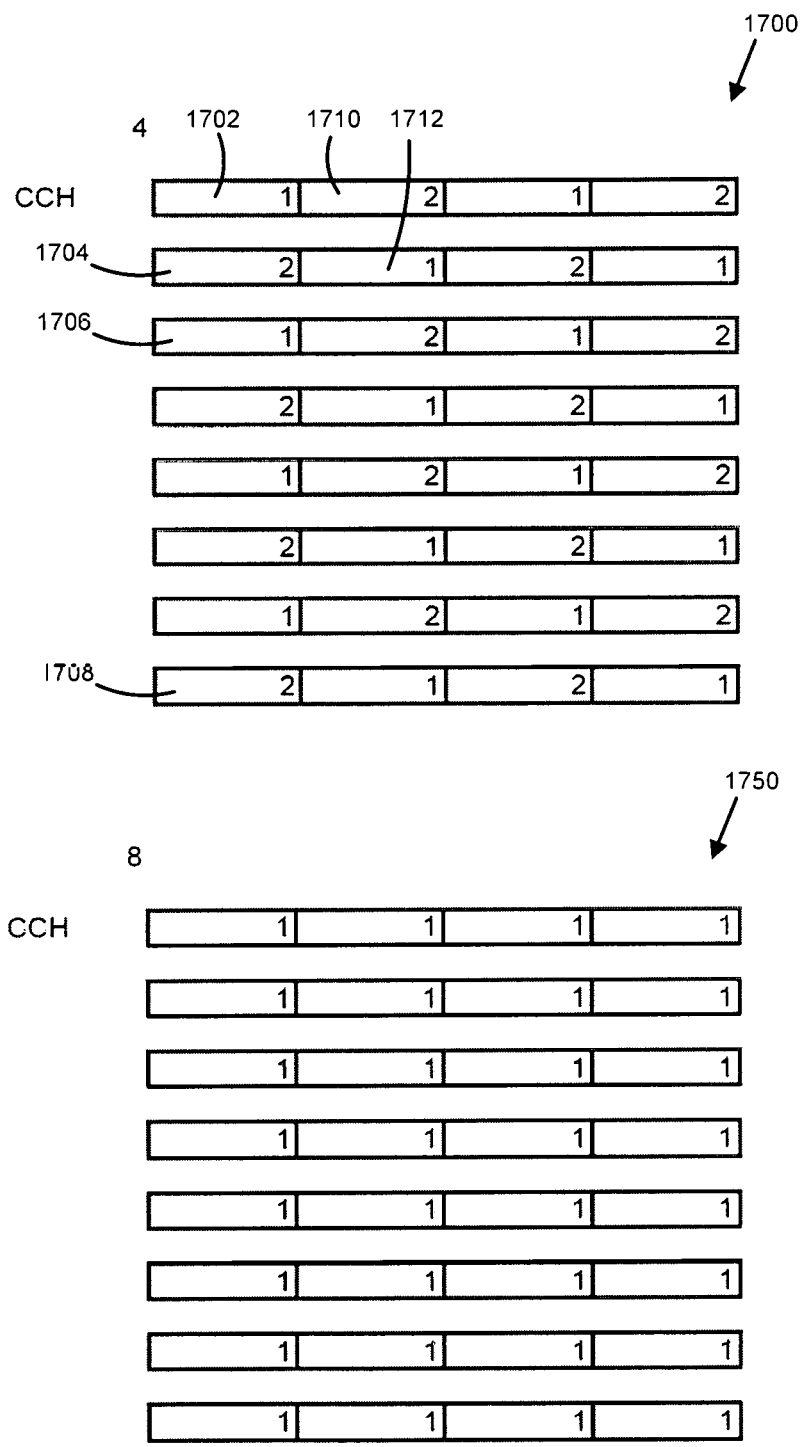
FIG. 17 illustrates graphical representations of example CORESET configurations, according to various embodiments.

FIG. 17 illustrates graphical representations of example CORESET configurations, according to various embodiments. In particular, a third CORESET configuration 1700 may be related to the CORESET configuration 1600 (FIG. 16) and may be utilized for UEs of AL4 within a network. A fourth CORESET configuration 1750 may be related to CORESET configuration 1600 and may be utilized for UEs of AL8 within the network. Each box shown within the graphical representations represents an REG.

The third CORESET configuration 1700 may be related to CORESET configuration 1600 and may be utilized for UEs of AL4 within the network. The CORESET configuration 1700 may support a quarter as many BD candidates as the CORESET configuration 1600 based on being for the UEs of AL4. Accordingly, the CORESET configuration 1700 may support two BD candidates in the illustrated embodiment. Each of the BD candidates may include an equal number of REGs. In the illustrated embodiment, each of the BD candidates may include 16 REGs, based on the 32 REGs within the CORESET and time two BD candidates supported.

The CORESET configuration 1700 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

In order to facilitate the distribution, a cyclic shift may be applied to the count of the numbering after completion of the numbering of the REGs within a time. The cyclic shift may be determined to provide equal distribution in the time domain and/or the frequency domain between the REGs assigned to a BD candidate. The cyclic shift may be determined based on the number of BD candidates supported by the CORESET configuration 1700, the number of REGs to be assigned to each of the BD candidates, the number of PRBs within the CORESET, the number of REGs within the CORESET, or some combination thereof. For example, the cyclic shift may be determined to be one shift based on the BD candidates including 16 REGs and the CORESET including eight PRBs, the one shift providing the greatest distribution of the REGs within the BD candidates.

The numbering of the REGs in CORESET configuration 1700 may begin at a first REG in the time domain and the frequency domain of the CORESET configuration 1700. In particular, in the illustrated embodiment, the numbering may begin at a first REG 1702. The first REG 1702 may be numbered '1', which corresponds to a first BD candidate.

After numbering the first REG 1702, the numbering may proceed in the frequency-first order to the next REG in the frequency domain, which is a second REG 1704. The second REG 1704 may be numbered '2'. The numbering may cycle back to '1' after numbering the second REG 1704 with '2'. The numbering may proceed to the next REG in the frequency, which is a third REG 1706. The third REG 1706 may be numbered '1' based on the numbering being cycled back to '1' after the second REG 1704. The numbering may proceed to an eighth REG 1708, which is numbered with '2'.

As the eighth REG 1708 is the last REG of the time, the numbering may proceed to the next group of REGs in the time domain. Further, the cyclic shift may be applied to the numbering as the numbering proceeds to the next group of REGs in the time domain. In particular, the numbering may proceed to the REG adjacent in time to the REG at which the numbering began in the current group of REGs in the time domain, which is a ninth REG 1710. Rather than numbering the ninth REG 1710, the cyclic shift may be applied, shifting the numbering by one REG in the frequency domain to a tenth REG 1712. The numbering may proceed in the frequency-first order until all the REGs in the time within the same group of REGs in the time domain with the tenth REG 1712 are numbered. The numbering may again perform a cyclic shift after completion of the numbering of the REGs within the time. The numbering may proceed in the disclosed fashion until all the REGs within the CORESET of the CORESET configuration 1700 have been numbered.

The fourth CORESET configuration 1750 may be related to CORESET configuration 1600 and may be utilized for UEs of AL8 within the network. The CORESET configuration 1750 may support an eighth as many BD candidates as the CORESET configuration 1600 based on being for the UEs of AL8. Accordingly, the CORESET configuration 1750 may support one BD candidate in the illustrated embodiment. As the CORESET configuration 1750 includes only one BD candidate, all the REGs within the CORESET may be assigned to the first BD candidate and numbered with '1', which corresponds to the first BD candidate.

Figure 18:
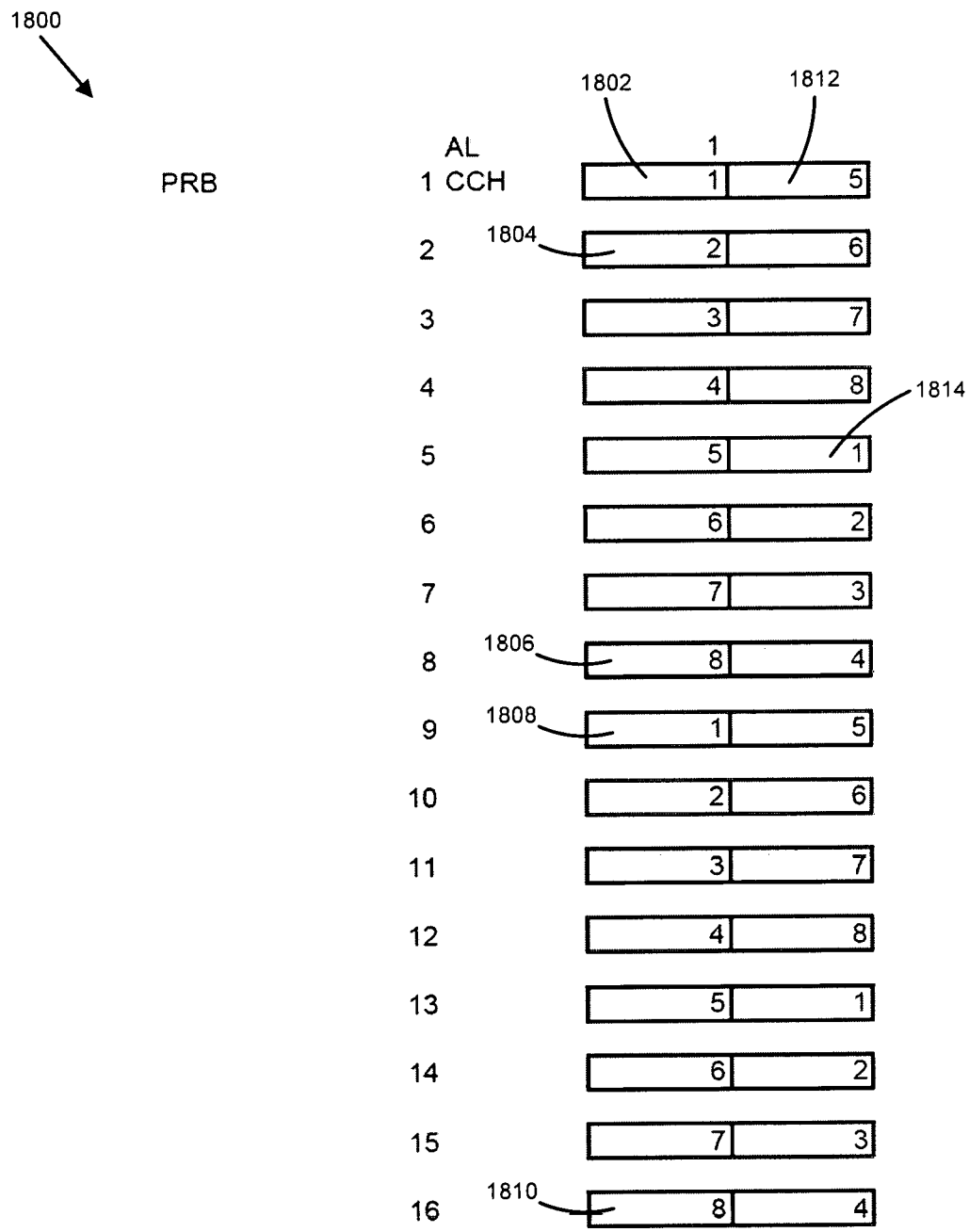
FIG. 18 illustrates a graphical representation of another example CORESET configuration, according to various embodiments.

FIG. 18 illustrates a graphical representation of another example CORESET configuration, according to various embodiments. In particular, a CORESET configuration 1800 may be utilized for UEs of AL1 within a network. Each box shown within the graphical representations represents an REG.

The CORESET of the CORESET configuration 1800 may include one or more PRBs. In the illustrated embodiment, the CORESET of the CORESET configuration 1800 includes 16 PRBs, wherein each of the PRBs are represented by a row within the graphical representation. The CORESET of the CORESET configuration 1800 may further include one or more OFDM symbols. In the illustrated embodiment, the CORESET of the CORESET configuration 1800 includes four OFDM symbols, wherein each of the OFDM symbols are represented by a column within the graphical representation. The CORESET of the CORESET configuration 1800 may include a number of REGs based on the number of PRBs and the number of OFDM symbols in the CORESET. In particular, there may be an REG for each combination of the PRBs and the OFDMs symbols. The illustrated embodiment includes 32 REGs based on the 16 PRBs and the two OFDM symbols. The CORESET configuration 1800 may support one or more BD candidates. In the illustrated embodiment, the CORESET configuration 1800 includes eight BD candidates. Each of the BD candidates may include an equal number of REGs. In the illustrated embodiment, each of the BD candidates may include four REGs, based on the 32 REGs within the CORESET and the eight BD candidates supported.

The graphical representation may include a number within each of the boxes. The number may indicate a BD candidate of which the REG corresponding to the box is included within. The numbering may be from '1' to '8' to indicate each of the BD candidates. The numbering of the REGs, as represented by the boxes, illustrated may be generated in accordance with the description that follows.

The CORESET configuration 1800 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

In order to facilitate the distribution, a cyclic shift may be applied to the count of the numbering after completion of the numbering of the REGs within a time. The cyclic shift may be determined to provide equal distribution in the time domain and/or the frequency domain between the REGs assigned to a BD candidate. The cyclic shift may be determined based on the number of BD candidates supported by the CORESET configuration 1800, the number of REGs to be assigned to each of the BD candidates, the number of PRBs within the CORESET, the number of REGs within the CORESET, or some combination thereof. For example, the cyclic shift may be determined to be four shifts based on the BD candidates including four REGs and the CORESET including sixteen PRBs, the four shifts providing the greatest distribution of the REGs within the BD candidates.

The numbering of the REGs in CORESET configuration 1800 may begin at a first REG in the time domain and the frequency domain of the CORESET configuration 1800. In particular, in the illustrated embodiment, the numbering may begin at a first REG 1802. The first REG 1802 may be numbered '1', which corresponds to a first BD candidate. The count of the numbering may be incremented after each REG is numbered. Further, the count may cycle back to '1' after an REG has been assigned the maximum number, which is '8' in the illustrated embodiment.

After numbering the first REG 1802, the numbering may proceed in the frequency-first order to the next REG in the frequency domain, which is a second REG 1804. The second REG 1804 may be numbered '2'. The numbering may proceed in the frequency-first order until an eighth REG 1806 is numbered with '8'. The numbering may cycle back to '1' after numbering the eighth REG 1806 with '8'. The numbering may proceed from the eighth REG 1806 in the frequency-first order to a ninth REG 1808, and may number the ninth REG 1808 with '1'. The numbering may proceed to a sixteenth REG 1810, and may number the sixteenth REG 1810 with '8'.

As the sixteenth REG 1810 is the last REG of the time, the numbering may proceed to the next group of REGs in the time domain. Further, the cyclic shift may be applied to the numbering as the numbering proceeds to the next group of REGs in the time domain. In particular, the numbering may proceed to the REG adjacent in time to the REG at which the numbering began in the current group of REGs in the time domain, which is a seventeenth REG 1812. Rather than numbering the seventeenth REG 1812, the cyclic shift may be applied, shifting the numbering by four REGs in the frequency domain to a twenty-first REG 1814. The numbering may proceed in the frequency-first order until all the REGs in the time within the same group of REGs in the time domain with the twenty-first REG 1814 are numbered. The numbering may again perform a cyclic shift after completion of the numbering of the REGs within the time. The numbering may proceed in the disclosed fashion until all the REGs within the CORESET of the CORESET configuration 1800 have been numbered.

Figure 19:
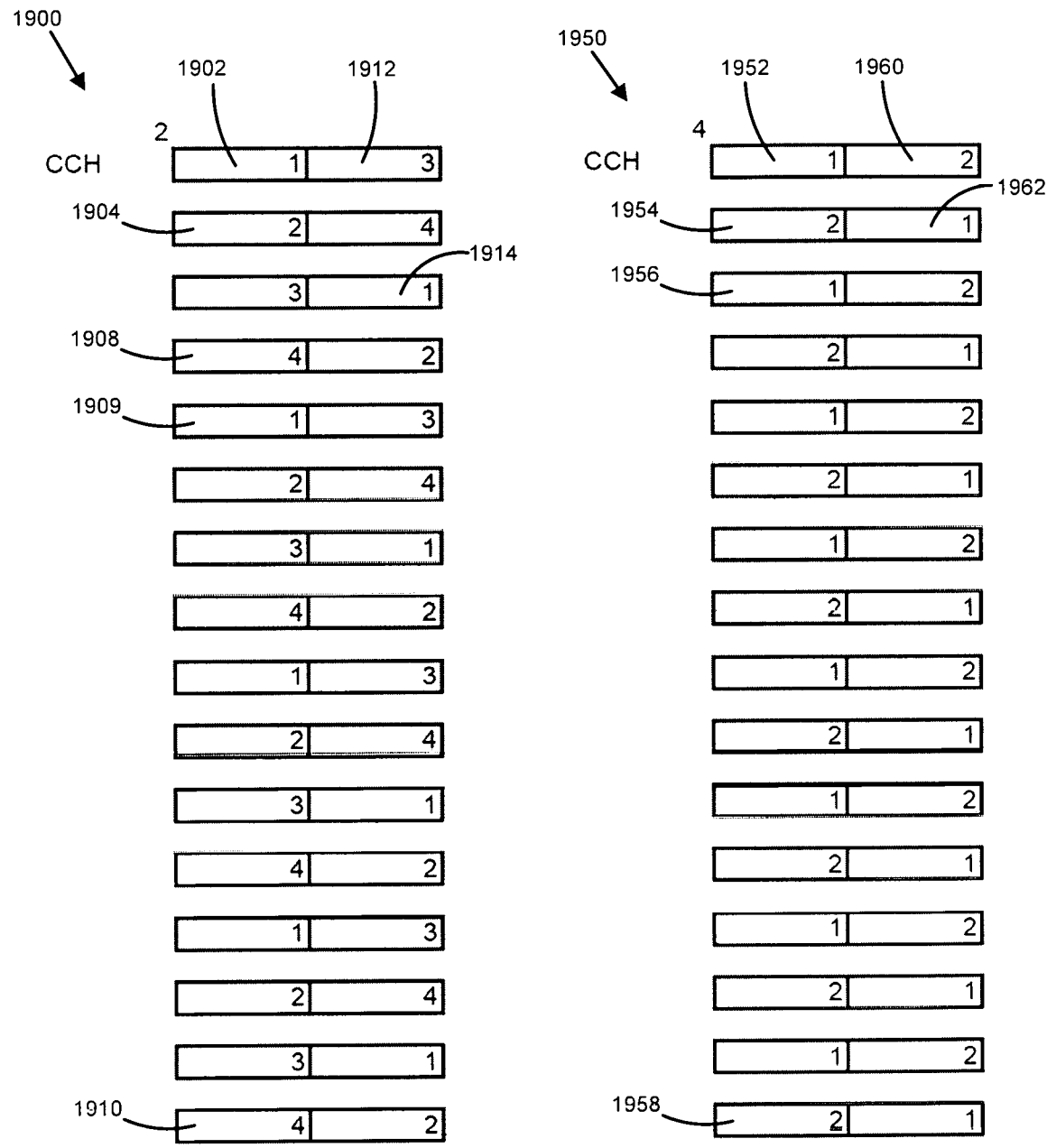
FIG. 19 illustrates graphical representations of example CORESET configurations, according to various embodiments.

FIG. 19 illustrates graphical representations of example CORESET configurations, according to various embodiments. In particular, a second CORESET configuration 1900 may be related to the CORESET configuration 1800 (FIG. 18) and may be utilized for UEs of AL2 within a network. A third CORESET configuration 1950 may be related to CORESET configuration 1800 and may be utilized for UEs of AL4 within the network. Each box shown within the graphical representations represents an REG.

The second CORESET configuration 1900 may be related to CORESET configuration 1800 and may be utilized for UEs of AL2 within the network. The CORESET configuration 1900 may support half as many BD candidates as the CORESET configuration 1800 based on being for the UEs of AL2. Accordingly, the CORESET configuration 1900 may support four BD candidates in the illustrated embodiment. Each of the BD candidates may include an equal number of REGs. In the illustrated embodiment, each of the BD candidates may include eight REGs, based on the 32 REGs within the CORESET and the four BD candidates supported.

The CORESET configuration 1900 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

In order to facilitate the distribution, a cyclic shift may be applied to the count of the numbering after completion of the numbering of the REGs within a time. The cyclic shift may be determined to provide equal distribution in the time domain and/or the frequency domain between the REGs assigned to a BD candidate. The cyclic shift may be determined based on the number of BD candidates supported by the CORESET configuration 1900, the number of REGs to be assigned to each of the BD candidates, the number of PRBs within the CORESET, the number of REGs within the CORESET, or some combination thereof. For example, the cyclic shift may be determined to be two shifts based on the BD candidates including eight REGs and the CORESET including 16 PRBs, the two shifts providing the greatest distribution of the REGs within the BD candidates.

The numbering of the REGs in CORESET configuration 1900 may begin at a first REG in the time domain and the frequency domain of the CORESET configuration 1900. In particular, in the illustrated embodiment, the numbering may begin at a first REG 1902. The first REG 1902 may be numbered '1', which corresponds to a first BD candidate.

After numbering the first REG 1902, the numbering may proceed in the frequency-first order to the next REG in the frequency domain, which is the second REG 1904. The second REG 1904 may be numbered '2'. The numbering may proceed in the frequency-first order until a fourth REG 1908 is numbered with '4'. The numbering may cycle back to '1' after numbering the fourth REG 1908 with '4'. The numbering may proceed to the next REG in the frequency, which is a fifth REG 1909. The fifth REG 1909 may be numbered '1' based on the numbering being cycled back to '1' after the fourth REG 1908. The numbering may proceed to a sixteenth REG 1910, which is numbered with '4'.

As the sixteenth REG 1910 is the last REG of the time, the numbering may proceed to the next group of REGs in the time domain. Further, the cyclic shift may be applied to the numbering as the numbering proceeds to the next group of REGs in the time domain. In particular, the numbering may proceed to the REG adjacent in time to the REG at which the numbering began in the current group of REGs in the time domain, which is a seventeenth REG 1912. Rather than numbering the seventeenth REG 1912, the cyclic shift may be applied, shifting the numbering by two REGs in the frequency domain to a nineteenth REG 1914. The numbering may proceed in the frequency-first order until all the REGs in the time within the same group of REGs in the time domain with the nineteenth REG 1914 are numbered. The numbering may again perform a cyclic shift after completion of the numbering of the REGs within the time. The numbering may proceed in the disclosed fashion until all the REGs within the CORESET of the CORESET configuration 1900 have been numbered.

The third CORESET configuration 1950 may be related to CORESET configuration 1800 and may be utilized for UEs of AL4 within the network. The CORESET configuration 1950 may support a quarter as many BD candidates as the CORESET configuration 1800 based on being for the UEs of AL4. Accordingly, the CORESET configuration 1950 may support two BD candidates in the illustrated embodiment. Each of the BD candidates may include an equal number of REGs. In the illustrated embodiment, each of the BD candidates may include 16 REGs, based on the 32 REGs within the CORESET and the two BD candidates supported.

The CORESET configuration 1950 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

In order to facilitate the distribution, a cyclic shift may be applied to the count of the numbering after completion of the numbering of the REGs within a time. The cyclic shift may be determined to provide equal distribution in the time domain and/or the frequency domain between the REGs assigned to a BD candidate. The cyclic shift may be determined based on the number of BD candidates supported by the CORESET configuration 1950, the number of REGs to be assigned to each of the BD candidates, the number of PRBs within the CORESET, the number of REGs within the CORESET, or some combination thereof. For example, the cyclic shift may be determined to be one shift based on the BD candidates including 16 REGs and the CORESET including eight PRBs, the one shift providing the greatest distribution of the REGs within the BD candidates.

The numbering of the REGs in CORESET configuration 1950 may begin at a first REG in the time domain and the frequency domain of the CORESET configuration 1950. In particular, in the illustrated embodiment, the numbering may begin at a first REG 1952. The first REG 1952 may be numbered '1', which corresponds to a first BD candidate.

After numbering the first REG 1952, the numbering may proceed in the frequency-first order to the next REG in the frequency domain, which is a second REG 1954. The second REG 1954 may be numbered '2'. The numbering may cycle back to '1' after numbering the second REG 1954 with '2'. The numbering may proceed to the next REG in the frequency. The third REG 1956 may be numbered '1' based on the numbering being cycled back to '1' after the second REG 1954. The numbering may proceed to a sixteenth REG 1958, which is numbered with '2'.

As the sixteenth REG 1958 is the last REG of the time, the numbering may proceed to the next group of REGs in the time domain. Further, the cyclic shift may be applied to the numbering as the numbering proceeds to the next group of REGs in the time domain. In particular, the numbering may proceed to the REG adjacent in time to the REG at which the numbering began in the current group of REGs in the time domain, which is a seventeenth REG 1960. Rather than numbering the seventeenth REG 1960, the cyclic shift may be applied, shifting the numbering by one REG in the frequency domain to an eighteenth REG 1962. The numbering may proceed in the frequency-first order until all the REGs in the time within the same group of REGs in the time domain with the eighteenth REG 1962 are numbered. The numbering may again perform a cyclic shift after completion of the numbering of the REGs within the time. The numbering may proceed in the disclosed fashion until all the REGs within the CORESET of the CORESET configuration 1950 have been numbered.

Figure 20:
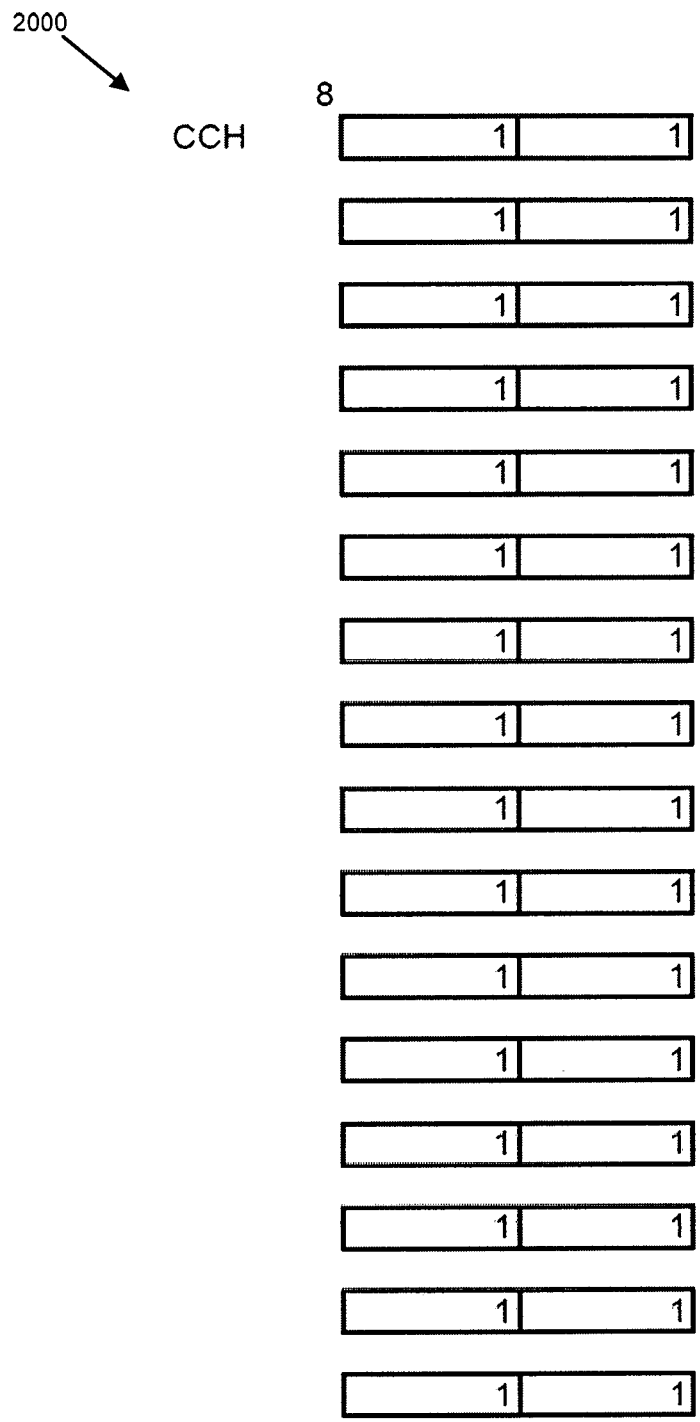
FIG. 20 illustrates graphical representations of another example CORESET configuration, according to various embodiments.

FIG. 20 illustrates graphical representations of another example CORESET configuration 2000, according to various embodiments. The fourth CORESET configuration 2000 may be related to CORESET configuration 1800 (FIG. 18) and may be utilized for UEs of AL8 within the network. The CORESET configuration 2000 may support an eighth as many BD candidates as the CORESET configuration 1800 based on being for the UEs of AL8. Accordingly, the CORESET configuration 2000 may support one BD candidate in the illustrated embodiment. As the CORESET configuration 2000 includes only one BD candidate, all the REGs within the CORESET may be assigned to the first BD candidate and numbered with '1', which corresponds to the first BD candidate.

FIG. 21 illustrates a tabular representation 2100 of example correspondence between HSS approaches and HSS structures, according to various embodiments. In particular, some of the HSS structures may lead to a same HSS mapping approach/result. Tabular representation 2100 illustrates the correspondence between the HSS approaches and the HSS structures.

The tabular representation 2100 includes a first column 2102 that lists some approaches that may result from the HSS structures. The tabular representation 2100 includes a second column 2104 that lists the HSS structures that may correspond to each of the approaches. For example, a first approach 2106 within the first column 2102 may correspond to H1, H3, H7, and H9 HSS structures, as shown in the second column 2104.

This section only provides the SS formulation for the "Method 6" associated HSS structure H8 highlighted in Table 1. The SS formulation for other HSS structures may be obtained by similar principle.

A sixth approach 2108 may correspond to H8. The sixth approach may be formulated for frequency-first REG numbering applied in distributed NR-PDCCH SS. Based on frequency-first REG numbering applied in distributed NR-PDCCH SS, the ith BD candidate of aggregation level L may include REGs with the following indexes, $r^{L,i}=$ $\{r_m^{L,i}: m = 0, 1, \ldots, QL-1, i = 0, 1, \ldots n_{BD}^L - 1\}$, wherein $r_m^{L,i} =$ $$\left\lfloor \frac{m}{n_{REG}^{Sym,L}} \right\rfloor N_{RB} + \text{mod}\left( r_0^{L,i} + \left\lfloor \frac{m}{n_{REG}^{Sym,L}} \right\rfloor \left\lfloor \frac{N_{RB}}{K} \right\rfloor + \text{mod}(m, n_{REG}^{Sym,L}), N_{RB} \right),$$

$$n_{REG}^{Sym,L} = \frac{QL}{K}, \bar{n}_{BD}^L = \left\lfloor \frac{N_{RB}K}{QL} \right\rfloor, n_{BD}^L = \min\{\bar{n}_{BD}^L, \bar{n}_{BD}^L\},$$

and $r_0^{L,i} = \text{mod}\left( f(n_{TTI}, n_{UE}) + \left\lfloor \frac{\bar{n}_{BD}^L}{n_{BD}^L} \right\rfloor i, \bar{n}_{BD}^L \right) n_{REG}^{Sym,L} \cdot f(n_{TTI}, n_{UE})$ may be a pseudorandom value generation with function with a range of $(0, 1, \ldots, N_{RB} - n_{RB}^L - 1)$. $n_{TTI}$ may denote the index of TTI in a frame. $n_{UE}$ may denote a UE identity allocated by a network.

Figure 22:
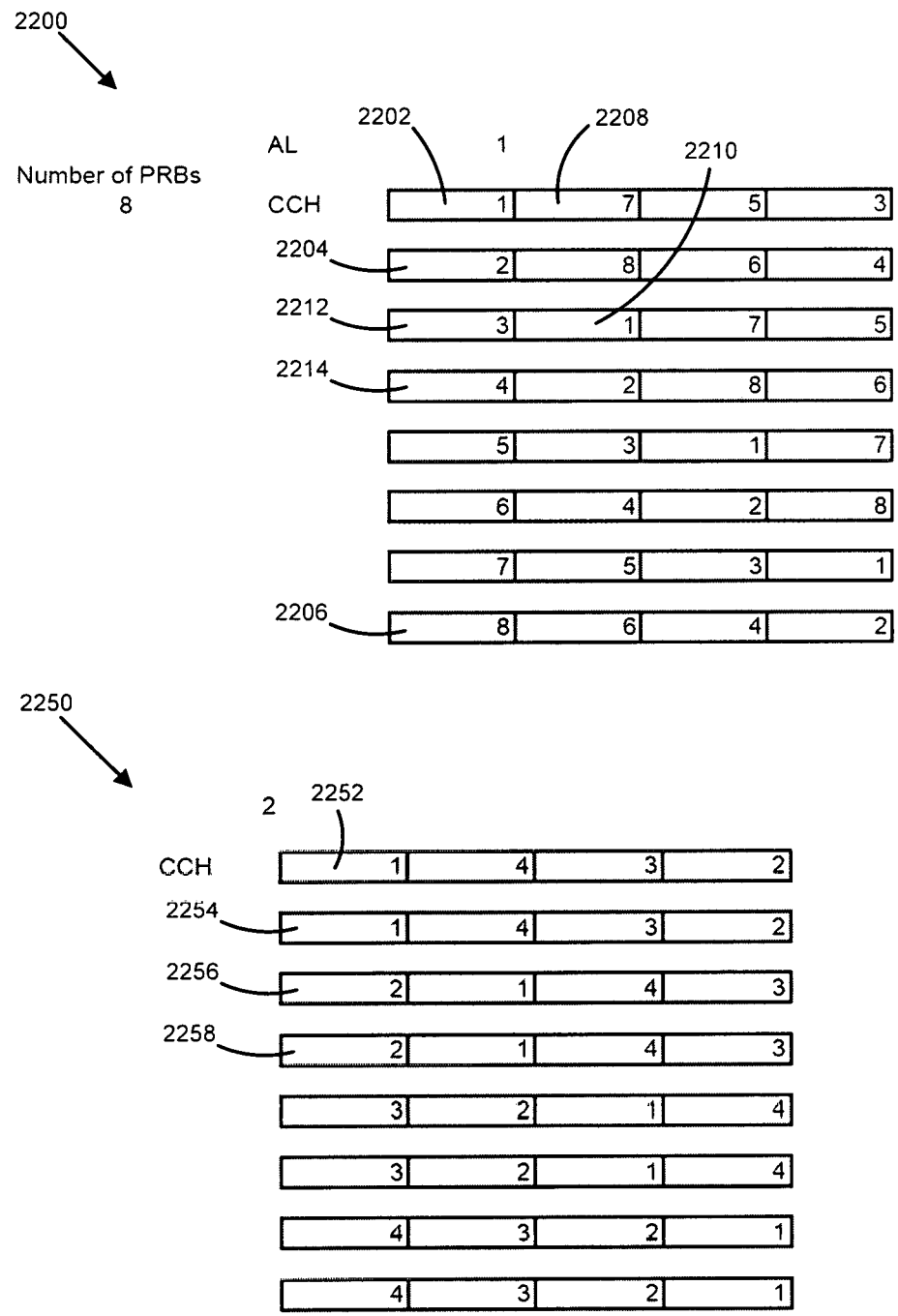
FIG. 22 illustrates graphical representations of example CORESET configurations, according to various embodiments.

FIG. 22 illustrates graphical representations of example CORESET configurations, according to various embodiments. In particular, the CORESET configurations of FIG. 22 may be associated with H8. A first CORESET configuration 2200 may be utilized for UEs of AL1 within a network. A second CORESET configuration 2250 may be related to CORESET configuration 2200 and may be utilized for UEs of AL2 within the network. Each box shown within the graphical representations represents an REG.

The CORESET of the CORESET configuration 2200 may include one or more PRBs. In the illustrated embodiment, the CORESET of the CORESET configuration 2200 includes eight PRBs, wherein each of the PRBs are represented by a row within the graphical representation. The CORESET of the CORESET configuration 2200 may further include one or more OFDM symbols. In the illustrated embodiment, the CORESET of the CORESET configuration 2200 includes four OFDM symbols, wherein each of the OFDM symbols are represented by a column within the graphical representation. The CORESET of the CORESET configuration 2200 may include a number of REGs based on the number of PRBs and the number of OFDM symbols in the CORESET. In particular, there may be an REG for each combination of the PRBs and the OFDMs symbols. The illustrated embodiment includes 32 REGs based on the eight PRBs and the four OFDM symbols.

The CORESET configuration 2200 may support one or more BD candidates. In the illustrated embodiment, the CORESET configuration 2200 includes eight BD candidates. Each of the BD candidates may include an equal number of REGs. In the illustrated embodiment, each of the BD candidates may include four REGs, based on the 32 REGs within the CORESET and the eight BD candidates supported.

The graphical representation may include a number within each of the boxes. The number may indicate a BD candidate of which the REG corresponding to the box is included within. The numbering may be from '1' to '8' to indicate each of the BD candidates. The numbering of the REGs, as represented by the boxes, illustrated may be generated in accordance with the description that follows.

The CORESET configuration 2200 may include BD candidates that are REG based distributed NR-PDCCH candidates. In particular, each of the BD candidates may include REGs that are distributed in both the time domain and the frequency domain. Accordingly, each of the REGs within each of the BD candidates may be of different frequency and/or different time from other REGs within the same BD candidate.

In order to facilitate the distribution, a cyclic shift may be applied to the count of the numbering after completion of the numbering of the REGs within a time. The cyclic shift may be determined to provide equal distribution in the time domain and/or the frequency domain between the REGs assigned to a BD candidate. The cyclic shift may be determined based on the number of BD candidates supported by the CORESET configuration 2200, the number of REGs to be assigned to each of the BD candidates, the number of PRBs within the CORESET, the number of REGs within the CORESET, or some combination thereof. For example, the cyclic shift may be determined to be two shifts based on the BD candidates including four REGs and the CORESET including eight PRBs, the two shifts providing the greatest distribution of the REGs within the BD candidates.

The numbering of the REGs in CORESET configuration 2200 may begin at a first REG in the time domain and the frequency domain of the CORESET configuration 2200. In particular, in the illustrated embodiment, the numbering may begin at a first REG 2202. The first REG 2202 may be numbered '1', which corresponds to a first BD candidate. The count of the numbering may be incremented after each REG is numbered. Further, the count may cycle back to '1' after an REG has been assigned the maximum number, which is '8' in the illustrated embodiment.

After numbering the first REG 2202, the numbering may proceed in the frequency-first order to the next REG in the frequency domain, which is the second REG 2204. The second REG 2204 may be numbered '2'. The numbering may proceed in the frequency-first order until an eighth REG 2206 is numbered with '8'. The numbering may cycle back to '1' after numbering the eighth REG 2206 with '8'.

As the eighth REG 2206 is the last REG of the time, the numbering may proceed to the next group of REGs in the time domain. Further, the cyclic shift may be applied to the numbering as the numbering proceeds to the next group of REGs in the time domain. In particular, the numbering may proceed to the REG adjacent in time to the REG at which the numbering began in the current group of REGs in the time domain, which is a ninth REG 2208. Rather than numbering the ninth REG 2208, the cyclic shift may be applied, shifting the numbering by two REGs in the frequency domain to an eleventh REG 2210. The numbering may proceed in the frequency-first order until all the REGs in the time within the same group of REGs in the time domain with the eleventh REG 2210 are numbered. The numbering may again perform a cyclic shift after completion of the numbering of the REGs within the time. The numbering may proceed in the disclosed fashion until all the REGs within the CORESET of the CORESET configuration 2200 have been numbered.

The second CORESET configuration 2250 may be related to CORESET configuration 2200 and may be utilized for UEs of AL2 within the network. The CORESET configuration 2250 may support half as many BD candidates as the CORESET configuration 2200 based on being for the UEs of AL2. Accordingly, the CORESET configuration 2250 may support four BD candidates in the illustrated embodiment. Each of the BD candidates may include an equal number of REGs. In the illustrated embodiment, each of the BD candidates may include eight REGs, based on the 32 REGs within the CORESET and the four BD candidates supported.

The CORESET configuration 2250 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

Further, the CORESET configuration 2250 may have an aggregation direction. The aggregation direction may be in the frequency domain or in the time domain. The configuration of higher AL CORESET configurations may aggregate the REGs of the CORESET configuration 2200 based on the aggregation direction. In particular, each BD candidate in the higher ALs may be aggregated to include a number of BD candidates of the CORESET configuration 2200 equal to the AL, wherein the BD candidates of the CORESET configuration 2200 are combined in the aggregation direction to produce the BD candidates of the higher ALs. In the illustrated embodiment, the CORESET configuration 2250 may have an aggregation direction in the frequency domain, causing the adjacent BD candidates in the frequency domain of the CORESET configuration 2200 to be combined to produce a BD candidate of CORESET configuration 2250.

In the illustrated embodiment, the CORESET configuration 2250 has an AL of two and an AL direction in the frequency domain. As shown in the CORESET configuration 2200, the first BD candidate may include the first REG 2202 and the second BD candidate, which is adjacent to the first BD candidate in the frequency domain, may include the second REG 2204. In the CORESET configuration 2250, the first BD candidate and the second BD candidate of the CORESET configuration 2200 may be combined to produce a first BD candidate of the CORESET configuration 2250 based on the AL of the CORESET configuration 2250 being two. Accordingly, the first REG 2252 and the second REG 2254 may be numbered with '1', which corresponds to the first BD candidate of the CORESET configuration 2250. Further, a third BD candidate and a fourth BD candidate of the CORESET configuration 2200 may be combined to produce a second BD candidate of the CORESET configuration 2250. Accordingly, a third REG 2256 and a fourth REG 2258 may be numbered with '2', which corresponds to the second BD candidate of the CORESET configuration 2250. The aggregation procedure may be applied to all the REGs within the CORESET configuration 2200 to produce the CORESET configuration 2250.

Figure 23:
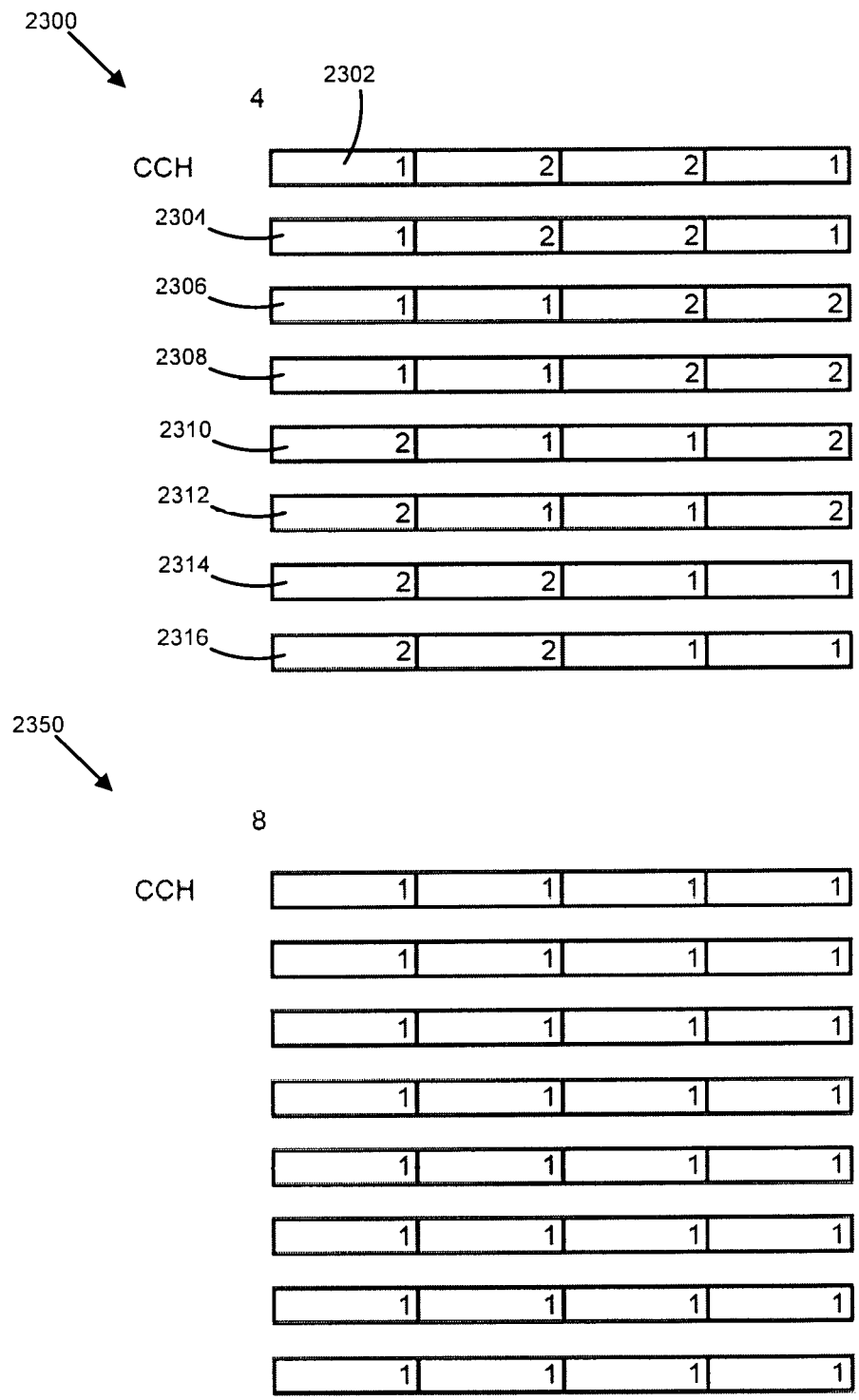
FIG. 23 illustrates graphical representations of example CORESET configurations, according to various embodiments.

FIG. 23 illustrates graphical representations of example CORESET configurations, according to various embodiments. In particular, a third CORESET configuration 2300 may be related to the CORESET configuration 2200 (FIG. 22) and may be utilized for UEs of AL4 within a network. A fourth CORESET configuration 2350 may be related to CORESET configuration 2200 and may be utilized for UEs of AL 8 within the network. Each box shown within the graphical representations represents an REG.

The third CORESET configuration 2300 may be related to CORESET configuration 2200 and may be utilized for UEs of AL4 within the network. The CORESET configuration 2300 may support a quarter as many BD candidates as the CORESET configuration 2200 based on being for the UEs of AL4. Accordingly, the CORESET configuration 2300 may support two BD candidates in the illustrated embodiment. Each of the BD candidates may include an equal number of REGs. In the illustrated embodiment, each of the BD candidates may include 16 REGs, based on the 32 REGs within the CORESET and the two BD candidates supported.

The CORESET configuration 2300 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

Further, the CORESET configuration 2300 may have an aggregation direction. The aggregation direction may be in the frequency domain or in the time domain. The configuration of higher AL CORESET configurations may aggregate the REGs of the CORESET configuration 2200 based on the aggregation direction. In particular, each BD candidate in the higher ALs may be aggregated to include a number of BD candidates of the CORESET configuration 2200 equal to the AL, wherein the BD candidates of the CORESET configuration 2200 are combined in the aggregation direction to produce the BD candidates of the higher ALs. In the illustrated embodiment, the CORESET configuration 2300 may have an aggregation direction in the frequency domain, causing the adjacent BD candidates in the frequency domain of the CORESET configuration 2200 to be combined to produce a BD candidate of CORESET configuration 2300.

In the illustrated embodiment, the CORESET configuration 2300 has an AL of four and an AL direction in the frequency domain. As shown in the CORESET configuration 2200, the first BD candidate may include the first REG 2202 (FIG. 22), the second BD candidate may include the second REG 2204 (FIG. 22), a third BD candidate may include a third REG 2212 (FIG. 22), and a fourth BD candidate may include a fourth REG 2214 (FIG. 22), all of which are adjacent in the frequency domain. In the CORESET configuration 2300, the first BD candidate, the second BD candidate, the third BD candidate, and the fourth BD candidate of the CORESET configuration 2200 may be combined to produce a first BD candidate of the CORESET configuration 2300 based on the AL of the CORESET configuration 2300 being four. Accordingly, a first REG 2302, a second REG 2304, a third REG 2306, and a fourth REG 2308 may be numbered with '1', which corresponds to the first BD candidate of the CORESET configuration 2300. Further, a fifth BD candidate, a sixth BD candidate, a seventh BD candidate, and an eighth BD candidate of the CORESET configuration 2200 may be combined to produce a second BD candidate of the CORESET configuration 2300. Accordingly, a fifth REG 2310, a sixth REG 2312, a seventh REG 2314, and an eighth REG 2316 may be numbered with '2', which corresponds to the second BD candidate of the CORESET configuration 2300. The aggregation procedure may be applied to all the REGs within the CORESET configuration 2200 to produce the CORESET configuration 2300.

The fourth CORESET configuration 2350 may be related to CORESET configuration 2200 and may be utilized for UEs of AL8 within the network. The CORESET configuration 2350 may support an eighth as many BD candidates as the CORESET configuration 2200 based on being for the UEs of AL8. Accordingly, the CORESET configuration 2350 may support one BD candidate in the illustrated embodiment. As the CORESET configuration 2350 includes only one BD candidate, all the REGs within the CORESET may be assigned to the first BD candidate and numbered with '1', which corresponds to the first BD candidate.

Figure 24:
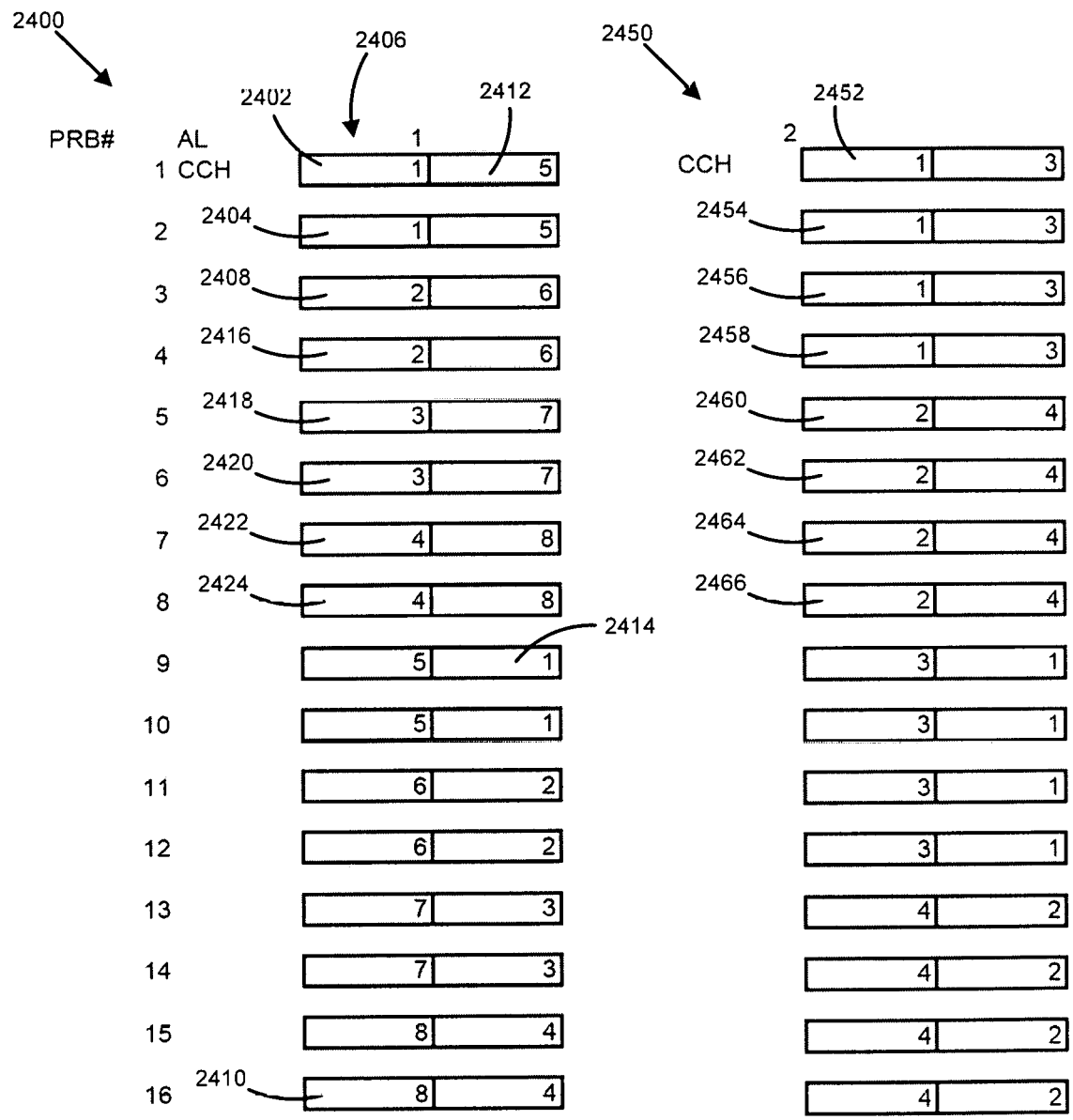
FIG. 24 illustrates graphical representations of example CORESET configurations, according to various embodiments.

FIG. 24 illustrates graphical representations of example CORESET configurations, according to various embodiments. In particular, the CORESET configurations of FIG. 24 may be associated with H8. A first CORESET configuration 2400 may be utilized for UEs of AL1 within a network. A second CORESET configuration 2450 may be related to CORESET configuration 2400 and may be utilized for UEs of AL2 within the network. Each box shown within the graphical representations represents an REG.

The CORESET of the CORESET configuration 2400 may include one or more PRBs. In the illustrated embodiment, the CORESET of the CORESET configuration 2400 includes 16 PRBs, wherein each of the PRBs are represented by a row within the graphical representation. The CORESET of the CORESET configuration 2400 may further include one or more OFDM symbols. In the illustrated embodiment, the CORESET of the CORESET configuration 2400 includes two OFDM symbols, wherein each of the OFDM symbols are represented by a column within the graphical representation. The CORESET of the CORESET configuration 2400 may include a number of REGs based on the number of PRBs and the number of OFDM symbols in the CORESET. In particular, there may be an REG for each combination of the PRBs and the OFDMs symbols. The illustrated embodiment includes 32 REGs based on the 16 PRBs and the two OFDM symbols.

The CORESET configuration 2400 may support one or more BD candidates. In the illustrated embodiment, the CORESET configuration 2400 includes eight BD candidates. Each of the BD candidates may include an equal number of REGs. In the illustrated embodiment, each of the BD candidates may include four REGs, based on the 32 REGs within the CORESET and the eight BD candidates supported.

The graphical representation may include a number within each of the boxes. The number may indicate a BD candidate of which the REG corresponding to the box is included within. The numbering may be from '1' to '8' to indicate each of the BD candidates. The numbering of the REGs, as represented by the boxes, illustrated may be generated in accordance with the description that follows.

The CORESET configuration 2400 may include BD candidates that are REG based distributed NR-PDCCH candidates. Tn particular, each of the BD candidates may include REGs that are distributed in both the time domain and the frequency domain. Accordingly, each of the REGs within each of the BD candidates may be of different frequency and/or different time from other REGs within the same BD candidate.

In embodiments where the number of REGs outnumber the number of OFDM symbols, there may be more than one REG assigned to a certain BD candidate within a single OFDM symbol. Tn these embodiments, the REGs assigned to the certain BD candidate may be adjacent to each other in the numbering direction. For example, the number of REGs outnumber the number of OFDM symbols in the illustrated embodiment, and there may be more than one REG assigned to the BD candidates within a single OFDM symbol. In the illustrated embodiment, the REGs assigned to the same BD candidate within an OFDM symbol are located adjacent to each other in the frequency-first order.

In order to facilitate the distribution, a cyclic shift may be applied to the count of the numbering after completion of the numbering of the REGs within a time. The cyclic shift may be determined to provide equal distribution in the time domain and/or the frequency domain between the REGs assigned to a BD candidate. The cyclic shift may be determined based on the number of BD candidates supported by the CORESET configuration 2400, the number of REGs to be assigned to each of the BD candidates, the number of PRBs within the CORESET, the number of REGs within the CORESET, or some combination thereof. For example, the cyclic shift may be determined to be eight shifts based on the BD candidates including four REGs and the CORESET including 16 PRBs, the eight shifts providing the greatest distribution of the REGs within the BD candidates.

The numbering of the REGs in CORESET configuration 2400 may begin at a first REG in the time domain and the frequency domain of the CORESET configuration 2400. In particular, in the illustrated embodiment, the numbering may begin at a first REG 2402. The first REG 2402 may be numbered '1', which corresponds to a first BD candidate. Further, the count may cycle back to '1' after an REG has been assigned the maximum number, which is '8' in the illustrated embodiment.

After numbering the first REG 2402, the numbering may proceed in the frequency-first order to the next REG in the frequency domain, which is the second REG 2404. The second REG 2404 may be numbered '1' based on two REGs being included in a first OFDM symbol 2406 and the REGs of the same number to be adjacent to each other in the first OFDM symbol 2406.

The count of the numbering may increment after the second REG 2404 has been numbered. The numbering may proceed in the frequency-first order to a third REG 2408 and may number the third REG 2408 with '2'. The numbering may proceed in the frequency-first order until a sixteenth REG 2410 is numbered with '8'. The numbering may cycle back to '1' after numbering the sixteenth REG 2410 with '8'.

As the sixteenth REG 2410 is the last REG of the time, the numbering may proceed to the next group of REGs in the time domain. Further, the cyclic shift may be applied to the numbering as the numbering proceeds to the next group of REGs in the time domain. In particular, the numbering may proceed to the REG adjacent in time to the REG at which the numbering began in the current group of REGs in the time domain, which is a seventeenth REG 2412. Rather than numbering the seventeenth REG 2412, the cyclic shift may be applied, shifting the numbering by eight REGs in the frequency domain to a twenty-fifth REG 2414. The numbering may proceed in the frequency-first order until all the REGs in the time within the same group of REGs in the time domain with the twenty-fifth REG 2414 are numbered.

The second CORESET configuration 2450 may be related to CORESET configuration 2400 and may be utilized for UEs of AL2 within the network. The CORESET configuration 2450 may support half as many BD candidates as the CORESET configuration 2400 based on being for the UEs of AL2. Accordingly, the CORESET configuration 2450 may support four BD candidates in the illustrated embodiment. Each of the BD candidates may include an equal number of REGs. In the illustrated embodiment, each of the BD candidates may include eight REGs, based on the 32 REGs within the CORESET and the four BD candidates supported.

The CORESET configuration 2450 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

Further, the CORESET configuration 2450 may have an aggregation direction. The aggregation direction may be in the frequency domain or in the time domain. The configuration of higher AL CORESET configurations may aggregate the REGs of the CORESET configuration 2400 based on the aggregation direction. In particular, each BD candidate in the higher ALs may be aggregated to include a number of BD candidates of the CORESET configuration 2400 equal to the AL, wherein the BD candidates of the CORESET configuration 2400 are combined in the aggregation direction to produce the BD candidates of the higher ALs. In the illustrated embodiment, the CORESET configuration 2450 may have an aggregation direction in the frequency domain, causing the adjacent BD candidates in the frequency domain of the CORESET configuration 2400 to be combined to produce a BD candidate of CORESET configuration 2450.

In the illustrated embodiment, the CORESET configuration 2450 has an AL of two and an AL direction in the frequency domain. As shown in the CORESET configuration 2400, the first BD candidate may include the first REG 2402 and the second REG 2404, and the second BD candidate may include the third REG 2408 and a fourth REG 2416, all of which are adjacent in the frequency domain. In the CORESET configuration 2450, the first BD candidate and the second BD candidate of the CORESET configuration 2400 may be combined to produce a first BD candidate of the CORESET configuration 2450 based on the AL of the CORESET configuration 2450 being two. Accordingly, a first REG 2452, a second REG 2454, a third REG 2456, and a fourth REG 2458 may be numbered with '1', which corresponds to the first BD candidate of the CORESET configuration 2450. Further, a third BD candidate and a fourth BD candidate of the CORESET configuration 2400 may be combined to produce a second BD candidate of the CORESET configuration 2450. Accordingly, a fifth REG 2460, a sixth REG 2462, a seventh REG 2464, and an eighth REG 2466 may be numbered with '2', which corresponds to the second BD candidate of the CORESET configuration 2450. The aggregation procedure may be applied to all the REGs within the CORESET configuration 2400 to produce the CORESET configuration 2450.

Figure 25:
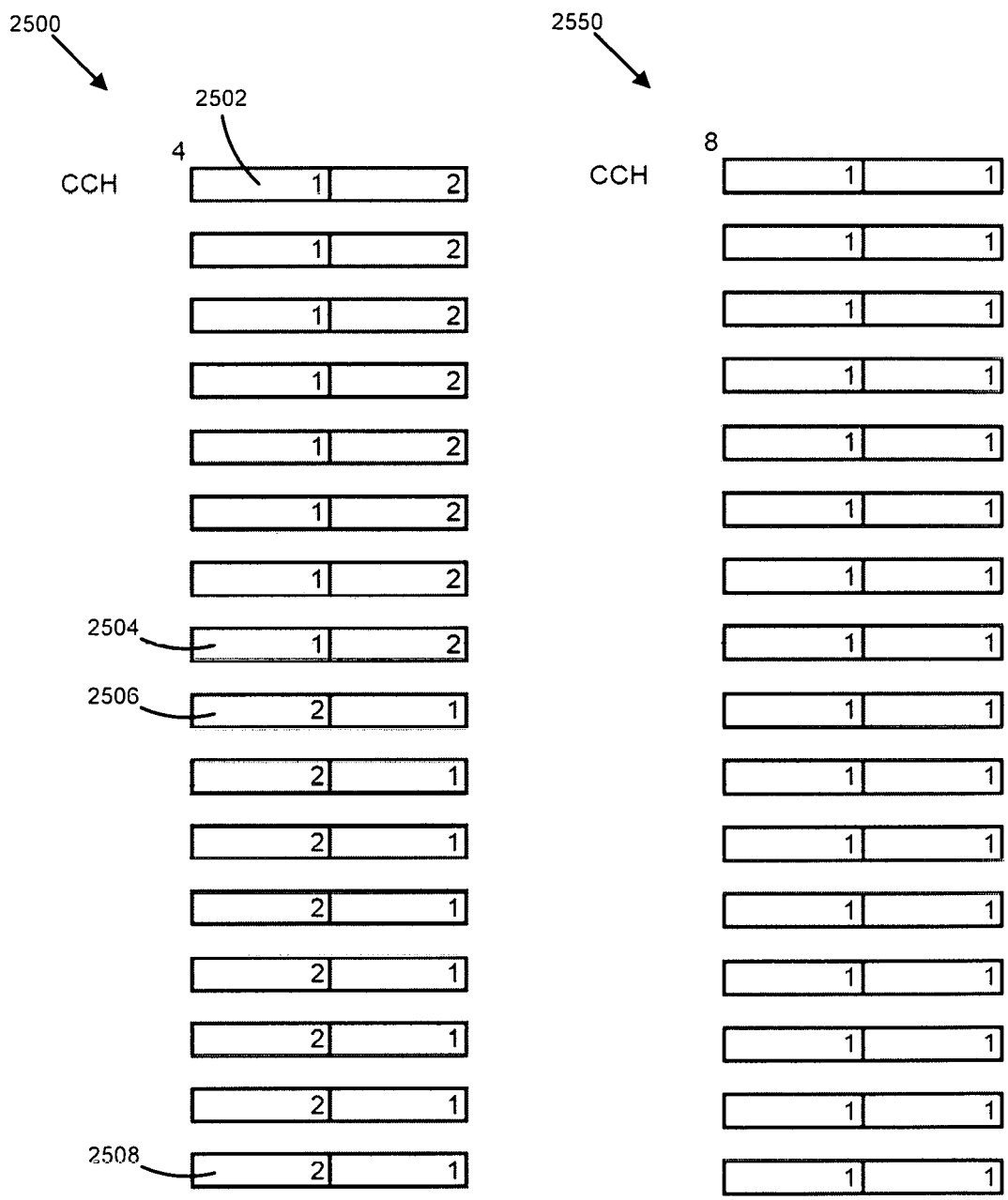
FIG. 25 illustrates graphical representations of example CORESET configurations, according to various embodiments.

FIG. 25 illustrates graphical representations of example CORESET configurations, according to various embodiments. In particular, a third CORESET configuration 2500 may be related to the CORESET configuration 2400 (FIG. 24) and may be utilized for UEs of AL4 within a network. A fourth CORESET configuration 2550 may be related to CORESET configuration 2400 and may be utilized for UEs of AL8 within the network. Each box shown within the graphical representations represents an REG.

The third CORESET configuration 2500 may be related to CORESET configuration 2400 and may be utilized for UEs of AL4 within the network. The CORESET configuration 2500 may support a quarter as many BD candidates as the CORESET configuration 2400 based on being for the UEs of AL4. Accordingly, the CORESET configuration 2500 may support two BD candidates in the illustrated embodiment. Each of the BD candidates may include an equal number of REGs. In the illustrated embodiment, each of the BD candidates may include 16 REGs, based on the 32 REGs within the CORESET and the two BD candidates supported.

The CORESET configuration 2500 may include distributed BD candidates. In particular, each of the BD candidates may include REGs that are distributed in both the time domain and the frequency domain. Accordingly, each of the REGs within each of the BD candidates may be of different frequency and/or different time from other REGs within the same BD candidate.

Further, the CORESET configuration 2500 may have an aggregation direction. The aggregation direction may be in the frequency domain or in the time domain. The configuration of higher AL CORESET configurations may aggregate the REGs of the CORESET configuration 2400 based on the aggregation direction. In particular, each BD candidate in the higher ALs may be aggregated to include a number of BD candidates of the CORESET configuration 2400 equal to the AL, wherein the BD candidates of the CORESET configuration 2400 are combined in the aggregation direction to produce the BD candidates of the higher ALs. In the illustrated embodiment, the CORESET configuration 2500 may have an aggregation direction in the frequency domain, causing the adjacent BD candidates in the frequency domain of the CORESET configuration 2400 to be combined to produce a BD candidate of CORESET configuration 2500.

In the illustrated embodiment, the CORESET configuration 2500 has an AL of four and an AL direction in the frequency domain. As shown in the CORESET configuration 2400, the first BD candidate may include the first REG 2402 (FIG. 24) and the second REG 2404 (FIG. 24), the second BD candidate may include the third REG 2408 (FIG. 24) and the fourth REG 2416 (FIG. 24), a third BD candidate may include a fifth REG 2418 (FIG. 24) and a sixth REG 2420 (FIG. 24), and a fourth BD candidate may include a seventh REG 2422 (FIG. 24) and an eighth REG 2424 (FIG. 24), all of which are adjacent in the frequency domain. In the CORESET configuration 2500, the first BD candidate, the second BD candidate, the third BD candidate, and the fourth BD candidate of the CORESET configuration 2400 may be combined to produce a first BD candidate of the CORESET configuration 2500 based on the AL of the CORESET configuration 2500 being four. Accordingly, a first REG 2502 through an eighth REG 2504 may be numbered with '1', which corresponds to the first BD candidate of the CORESET configuration 2500. Further, a fifth BD candidate, a sixth BD candidate, a seventh BD candidate, and an eighth BD candidate of the CORESET configuration 2400 may be combined to produce a second BD candidate of the CORESET configuration 2500. Accordingly, a ninth REG 2506 through an eighteenth REG 2508 may be numbered with '2', which corresponds to the second BD candidate of the CORESET configuration 2500. The aggregation procedure may be applied to all the REGs within the CORESET configuration 2400 to produce the CORESET configuration 2500.

The fourth CORESET configuration 2550 may be related to CORESET configuration 2400 and may be utilized for UEs of AL8 within the network. The CORESET configuration 2550 may support an eighth as many BD candidates as the CORESET configuration 2400 based on being for the UEs of AL8. Accordingly, the CORESET configuration 2550 may support one BD candidate in the illustrated embodiment. As the CORESET configuration 2550 includes only one BD candidate, all the REGs within the CORESET may be assigned to the first BD candidate and numbered with '1', which corresponds to the first BD candidate.

Figure 26:
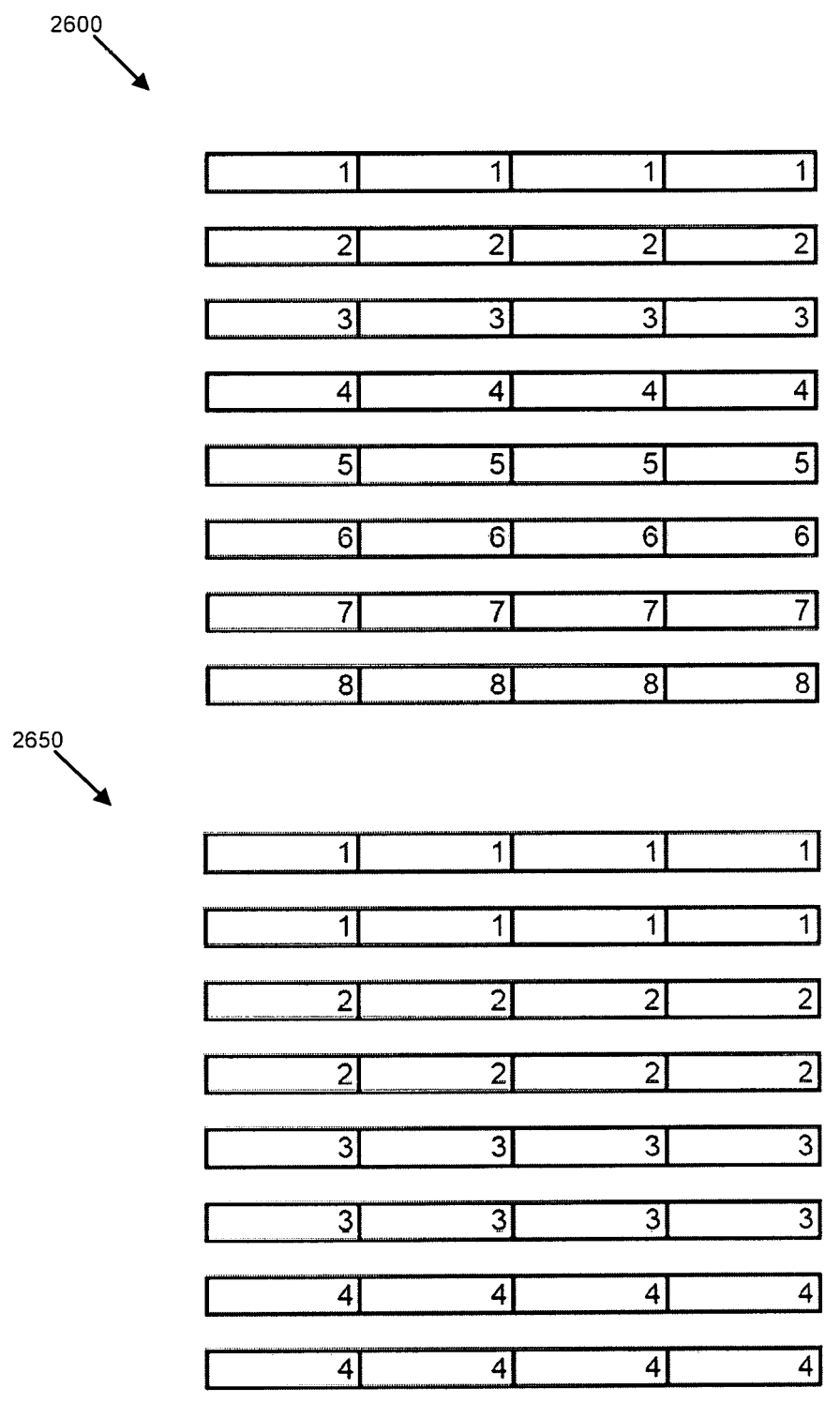

FIG. 26 illustrates graphical representations of example CORESET configurations, according to various embodiments. In particular, a first CORESET configuration 2600 and a second CORESET configuration 2650 may be produced by applying the characteristics of H1, H3, H7, or H9, described above, to a CORESET. The first CORESET configuration 2600 may be utilized for UEs of AL1 within a network. The second CORESET configuration 2650 may be related to the first CORESET configuration 2600 and may be utilized for UEs of AL2 within a network.

The CORESET illustrated for the first CORESET configuration 2600 and the second CORESET configuration 2650 may include eight physical resource blocks, illustrated as rows within the graphical representations. Further, the CORESET illustrated for the first CORESET configuration 2600 and the second CORESET configuration 2650 may include four OFDM symbols, illustrated as columns within the graphical representations.

FIG. 27 illustrates graphical representations of example CORESET configurations, according to various embodiments. In particular, a first CORESET configuration 2700 and a second CORESET configuration 2750 may be produced by applying the characteristics of H2, described above, to a CORESET. The first CORESET configuration 2700 may be utilized for UEs of AL1 within a network. The second CORESET configuration 2750 may be related to the first CORESET configuration 2700 and may be utilized for UEs of AL2 within a network.

The CORESET illustrated for the first CORESET configuration 2700 and the second CORESET configuration 2750 may include eight physical resource blocks, illustrated as rows within the graphical representations. Further, the CORESET illustrated for the first CORESET configuration 2700 and the second CORESET configuration 2750 may include four OFDM symbols, illustrated as columns within the graphical representations.

Figure 28:
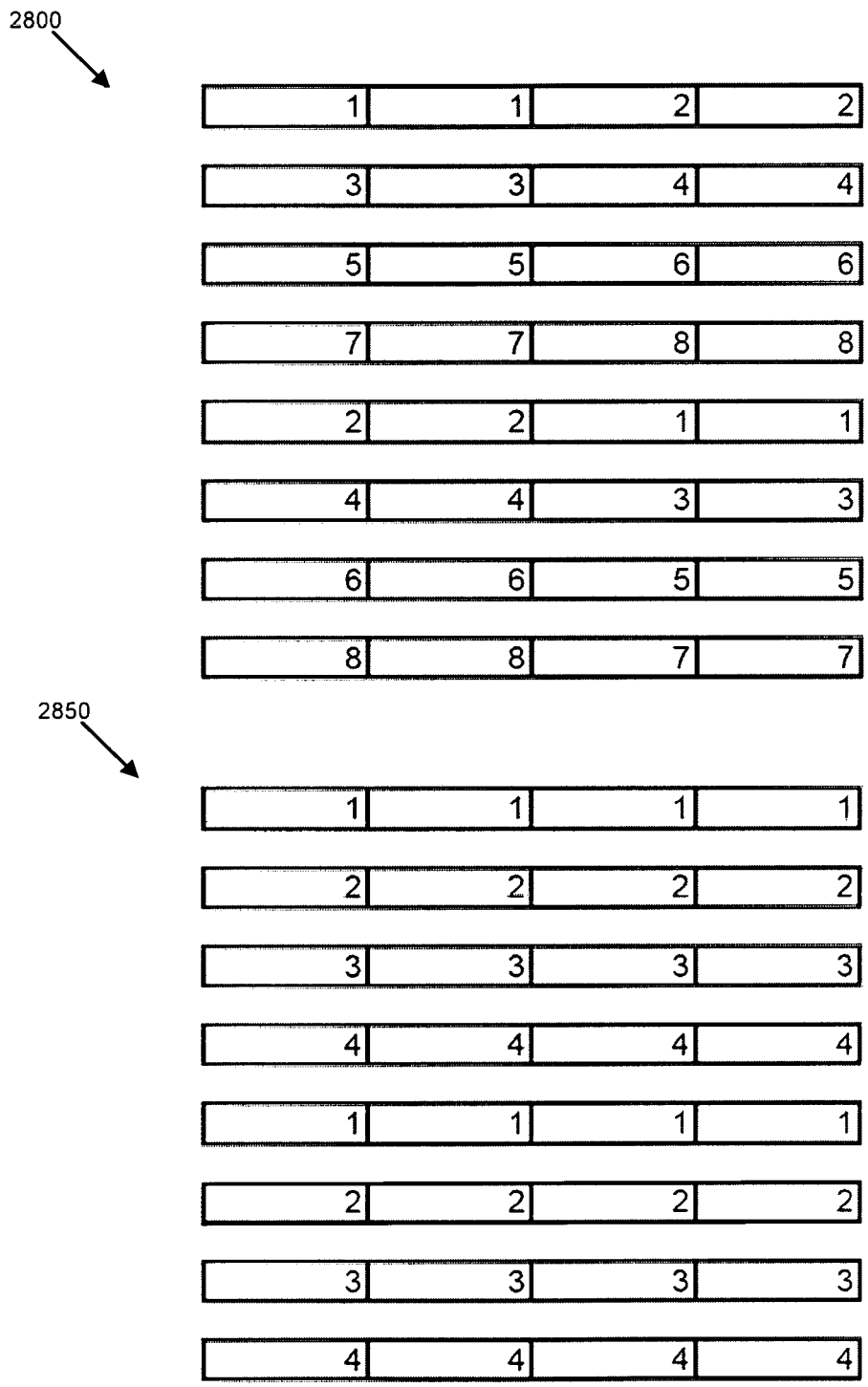
FIG. 28 illustrates graphical representations of example CORESET configurations, according to various embodiments.

FIG. 28 illustrates graphical representations of example CORESET configurations, according to various embodiments. In particular, a first CORESET configuration 2800 and a second CORESET configuration 2850 may be produced by applying the characteristics of H4, described above, to a CORESET. The first CORESET configuration 2800 may be utilized for UEs of AL1 within a network. The second CORESET configuration 2850 may be related to the first CORESET configuration 2800 and may be utilized for UEs of AL2 within a network.

The CORESET illustrated for the first CORESET configuration 2800 and the second CORESET configuration 2850 may include eight physical resource blocks, illustrated as rows within the graphical representations. Further, the CORESET illustrated for the first CORESET configuration 2800 and the second CORESET configuration 2850 may include four OFDM symbols, illustrated as columns within the graphical representations.

Figure 29:
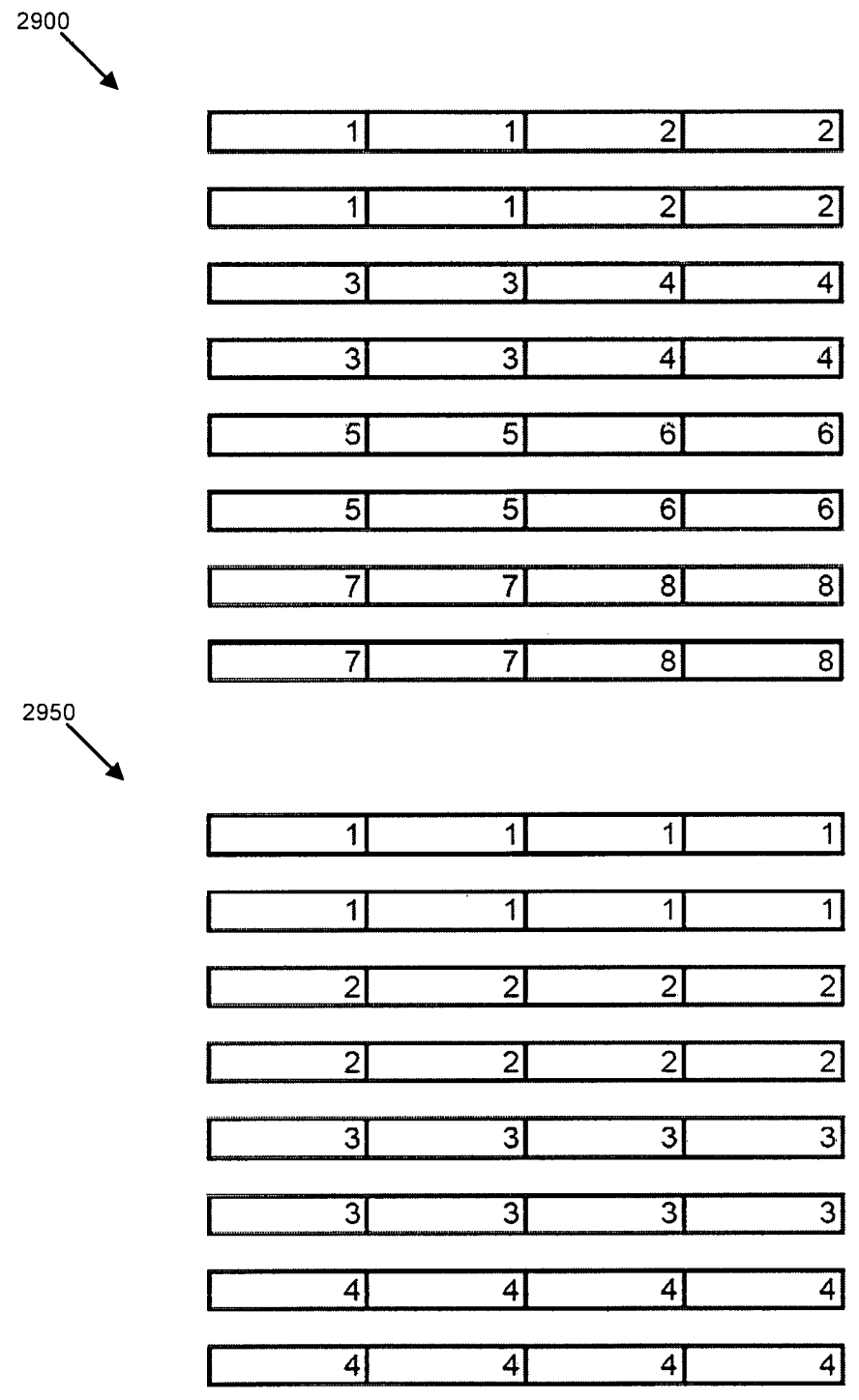

FIG. 29 illustrates graphical representations of example CORESET configurations, according to various embodiments. In particular, a first CORESET configuration 2900 and a second CORESET configuration 2950 may be produced by applying the characteristics of H5 or H11, described above, to a CORESET. The first CORESET configuration 2900 may be utilized for UEs of AL1 within a network. The second CORESET configuration 2950 may be related to the first CORESET configuration 2900 and may be utilized for UEs of AL2 within a network.

The CORESET illustrated for the first CORESET configuration 2900 and the second CORESET configuration 2950 may include eight physical resource blocks, illustrated as rows within the graphical representations. Further, the CORESET illustrated for the first CORESET configuration 2900 and the second CORESET configuration 2950 may include four OFDM symbols, illustrated as columns within the graphical representations.

Figure 30:
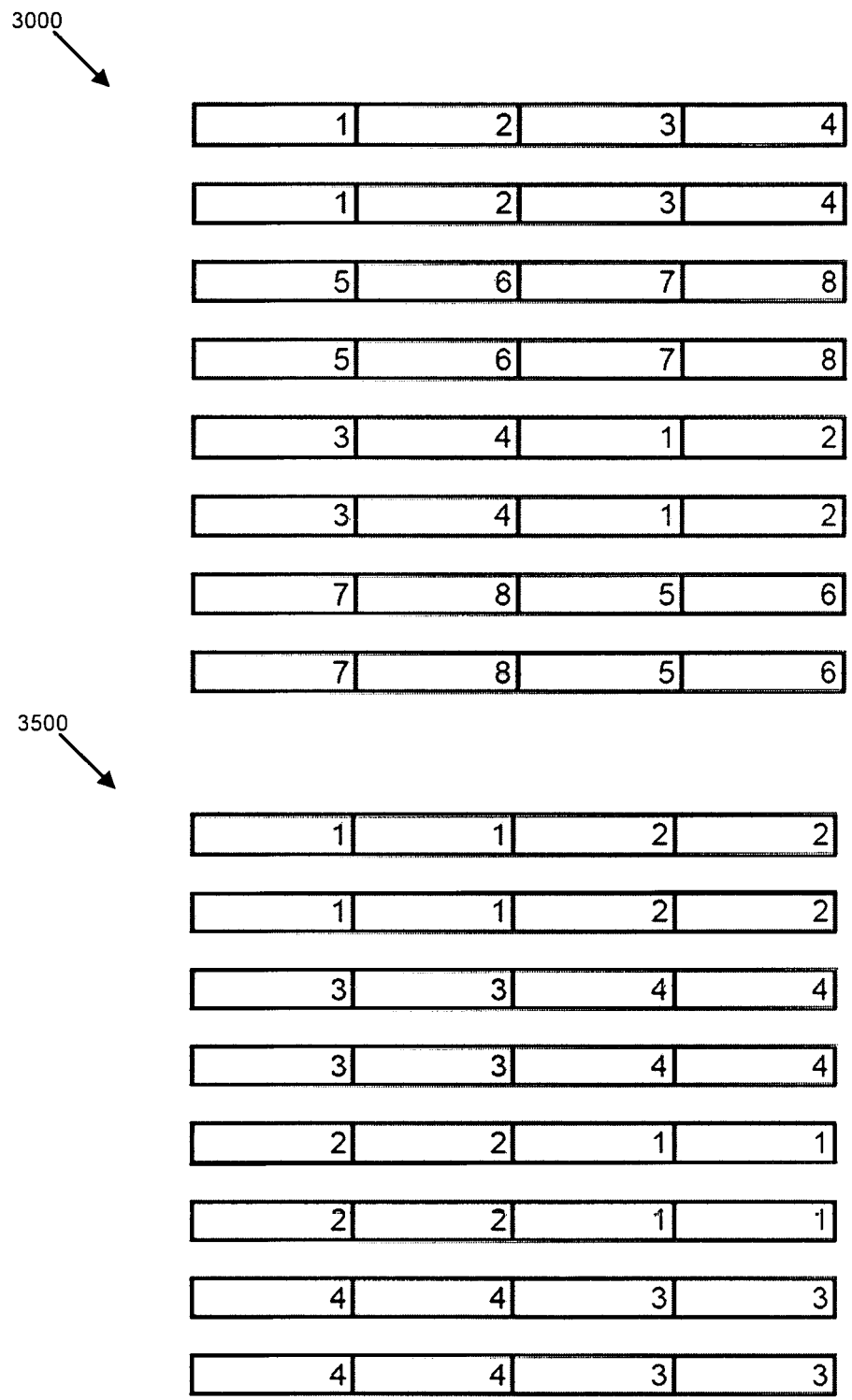
FIG. 30 illustrates graphical representations of example CORESET configurations, according to various embodiments.

FIG. 30 illustrates graphical representations of example CORESET configurations, according to various embodiments. In particular, a first CORESET configuration 3000 and a second CORESET configuration 3050 may be produced by applying the characteristics of H6, described above, to a CORESET. The first CORESET configuration 3000 may be utilized for UEs of AL1 within a network. The second CORESET configuration 3050 may be related to the first CORESET configuration 3000 and may be utilized for UEs of AL2 within a network.

The CORESET illustrated for the first CORESET configuration 3000 and the second CORESET configuration 3050 may include eight physical resource blocks, illustrated as rows within the graphical representations. Further, the CORESET illustrated for the first CORESET configuration 3000 and the second CORESET configuration 3050 may include four OFDM symbols, illustrated as columns within the graphical representations.

FIG. 31 illustrates graphical representations of example CORESET configurations, according to various embodiments. In particular, a first CORESET configuration 3100 and a second CORESET configuration 3150 may be produced by applying the characteristics of H10, described above, to a CORESET. The first CORESET configuration 3100 may be utilized for UEs of AL1 within a network. The second CORESET configuration 3150 may be related to the first CORESET configuration 3100 and may be utilized for UEs of AL2 within a network.

The CORESET illustrated for the first CORESET configuration 3100 and the second CORESET configuration 3150 may include eight physical resource blocks, illustrated as rows within the graphical representations. Further, the CORESET illustrated for the first CORESET configuration 3100 and the second CORESET configuration 3150 may include four OFDM symbols, illustrated as columns within the graphical representations.

FIG. 32 illustrates graphical representations of example CORESET configurations, according to various embodiments. In particular, a first CORESET configuration 3200 and a second CORESET configuration 3250 may be produced by applying the characteristics of H12, described above, to a CORESET. The first CORESET configuration 3200 may be utilized for UEs of AL1 within a network. The second CORESET configuration 3250 may be related to the first CORESET configuration 3200 and may be utilized for UEs of AL2 within a network.

The CORESET illustrated for the first CORESET configuration 3200 and the second CORESET configuration 3250 may include eight physical resource blocks, illustrated as rows within the graphical representations. Further, the CORESET illustrated for the first CORESET configuration 3200 and the second CORESET configuration 3250 may include four OFDM symbols, illustrated as columns within the graphical representations.

Figure 33:
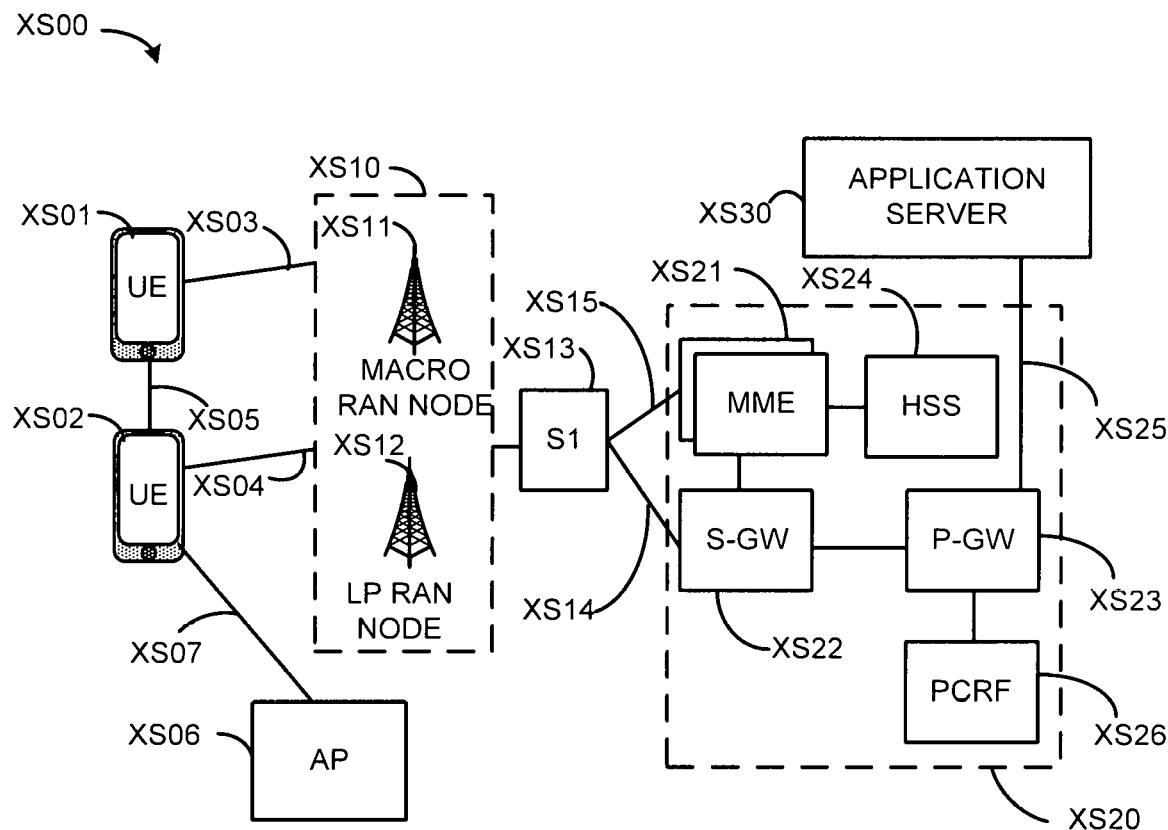
FIG. 33 illustrates an example architecture of a system of a network, according to various embodiments.

FIG. 33 illustrates an architecture of a system XS00 of a network in accordance with some embodiments. The system XS00 is shown to include a user equipment (UE) XS01 and a UE XS02. The UEs XS01 and XS02 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs XS01 and XS02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XS01 and XS02 may be configured to connect, e.g., communicatively couple, with a radio access network (RAN) XS10—the RAN XS 10 may be, for example, an Evolved Universal Mobile Telecommunications System (UMTS) Terrestrial Radio Access Network (E-UTRAN), a NextGen RAN (NG RAN), or some other type of RAN. The UEs XS01 and XS02 utilize connections XS03 and XS04, respectively, each of which comprises a physical communications interface or layer (discussed in further detail below); in this example, the connections XS03 and XS04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XS01 and XS02 may further directly exchange communication data via a ProSe interface XS05. The ProSe interface XS05 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE XS02 is shown to be configured to access an access point (AP) XS06 via connection XS07. The connection XS07 can comprise a local wireless connection, such as a connection consistent with any IEEE 802.11 protocol, wherein the AP XS06 would comprise a wireless fidelity (WiFi®) router. In this example, the AP XS06 is shown to be connected to the Internet without connecting to the core network of the wireless system (described in further detail below). The RAN XS 10 can include one or more access nodes that enable the connections XS03 and XS04. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN XS10 may include one or more RAN nodes for providing macrocells, e.g., macro RAN node XS11, and one or more RAN nodes for providing femtocells or picocells (e.g., cells having smaller coverage areas, smaller user capacity, or higher bandwidth compared to macrocells), e.g., low power (LP) RAN node XS12.

Any of the RAN nodes XS11 and XS12 can terminate the air interface protocol and can be the first point of contact for the UEs XS01 and XS02. In some embodiments, any of the RAN nodes XS11 and XS12 can fulfill various logical functions for the RAN XS10 including, but not limited to, radio network controller (RNC) functions such as radio bearer management, uplink and downlink dynamic radio resource management and data packet scheduling, and mobility management.

In accordance with some embodiments, the UEs XS01 and XS02 can be configured to communicate using Orthogonal Frequency-Division Multiplexing (OFDM) communication signals with each other or with any of the RAN nodes XS11 and XS12 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XS11 and XS12 to the UEs XS01 and XS02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may early user data and higher-layer signaling to the UEs XS01 and XS02. The physical downlink control channel (PDCCH) may carry information about the transport format and resource allocations related to the PDSCH channel, among other things. It may also inform the UEs XS01 and XS02 about the transport format, resource allocation, and H-ARQ (Hybrid Automatic Repeat Request) information related to the uplink shared channel. Typically, downlink scheduling (assigning control and shared channel resource blocks to the UEs XS01 and XS02 within a cell) may be performed at any of the RAN nodes XS11 and XS12 based on channel quality information fed back from any of the UEs XS01 and XS02. The downlink resource assignment information may be sent on the PDCCH used for (e.g., assigned to) each of the UEs XS01 and XS02.

The PDCCH may use CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN XS10 is shown to be communicatively coupled to a core network (CN) XS20—via an S1 interface XS13. In embodiments, the CN XS20 may be an evolved packet core (EPC) network, a NextGen Packet Core (NPC) network, or some other type of CN. In this embodiment the S1 interface XS13 is split into two parts: the S1-U interface XS14, which carries traffic data between the RAN nodes XS11 and XS12 and the serving gateway (S-GW) XS22, and the S1-mobility management entity (MME) interface XS15, which is a signaling interface between the RAN nodes XS11 and XS12 and MMEs XS21.

In this embodiment, the CN XS20 comprises the MMEs XS21, the S-GW XS22. the Packet Data Network (PDN) Gateway (P-GW) XS23, and a home subscriber server (HSS) XS24. The MMEs XS21 may be similar in function to the control plane of legacy Serving General Packet Radio Service (GPRS) Support Nodes (SGSN). The MMEs XS21 may manage mobility aspects in access such as gateway selection and tracking area list management. The HSS XS24 may comprise a database for network users, including subscription-related information to support the network entities' handling of communication sessions. The CN XS20 may comprise one or several HSSs XS24, depending on the number of mobile subscribers, on the capacity of the equipment, on the organization of the network, etc. For example, the HSS XS24 can provide support for routing/roaming, authentication, authorization, naming/addressing resolution, location dependencies, etc.

The S-GW X522 may terminate the S1 interface XS13 towards the RAN XS10, and routes data packets between the RAN XS10 and the CN XS20. In addition, the S-GW XS22 may be a local mobility anchor point for inter-RAN node handovers and also may provide an anchor for inter-3GPP mobility. Other responsibilities may include lawful intercept, charging, and some policy enforcement.

The P-GW XS23 may terminate an SGi interface toward a PDN. The P-GW XS23 may route data packets between the CN XS20 and external networks such as a network including the application server XS30 (alternatively referred to as application function (AF)) via an Internet Protocol (IP) interface XS25. Generally, the application server XS30 may be an element offering applications that use IP bearer resources with the core network (e.g., UMTS Packet Services (PS) domain, LTE PS data services, etc.). In this embodiment, the P-GW XS23 is shown to be communicatively coupled to an application server XS30 via an IP communications interface XS25. The application server XS30 can also be configured to support one or more communication services (e.g., Voice-over-Internet Protocol (VoIP) sessions, PTT sessions, group communication sessions, social networking services, etc.) for the UEs XS01 and XS02 via the CN XS20.

The P-GW XS23 may further be a node for policy enforcement and charging data collection. Policy and Charging Enforcement Function (PCRF) XS26 is the policy and charging control element of the CN XS20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF XS26 may be communicatively coupled to the application server XS30 via the P-GW XS23. The application server XS30 may signal the PCRF XS26 to indicate a new service flow and select the appropriate Quality of Service (QoS) and charging parameters. The PCRF XS26 may provision this rule into a Policy and Charging Enforcement Function (PCEF) (not shown) with the appropriate traffic flow template (TFT) and QoS class of identifier (QCT), which commences the QoS and charging as specified by the application server XS30.

The UEs XS01 and XS02 and/or the RAN nodes XS11 and XS12 may implement one or more of the CORESETs and/or CORESET configurations, and/or approaches to generate the CORESETs and/or CORESET configurations, described herein. In particular, signaling may occur between the UEs and the RAN nodes to define the approaches, CORESETs, and/or CORESET configurations to be implemented by the UEs and the RAN nodes. For example, the RAN node XS11 may transmit one or more signals to the UE XS01 that indicate whether REGBs are to be implemented in the CORESETS, the number of REGs within each REGB, a bundling direction, a cyclic shift, whether LSS, DSS, or HSS is to be implemented, which HSS structure is to be implemented, a numbering direction, an aggregation direction, or some combination thereof. In other embodiments, the UE XS01 may transmit the one or more signals, or the UE XS01 may transmit a portion of the signals and the RAN node XS11 may transmit another portion of the signals. Further, the UE XS01 may transmit one or more signals that indicate an AL of the UE XS01. In some embodiments, the signaling may be transmitted via higher layers and/or RRC signaling.

Based on the signaling, the UEs XS01 and XS02, and/or the RAN nodes XS11 and XS12, may implement the indicated characteristics for SS and/or CORESET transmissions. Accordingly, the UEs XS01 and XS02, and/or the RAN nodes XS11 and X12 may transmit and/or receive SS and/or CORESET transmissions of the same configuration, allowing the transmissions to be interpreted by both components. In some embodiments, the SS and/or CORESET transmissions may be transmitted vian NR-PDCCH.

Figure 34:
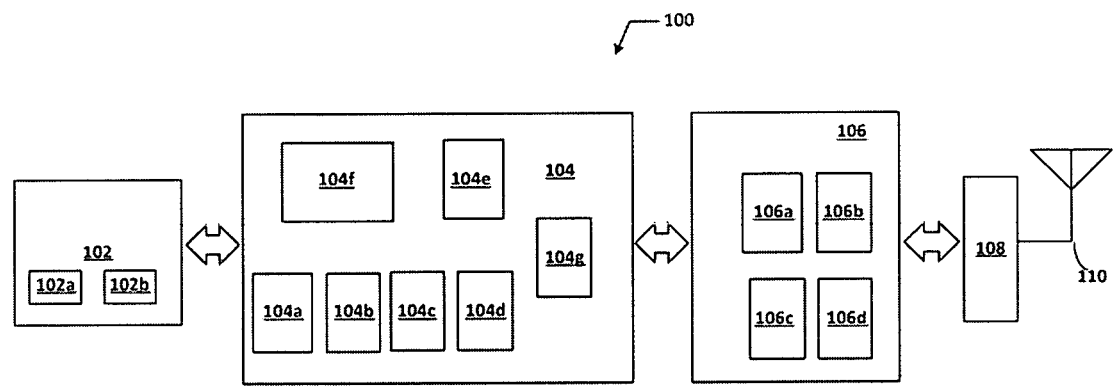
FIG. 34 illustrates components of an example device, according to various embodiments.

FIG. 34 illustrates, for one embodiment, example components of an electronic device 100. In embodiments, the electronic device 100 may be, implement, be incorporated into, or otherwise be a part of a user equipment (UE), an evolved NodeB (eNB), and/or some other electronic device. In some embodiments, the electronic device 100 may include application circuitry 102, baseband circuitry 104, Radio Frequency (RF) circuitry 106, front-end module (FEM) circuitry 108 and one or more antennas 110, coupled together at least as shown. In embodiments where the electronic device 100 is implemented in or by an eNB, the electronic device 100 may also include network interface circuitry (not shown) for communicating over a wired interface (for example, an X2 interface, an S1 interface, and the like). In particular, the electronic device 100 may be implemented in or by the UEs XS01 and XS02 (FIG. 33), and/or the RAN nodes XS11 and XS12 (FIG. 33).

The application circuitry 102 may include one or more application processors. For example, the application circuitry 102 may include circuitry such as, but not limited to, one or more single-core or multi-core processors 102a. The processor(s) 102a may include any combination of general-purpose processors and dedicated processors (e.g., graphics processors, application processors, etc.). The processors 102a may be coupled with and/or may include computer-readable media 102b (also referred to as "CRM 102b", "memory 102b", "storage 102b", or "memory/storage 102b") and may be configured to execute instructions stored in the CRM 102b to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband circuity 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, and the like. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may include elements for compression/decompression and echo cancellation and may include other suitable processing elements in other embodiments. The baseband circuitry 104 may further include computer-readable media 104g (also referred to as "CRM 104g", "memory 104g", "storage 104g", or "CRM 104g"). The CRM 104g may be used to load and store data and/or instructions for operations performed by the processors of the baseband circuitry 104. CRM 104g for one embodiment may include any combination of suitable volatile memory and/or non-volatile memory. The CRM 104g may include any combination of various levels of memory/storage including, but not limited to, read-only memory (ROM) having embedded software instructions (e.g., firmware), random access memory (e.g., dynamic random access memory (DRAM)), cache, buffers, etc. The CRM 104g may be shared among the various processors or dedicated to particular processors. Components of the baseband circuitry 104 may be suitably combined in a single chip, a single chipset, or disposed on a same circuit board in some embodiments. In some embodiments, some or all of the constituent components of the baseband circuitry 104 and the application circuitry 102 may be implemented together, such as, for example, on a system on a chip (SOC).

In some embodiments, the baseband circuitry 104 may provide for communication compatible with one or more radio technologies. For example, in some embodiments, the baseband circuitry 104 may support communication with an E-UTRAN and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc., to facilitate the communication with the wireless network. RF circuitry 106 may include a receive signal path that may include circuitry to down-convert RF signals received from the FEM circuitry 108 and provide baseband signals to the baseband circuitry 104. RF circuitry 106 may also include a transmit signal path that may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion, respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a of the transmit signal path may be arranged for direct downconversion and/or direct upconversion, respectively. In some embodiments, the mixer circuitry 106a of the receive signal path and the mixer circuitry 106a of the transmit signal path may be configured for super-heterodyne, operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect, as other types of frequency synthesizers may be suitable. For example, synthesizer circuitry 106d may be a delta-sigma synthesizer, a frequency multiplier, or a synthesizer comprising a phase-locked loop with a frequency divider. The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the application circuitry 102 depending on the desired output frequency. In some embodiments, a divider control input (e.g., N) may be determined from a look-up table based on a channel indicated by the application circuitry 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106 d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path that may include circuitry configured to operate on RF signals received from one or more antennas 110, amplify the received signals and provide the amplified versions of the received signals to the RF circuitry 106 for further processing. FEM circuitry 108 may also include a transmit signal path that may include circuitry configured to amplify signals for transmission provided by the RF circuitry 106 for transmission by one or more of the one or more antennas 110. In some embodiments, the FEM circuitry 108 may include a TX/RX switch to switch between transmit mode and receive mode operation. The FEM circuitry 108 may include a receive signal path and a transmit signal path. The receive signal path of the FEM circuitry 108 may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110).

In some embodiments, the electronic device 100 may include additional elements such as, for example, a display, a camera, one or more sensors, and/or interface circuitry (for example, input/output (I/O) interfaces or buses) (not shown). In embodiments where the electronic device is implemented in or by an eNB, the electronic device 100 may include network interface circuitry. The network interface circuitry may be one or more computer hardware components that connect electronic device 100 to one or more network elements, such as one or more servers within a core network or one or more other eNBs via a wired connection. To this end, the network interface circuitry may include one or more dedicated processors and/or field programmable gate arrays (FPGAs) to communicate using one or more network communications protocols such as X2 application protocol (AP), SI AP, Stream Control Transmission Protocol (SCTP), Ethernet, Point-to-Point (PPP), Fiber Distributed Data Interface (FDDI), and/or any other suitable network communications protocols.

Figure 35:
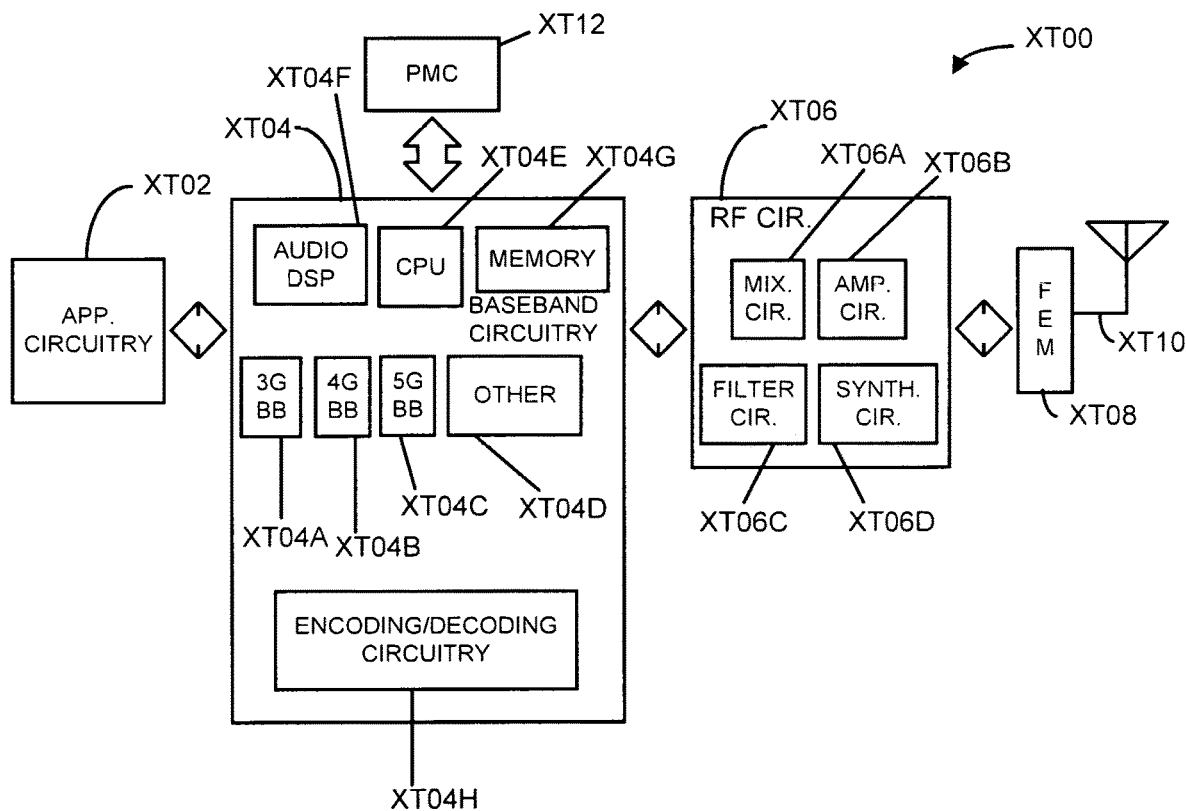
FIG. 35 illustrates components of another example device, according to various embodiments.

FIG. 35 illustrates example components of a device XT00 in accordance with some embodiments. In some embodiments, the device XT00 may include application circuitry XT02, baseband circuitry XT04, Radio Frequency (RF) circuitry XT06, front-end module (FEM) circuitry XT08, one or more antennas XT10, and power management circuitry (PMC) XT12 coupled together at least as shown. The components of the illustrated device XT00 may be included in a UE or a RAN node, such as one or more of the UE XS01, the UE XS02, the RAN node XS11, and/or the RAN node XS12. In some embodiments, the device XT00 may include less elements (e.g., a RAN node may not utilize application circuitry XT02, and instead include a processor/controller to process IP data received from an EPC). In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry XT02 may include one or more application processors. For example, the application circuitry XT02 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device XT00. In some embodiments, processors of application circuitry XT02 may process IP data packets received from an EPC.

The baseband circuitry XT 04 may include circuitry such as, but not limited to, one or more single-core or multi-core processors. The baseband circuitry XT04 may include one or more baseband processors or control logic to process baseband signals received from a receive signal path of the RF circuitry XT06 and to generate baseband signals for a transmit signal path of the RF circuitry XT06. Baseband processing circuity XT04 may interface with the application circuitry XT02 for generation and processing of the baseband signals and for controlling operations of the RF circuitry XT06. For example, in some embodiments, the baseband circuitry XT04 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XT04 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XT04 may include Fast-Fourier Transform (FFT), precoding, or constellation mapping/demapping functionality. In some embodiments, encoding/decoding circuitry XT04H of the baseband circuitry XT04 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XT04 may include one or more audio digital signal processor(s) (DSP) XT04F. The audio DSP(s) XT04F may include elements for compression/decompression and echo cancellation and may include other suitable processing elements in other embodiments. Components of the baseband circuitry XT04 may be suitably combined in a single chip, a single chipset, or disposed on a same circuit board in some embodiments. In some embodiments, some or all of the constituent components of the baseband circuitry XT04 and the application circuitry XT02 may be implemented together such as, for example, on a system on a chip (SOC).

In some embodiments, the baseband circuitry XT04 may provide for communication compatible with one or more radio technologies. For example, in some embodiments, the baseband circuitry XT04 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry XT04 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XT04. RF circuitry XT06 may also include a transmit signal path which may include circuitry to up-convert baseband signals provided by the baseband circuitry XT04 and provide RF output signals to the FEM circuitry XT08 for transmission.

In some embodiments, the receive signal path of the RF circuitry XT06 may include mixer circuitry XT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT06b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XT04 for further processing. In some embodiments, the output baseband signals may be zero-frequency baseband signals, although this is not a requirement. In some embodiments, mixer circuitry XT06a of the receive signal path may comprise passive mixers, although the scope of the embodiments is not limited in this respect.

In some embodiments, the mixer circuitry XT06a of the transmit signal path may be configured to up-convert input baseband signals based on the synthesized frequency provided by the synthesizer circuitry XT06d to generate RF output signals for the FEM circuitry XT08. The baseband signals may be provided by the baseband circuitry XT04 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a of the transmit signal path may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XT04 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XT04 or the application circuitry XT02 depending on the desired output frequency. In some embodiments, a divider control input (e.g., N) may be determined from a look-up table based on a channel indicated by the application circuitry XT02.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (c.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLU). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry XT08 may include a receive signal path and a transmit signal path. The receive signal path of the FEM circuitry XT08 may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

In some embodiments, the PMC XT12 may manage power provided to the baseband circuitry XT04. In particular, the PMC XT12 may control power-source selection, voltage scaling, battery charging, or DC-to-DC conversion. The PMC XT12 may often be included when the device XT00 is capable of being powered by a battery, for example, when the device is included in a UE. The PMC XT12 may increase the power conversion efficiency while providing desirable implementation size and heat dissipation characteristics.

FIG. 35 shows the PMC XT12 coupled only with the baseband circuitry XT04. However, in other embodiments, the PMC XT12 may be additionally or alternatively coupled with, and perform similar power management operations for, other components such as, but not limited to, application circuitry XT02, RF circuitry XT06, or FEM XT08.

In some embodiments, the PMC XT12 may control, or otherwise be part of, various power saving mechanisms of the device XT00. For example, if the device XT00 is in an RRC_Connected state, where it is still connected to the RAN node as it expects to receive traffic shortly, then it may enter a state known as Discontinuous Reception Mode (DRX) after a period of inactivity. During this state, the device XT00 may power down for brief intervals of time and thus save power.

If there is no data traffic activity for an extended period of time, then the device XT00 may transition off to an RRC_Idle state, where it disconnects from the network and does not perform operations such as channel quality feedback, handover, etc. The device XT00 goes into a very low power stale and it performs paging where again it periodically wakes up to listen to the network and then powers down again. The device XT00 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry XT02 and processors of the baseband circuitry XT04 may be used to execute elements of one or more instances of a protocol stack. For example, processors of the baseband circuitry XT04, alone or in combination, may be used to execute Layer 3, Layer 2, or Layer 1 functionality, while processors of the application circuitry XT02 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 36:
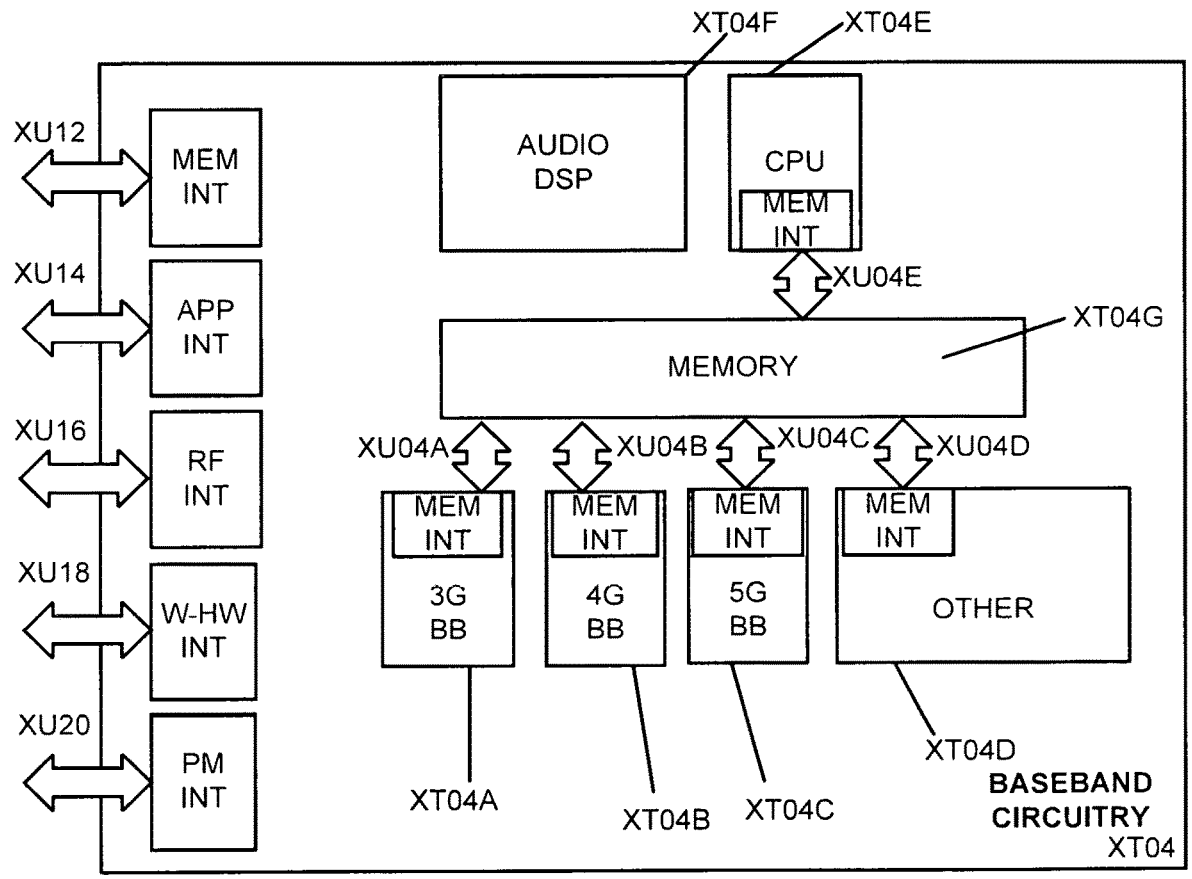
FIG. 36 illustrates example interfaces of baseband circuitry, according to various embodiments.

FIG. 36 illustrates example interfaces of baseband circuitry in accordance with some embodiments. As discussed above, the baseband circuitry XT04 of FIG. 35 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XT04 may further include one or more interfaces to communicatively couple to other circuitries/devices, such as a memory interface XU12 (e.g., an interface to send/receive data to/from memory external to the baseband circuitry XT04), an application circuitry interface XU14 (e.g., an interface to send/receive data to/from the application circuitry XT02 of FIG. 35), an RF circuitry interface XU16 (e.g., an interface to send/receive data to/from RF circuitry XT06 of FIG. 35), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMC XT12.

Figure 37:
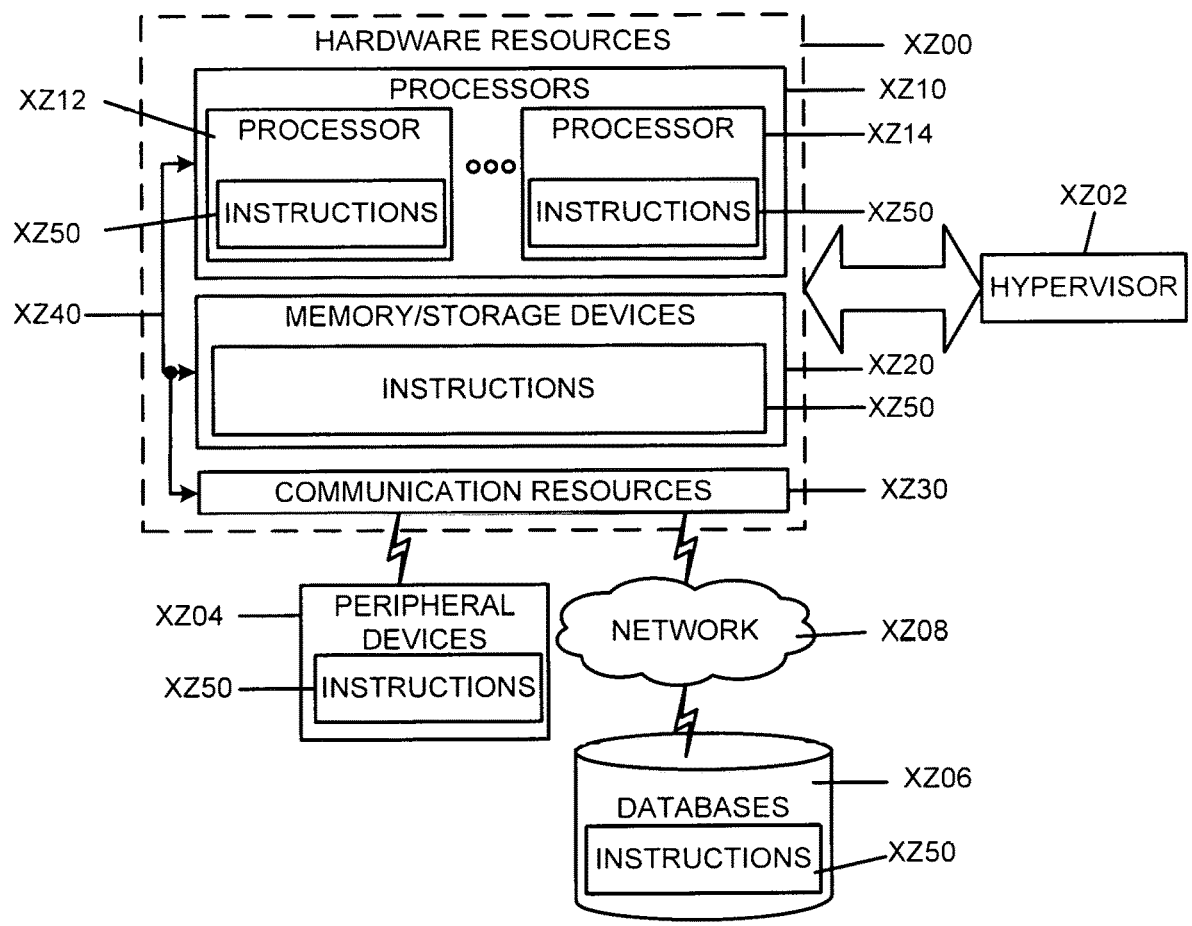
FIG. 37 illustrates a block diagram of example components able to read instructions from a machine-readable or computer-readable medium, according to various embodiments.

FIG. 37 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 37 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. For embodiments where node virtualization (e.g., NFV) is utilized, a hypervisor XZ02 may be executed to provide an execution environment for one or more network slices/sub-slices to utilize the hardware resources XZ00.

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

In some embodiments, the electronic device(s), network(s), system(s), chip(s) or component(s), or portions or implementations thereof, of Figures herein may be configured to perform one or more processes, techniques, or methods as described herein, or portions thereof.

Some examples of embodiments that are to be understood to be disclosed herein are provided below.

Example 1 may include the network shall be able to configure the way of REGB construction in terms of following characteristics: Number of REGs in the REGB, where the number ranges from 1 to N_REG_per_REGB which is defined in the specification; and Bundling direction: time or frequency when multiple symbols are configured for the CORESET of the SS.

Example 2 may include the above configuration parameters can be part of the RRC signaling message for SS or CORESET (re)configuration.

Example 3 may include one option, the REGB can defined on a CORESET or SS level so that all NR-PDCCHs in an SS share the same way of REGB construction.

Example 4 may include another option, REGB configuration can be configured on each aggregation level so that NR-PDCCH of different ALs may have different way of REGB construction.

Example 5 may include for high AL NR-PDCCH, the size of REGB can be larger than that of smaller AL so that in low SNR situation, better channel estimation performance can be obtained from larger REGB size.

Example 6 may include REGB with different sizes and bundling direction can be configurable according to UE specific channel condition including channel selectivity in time and/or frequency and SNR at the UE receiver.

Example 7 may include for slow fading channel with high frequency selectivity, REGB in time may be configured, and REGB in frequency may be configured for frequency-flat and fast fading channel.

Example 8 may include first level of REGB numbering is performed so that each REGB is numbered according to certain order, e.g., time-first or frequency-first, defined in specification or signaled in the configuration message.

Example 9 may include cyclic shift determination of each REGB numbering cycle is performed so that cyclic shift of each REGB numbering cycle is determined so as to maximize the time and frequency diversity of each CCE.

Example 10 may include the total number of REGBs of a particular NR-PDCCH should be evenly distributed both in time and frequency.

Example 11 may include case of number of symbols in CORESET is greater than number of REGBs of an NR-PDCCH. A subset of OFDM symbols of CORESET can be chosen for REGBs of the NR-PDCCH.

Example 12 may include it can be also possible that no additional cyclic shift is required for all REGB numbering cycle to achieve maximum time-frequency diversity of NR-PDCCH.

Example 13 may include based on the determined cyclic shifts in step 2, cyclic shift is performed for each REGB numbering cycle.

Example 14 may include the method of example 1 or some other example herein, where CORESET of 2 OFDM symbols. REGB of 2 REGs in frequency and REGB numbered in time-first order. REGB numbered in time-first order in $1^{st}$ and $3^{rd}$ cycle of REGB numbering, and cyclically shifted time-first order in the $2^{nd}$ cycle of REGB numbering shown in FIG. 3.

Example 15 may include the method of example 2 or some other example herein, where CORESET of 2 OFDM symbols. REGB of 3 REGs in frequency and REGB numbered in time-first order. REGB numbered in time-first order in $1^{st}$ cycle of REGB numbering, and cyclically shifted time-first order in the $2^{nd}$ cycle of REGB numbering shown in FIG. 5.

Example 16 may include the method of example 3 or some other example herein, where CORESET of 2 OFDM symbols. REGB of 3 REGs in frequency and REGB numbered in frequency-first order. REGB numbered in time-first order in $1^{st}$ cycle of REGB numbering, and cyclically shifted frequency-first order in the $2^{nd}$ cycle of REGB numbering shown in FIG. 7.

Example 17 may include Localized SS (LSS), wherein: given a configured control resource resource block (RB) set, each localized new radio physical downlink control channel (NR-PDCCH) blind decoding (BD) candidate is transmitted in frequency localized manner; each localized NR-PDCCH BD candidate is comprised of consecutive resource element groups (REGs) which are numbered in a time-first order; and localized NR-PDCCH is scheduled by a fifth generation NodeB (gNB) to benefit from potential frequency selective scheduling gain, better beamforming gain, and possible enhanced channel estimation with less demodulation reference signal (DMRS) overhead.

Example 18 may include Distributed SS (DSS), wherein: given a configured control resource RB set, each distributed NR-PDCCH BD candidate is transmitted in a distributed manner in both time and frequency domain; each distributed NR-PDCCH BD candidate is comprised of REGs which are evenly distributed in both time and frequency domain to maximize the achievable time-frequency diversity; and distributed NR-PDCCH is configured by gNB to benefit from the maximum available time-frequency diversity provided that gNB is not able to perform more advanced scheduling due to the lack of accurate channel state intormation (CSI) knowledge.

Example 19 may include Hierarchical SS (HSS), wherein given a configured control resource RB set, the NR-PDCCH at lowest aggregation level (AL), i.e. AL1, can be formed by a localized or distributed NR-PDCCH; the NR-PDCCII of higher AL is comprised of several NR-PDCCHs of lower AL so that the demodulated REs for NR-PDCC BD candidates of lower AL can be reused for the BD candidates of higher AL; and according to the key structures of HSS, there are 12 hierarchical SS structures, namely H1 to H12, wherein H1 includes the AL1 BD candidate is REG based localized NR-PDCCH; the AL1 BD candidates are numbered in time-first order; and BD candidates of higher AL aggregates the BD candidates in time domain; H2 includes the AL1 BD candidate is REG based distributed NR-PDCCH; the AL1 BD candidates are numbered in time-first order; and BD candidates of higher AL aggregates the BD candidates in time domain; H3 includes the cluster of REGs is comprised of several, e.g., 2, consecutive REGs in time domain; the AL1 BD candidate is cluster of REGs based localized NR-PDCCH; the AL1 BD candidates are numbered in time-first order; and BD candidates of higher AL aggregates the BD candidates in time domain; H4 includes the cluster of REGs is comprised of several, e.g., 2, consecutive REGs in time domain; the AL1 BD candidate is cluster of REGs based distributed NR-PDCCH; the AL1 BD candidates are numbered in time-first order; and BD candidates of higher AL aggregates the BD candidates in time domain; H5 includes the cluster of REGs is comprised of several, e.g., 2, consecutive REGs in frequency domain; the AL1 BD candidate is cluster of REGs based localized NR-PDCCH; the AL1 BD candidates are numbered in time-first order; and BD candidates of higher AL aggregates the BD candidates in time domain; H6 includes the cluster of REGs is comprised of several, e.g., 2, consecutive REGs in frequency domain; the AL1 BD candidate is cluster of REGs based distributed NR-PDCCH; the AL1 BD candidates are numbered in time-first order; and BD candidates of higher AL aggregates the BD candidates in time domain; H7 includes the AL1 BD candidate is REG based localized NR-PDCCH; the AL1 BD candidates are numbered in frequency-first order; and BD candidates of higher AL aggregates the BD candidates in frequency domain; H8 includes the AL1 BD candidate is REG based distributed NR-PDCCH; the AL1 BD candidates are numbered in frequency-first order; and BD candidates of higher AL aggregates the BD candidates in frequency domain; H9 includes the cluster of REGs is comprised of several, e.g., 2, consecutive REGs in time domain; the AL1 BD candidate is cluster of REGs based localized NR-PDCCH; the AL1 BD candidates are numbered in frequency-first order; and BD candidates of higher AL aggregates the BD candidates in frequency domain; H10 includes the cluster of REGs is comprised of several, e.g., 2, consecutive REGs in time domain; the AL1 BD candidate is cluster of REGs based distributed NR-PDCCH; the AL1 BD candidates are numbered in frequency-first order; and BD candidates of higher AL aggregates the BD candidates in frequency domain; H11 includes the cluster of REGs is comprised of several, e.g., 2, consecutive REGs in frequency domain; the AL1 BD candidate is cluster of REGs based localized NR-PDCCH; the AL1 BD candidates are numbered in frequency-first order; and BD candidates of higher AL aggregates the BD candidates in frequency domain; H12 includes the cluster of REGs is comprised of several, e.g., 2, consecutive REGs in frequency domain; the AL1 BD candidate is cluster of REGs based distributed NR-PDCCH; the AL1 BD candidates are numbered in frequency-first order; and BD candidates of higher AL aggregates the BD candidates in frequency domain.

Example 20 may include an apparatus comprising means to perform one or more elements of a method described in or related to any of examples 1-19, or any other method or process described herein.

Example 21 may include one or more non-transitory computer-readable media comprising instructions to cause an electronic device, upon execution of the instructions by one or more processors of the electronic device, to perform one or more elements of a method described in or related to any of examples 1-19, or any other method or process described herein.

Example 22 may include an apparatus comprising logic, modules, and/or circuitry to perform one or more elements of a method described in or related to any of examples 1-19, or any other method or process described herein.

Example 23 may include a method, technique, or process as described in or related to any of examples 1-19, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-19, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Example 28 may include an apparatus for a next generation NodeB (gNB), comprising first circuitry to determine a number of resource element groups (REGs) to be included in a resource element group bundle (REGB) for a new radio physical downlink control channel (NR-PDCCH), and generate a signal that indicates the number of the REGs, and second circuitry, coupled with the first circuitry, to encode the signal for transmission to a user equipment (UE).

Example 29 may include the apparatus of example 28 or any other example herein, wherein the first circuitry is further to determine a bundling direction for the REGs to be included in the REGB, wherein the signal further indicates the bundling direction.

Example 30 may include the apparatus of example 29 or any other example herein, wherein the bundling direction is a time-first order or a frequency-first order.

Example 31 may include the apparatus of any of examples 28-30 or any other example herein, wherein the first circuitry is further to determine whether a search space (SS) is to be configured in a localized manner, a distributed manner, or a hierarchical manner, wherein the signal further indicates that the SS is to be configured in the localized manner, the distributed manner, or the hierarchical manner based on the determination.

Example 32 may include the apparatus of example 31 or any other example herein, wherein the first circuitry is to determine that the SS is to be configured in the hierarchical manner, wherein the first circuitry is further to determine a hierarchical SS structure for the UE based on channel conditions associated with the UE or channel state information associated with the UE, wherein the signal further indicates the hierarchical SS structure.

Example 33 may include the apparatus of example 32 or any other example herein, wherein the hierarchical SS structure indicates whether the UE is to aggregate blind decoding (BD) candidates of the SS in the time domain or in the frequency domain.

Example 34 may include the apparatus of any of examples 28-30 or any other example herein, wherein the signal is to be transmitted via higher layer signaling.

Example 35 may include the apparatus of any of examples 28-30 or any other example herein, wherein the signal is to be transmitted via radio resource control (RRC) signaling.

Example 36 may include the apparatus of any of any of examples 28-30 or any other example herein, wherein the second circuitry comprises a baseband processor or encoding circuitry that is separate from the baseband processor.

Example 37 may include the apparatus of any of examples 28-30 or any other example herein, wherein the first circuitry is further to generate a transmission for transmission via the NR-PDCCH, and configure the transmission based on the number of the REGs to be included in the REGB for transmission via the NR-PDCCH, and the second circuitry is further to encode the transmission for transmission to the UE via the NR-PDCCH.

Exmple 38 may include an apparatus for a user equipment (UE), comprising first circuitry to identify an indication of a number of resource element groups (REGs) to be included in a resource element group bundle (REGB) for a new radio physical downlink control channel (NR-PDCCH), the indication received from a next generation NodeB (gNB), and determine a configuration of a search space (SS) of the UE based on the number of the REGs to be included in the REGB.

Example 39 may include the apparatus of example 38 or any other example herein, wherein the first circuitry is further to identify an indication of a bundling direction for the REGs to be included in the REGB, the indication of the bundling direction received from the gNB, and wherein the configuration of the SS is further determined based on the bundling direction.

Example 40 may include the apparatus of any of examples 38-39 or any other example herein, wherein the first circuitry is further to identify an indication of a localized manner, a distributed manner, or a hierarchical manner, the indication received from the gNB, and wherein the configuration of the SS is further determined based on the indication.

Exaple 41 may include the apparatus of example 40 or any other example herein, wherein the indication is of the hierarchical manner, wherein the first circuitry is further to identify an indication of a hierarchical SS structure for the UE, wherein the indication of the hierarchical SS structure is received from the gNB, and wherein the configuration of the SS is further determined based on the hierarchical SS structure.

Example 42 may include one or more computer-readable media having instructions stored thereon, wherein the instructions, in response to execution by a next generation NodeB (gNB), cause the gNB to determine whether a search space (SS) tor a user equipment (UE) is to be configured in a localized manner, a distributed manner, or a hierarchical manner, generate a signal that indicates that the SS is to be configured in the localized manner, the distributed manner, or the hierarchical manner based on the determination, and encode the signal for transmission to the UE.

Example 43 may include the one or more computer-readable media of example 42 or any other example herein, wherein the gNB is to determine that the SS for the UE is to be configured in the hierarchical manner, and wherein the instructions further cause the gNB to determine a hierarchical SS structure for the UE based on channel conditions associated with the UE or channel state information associated with the UE, wherein the signal further indicates the hierarchical SS structure.

Example 44 may include the one or more computer-readable media of example 43 or any other example herein, wherein the hierarchical SS structure indicates whether the UE is to aggregate blind decoding (BD) candidates of the SS in the time domain or in the frequency domain.

Example 45 may include the one or more computer-readable media of example 42 or any other example herein, wherein the instructions further cause the gNB to determine a numbering direction for blind decoding (BD) candidates of the SS, the numbering direction being a time-first order or a frequency-first order, and wherein the signal further indicates the numbering direction.

Example 46 may include the one or more computer-readable media of any of examples 42-45 or any other example herein, wherein the instructions further cause the gNB to determine a number of resource element groups (REGs) to be included in a resource element group bundle (REGB), and wherein the signal further indicates the number of the REGs.

Example 47 may include the one or more computer-readable media of example 46 or any other example herein, wherein the instructions further cause the gNB to determine a bundling direction for the REGs to be included in the REGB, and wherein the signal further indicates the bundling direction.

Example 48 may include the one or more computer-readable media of any of examples 42-45 or any other example herein, wherein the instructions further cause the gNB to transmit the signal via radio resource control (RRC) signaling.

Example 49 may include one or more computer-readable media having instructions stored thereon, wherein the instructions, in response to execution by a user equipment (UE), cause the UE to identify an indication of a localized manner, a distributed manner, or a hierarchical manner, the indication received from a next generation NodeB (gNB), and determine a configuration of a search space (SS) of the UE based on the indication.

Example 50 may include the one or more computer-readable media of example 49 or any other example herein, wherein the indication is of the hierarchical manner, wherein the instructions further cause the UE to identify an indication of a hierarchical SS structure, the indication of the hierarchical SS structure received from the gNB, and wherein the configuration of the SS is further determined based on the hierarchical SS structure.

Example 51 may include the one or more computer-readable media of example 50 or any other example herein, wherein the hierarchical SS structure indicates whether the UE is to aggregate blind decoding (BD) candidates of the SS in the time domain or the frequency domain.

Example 52 may include the one or more computer-readable media of example 49 or any other example herein, wherein the instructions further cause the UE to identify an indication of a numbering direction for blind decoding (BD) candidates of the SS, the indication of the numbering direction received from the gNB and the numbering direction being a time-first order or a frequency-first order, and wherein the configuration of the SS is further determined based on the numbering direction.

Example 53 may include the one or more computer-readable media of any of examples 49-52 or any other example herein, wherein the instructions further cause the UE to identify an indication of a number of resource element groups (REGs) to be included in a resource element group bundle (REGB), the indication of the number of the REGs received from the gNB, and wherein the configuration of the SS is further determined based on the number of the REGS.

Example 54 may include a method for a next generation NodeB (gNB), comprising determining a number of resource element groups (REGs) to be included in a resource element group bundle (REGB) for a new radio physical downlink control channel (NR-PDCCH), generating a signal that indicates the number of the REGs, and encoding the signal for transmission to a user equipment (UE).

Example 55 may include the method of example 54 or any other example herein, further comprising determining a bundling direction for the REGs to be included in the REGB, wherein the signal further indicates the bundling direction.

Example 56 may include the method of example 55 or any other example herein, wherein the bundling direction is a time-first order or a frequency-first order.

Example 57 may include the method of any of examples 54-56 or any other example herein, further comprising determining whether a search space (SS) is to be configured in a localized manner, a distributed manner, or a hierarchical manner, wherein the signal further indicates that the SS is to be configured in the localized manner, the distributed manner, or the hierarchical manner based on the determination.

Example 58 may include the method of example 57 or any other example herein, further comprising determining that the SS is to be configured in the hierarchical manner, and determining a hierarchical SS structure for the UE based on channel conditions associated with the UE or channel state information associated with the UE, wherein the signal further indicates the hierarchical SS structure.

Example 59 may include the method of example 58 or any other example herein, wherein the hierarchical SS structure indicates whether the UE is to aggregate blind decoding (BD) candidates of the SS in the time domain or in the frequency domain.

Example 60 may include the method of any of examples 54-56 or any other example herein, wherein the signal is to be transmitted via higher layer signaling.

Example 61 may include the method of any of examples 54-56 or any other example herein, wherein the signal is to be transmitted via radio resource control (RRC) signaling.

Example 62 may include the method of any of examples 54-56 or any other example herein, further comprising generating a transmission for transmission via the NR-PDCCH, configuring the transmission based on the number of the REGs to be included in the REGB for transmission via the NR-PDCCH, and encoding the transmission for transmission to the UE via the NR-PDCCH.

Exmple 63 may include an method for a user equipment (UE), comprising identifying an indication of a number of resource element groups (REGs) to be included in a resource element group bundle (REGB) for a new radio physical downlink control channel (NR-PDCCH), the indication received from a next generation NodeB (gNB), and determining a configuration of a search space (SS) of the UE based on the number of the REGs to be included in the REGB.

Example 64 may include the method of example 63 or any other example herein, further comprising identifying an indication of a bundling direction for the REGs to be included in the REGB, the indication of the bundling direction received from the gNB, and wherein the configuration of the SS is further determined based on the bundling direction.

Example 65 may include the method of any of examples 63-64 or any other example herein, further comprising identifying an indication of a localized manner, a distributed manner, or a hierarchical manner, the indication received from the gNB, and wherein the configuration of the SS is further determined based on the indication.

Exaple 66 may include the method of example 65 or any other example herein, wherein the indication is of the hierarchical manner, wherein the method further comprises identifying an indication of a hierarchical SS structure for the UE, wherein the indication of the hierarchical SS structure is received from the gNB, and wherein the configuration of the SS is further determined based on the hierarchical SS structure.

Example 67 may include a method comprising determining whether a search space (SS) for a user equipment (UE) is to be configured in a localized manner, a distributed manner, or a hierarchical manner, generating a signal that indicates that the SS is to be configured in the localized manner, the distributed manner, or the hierarchical manner based on the determination, and encoding the signal for transmission to the UE.

Example 68 may include the method of example 67 or any other example herein, further comprising determining that the SS for the UE is to be configured in the hierarchical manner, and determining a hierarchical SS structure for the UE based on channel conditions associated with the UE or channel state information associated with the UE, wherein the signal further indicates the hierarchical SS structure.

Example 69 may include the method of example 68 or any other example herein, wherein the hierarchical SS structure indicates whether the UE is to aggregate blind decoding (BD) candidates of the SS in the time domain or in the frequency domain. Example 70 may include the method of example 67 or any other example herein, further comprising determining a numbering direction for blind decoding (BD) candidates of the SS, the numbering direction being a time-first order or a frequency-first order, and wherein the signal further indicates the numbering direction.

Example 71 may include the method of any of examples 67-70 or any other example herein, further comprising determining a number of resource element groups (REGs) to be included in a resource element group bundle (REGB), and wherein the signal further indicates the number of the REGs.

Example 72 may include the method of example 71 or any other example herein, further comprising determining a bundling direction for the REGs to be included in the REGB, and wherein the signal further indicates the bundling direction.

Example 73 may include the method of any of examples 67-70 or any other example herein, further comprising transmitting the signal via radio resource control (RRC) signaling.

Example 74 may include a method, comprising identifying an indication of a localized manner, a distributed manner, or a hierarchical manner, the indication received from a next generation NodeB (gNB), and determining a configuration of a search space (SS) of the UE based on the indication.

Example 75 may include the method of example 74 or any other example herein, wherein the indication is of the hierarchical manner, wherein the method further comprises identifying an indication of a hierarchical SS structure, the indication of the hierarchical SS structure received from the gNB, and wherein the configuration of the SS is further determined based on the hierarchical SS structure.

Example 76 may include the method of example 75 or any other example herein, wherein the hierarchical SS structure indicates whether the UE is to aggregate blind decoding (BD) candidates of the SS in the time domain or the frequency domain.

Example 77 may include the method of example 74 or any other example herein, further comprising identifying an indication of a numbering direction for blind decoding (BD) candidates of the SS, the indication of the numbering direction received from the gNB and the numbering direction being a time-first order or a frequency-first order, and wherein the configuration of the SS is further determined based on the numbering direction.

Example 78 may include the method of any of examples 74-77 or any other example herein, further comprising identifying an indication of a number of resource element groups (REGs) to be included in a resource element group bundle (REGB), the indication of the number of the REGs received from the gNB, and wherein the configuration of the SS is further determined based on the number of the REGS.

Example 79 may include an apparatus to perform the method of any of examples 54-78.

Example 80 may include one or more means to perform the method of any of the examples 54-78.

Example 81 may include a one or more computer-readable media having instructions stored thereon, wherein the instructions, in response to execution by an apparatus, cause the apparatus to perform the method of any of the examples 54-78.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. An access node (AN), comprising:
first circuitry to:
configure a new radio physical downlink control channel (NR-PDCCH) to include a plurality of resource element group bundles (REGBs), the plurality of REGBs having a same number of resource element groups (REGs) as one another,
wherein REGs within at least one REGB from among the plurality of REGBs are assigned to a same number as one another,
wherein the plurality of REGBs are cyclically numbered based upon a number of control channel elements (CCEs) in accordance with a bundling direction, and
generate a signal that indicates a number of the REGs within the at least one REGB, the number of CCEs, and the bundling direction; and
second circuitry, coupled with the first circuitry, to encode the signal for transmission to a user equipment (UE).

2. The AN of claim 1, wherein the bundling direction comprises: a time-first order or a frequency-first order.

3. The AN of claim 1, wherein the first circuitry is further to:
  determine whether a search space (SS) is to be configured in a localized manner, a distributed manner, or a hierarchical manner, and
    wherein the signal further indicates that the SS is to be configured in the localized manner, the distributed manner, or the hierarchical manner based on the determination.

4. The AN of claim 3, wherein the first circuitry is further to:
  determine that the SS is to be configured in the hierarchical manner,
  determine a hierarchical SS structure for the UE based on channel conditions associated with the UE or channel state information associated with the UE, and
  wherein the signal further indicates the hierarchical SS structure.

5. The AN of claim 4, wherein the hierarchical SS structure indicates whether the UE is to aggregate blind decoding (BD) candidates of the SS in a time domain or in a frequency domain.

6. The AN of claim 1, wherein the second circuitry is further to transmit the signal via higher layer signaling.

7. The AN of claim 1, wherein the second circuitry is further to transmit the signal via radio resource control (RRC) signaling.

8. The AN of claim 1, wherein the second circuitry comprises a baseband processor or encoding circuitry.

9. The AN of claim 1, wherein at least one REG from among the number of REGs comprises a plurality of consecutive resource elements (REs) in a frequency domain of an orthogonal frequency division multiplexing (OFDM) symbol.

10. A user equipment (UE), comprising:
  first circuitry to receive a signal from an access node (AN) that indicates a configuration of a search space (SS) having a plurality of resource element group bundles (REGBs), resource element group bundles (REGBs), the plurality of REGBs having a same number of resource element groups (REGs) as one another, and the signal the signal including a number of REGs within at least one REGB from among the plurality of REGBs, a number of control channel elements (CCEs), and a bundling direction; and
  second circuitry to:
    assign REGs within the at least one REGB from among the plurality of REGBs to a same number as one another, and
    cyclically number the plurality of REGBs to the number of CCEs in accordance with the bundling direction to configure the SS.

11. The UE of claim 10, wherein the second circuitry is further to:
  identify an indication of whether the SS is to be configured in a localized manner, a distributed manner, or a hierarchical manner, the indication received from the AN, and
  further configure the SS based on the indication.

12. The UE of claim 11, wherein the indication identifies the SS is to be configured in the hierarchical manner, and
  wherein the second circuitry is further to:
    identify an indication of a hierarchical SS structure for the UE, and
    further configure the SS based on the hierarchical SS structure.

13. The UE of claim 10, wherein the bundling direction comprises a time-first order or a frequency-first order.

14. The UE of claim 10, wherein the first circuitry is further to receive the signal via higher layer signaling.

15. The UE of claim 10, wherein the first circuitry is further to receive the signal via radio resource control (RRC) signaling.

16. The UE of claim 10, wherein at least one REG from among the number of REGs comprises a plurality of consecutive resource elements (REs) in a frequency domain of an orthogonal frequency division multiplexing (OFDM) symbol.

17. A method for configuring a new radio physical downlink control channel (NR-PDCCH), the method comprising:
  configuring, by an access node (AN), the NR-PDCCH to include a plurality of resource element group bundles (REGBs), the plurality of REGBs having a same number of resource element groups (REGs) as one another,
    wherein REGS within the at least one REGB from among the plurality of REGBs are assigned to a same number as one another, and
    wherein the plurality of REGBs are cyclically based upon a number of control channel elements (CCEs) in accordance with a bundling direction;
  generating, by the AN, a signal that indicates a number of the REGs within at the least one REGB from among the plurality of REGBs, the number of CCEs, and the bundling direction; and
  encoding, by the AN, the signal for transmission to a user equipment (UE).

18. The method of claim 17, wherein the bundling direction comprises: a time-first order or a frequency-first order.

19. The method of claim 17, further comprising transmitting, by the AN, the signal via higher layer signaling.

20. The method of claim 17, further comprising transmitting, by the AN, the signal via radio resource control (RRC) signaling.

* * * * *